US012577000B2

(12) United States Patent
Holmes

(10) Patent No.: US 12,577,000 B2
(45) Date of Patent: Mar. 17, 2026

(54) UNIVERSAL FEED MECHANISM FOR AUTOMATIC PACKAGER

(71) Applicant: RXSAFE LLC, Vista, CA (US)

(72) Inventor: William K. Holmes, San Diego, CA (US)

(73) Assignee: RXSAFE LLC, Vista, CA (US)

( * ) Notice: Subject to any disclaimer, the term of this patent is extended or adjusted under 35 U.S.C. 154(b) by 0 days.

(21) Appl. No.: 17/694,950

(22) Filed: Mar. 15, 2022

(65) Prior Publication Data

US 2022/0204193 A1 Jun. 30, 2022

Related U.S. Application Data

(62) Division of application No. 16/777,336, filed on Jan. 30, 2020, now Pat. No. 11,305,898, which is a (Continued)

(51) Int. Cl.

*B65B 1/30* (2006.01)
*A61J 1/03* (2023.01)

(Continued)

(52) U.S. Cl.

CPC ................ *B65B 1/30* (2013.01); *A61J 1/035* (2013.01); *A61J 7/0076* (2013.01); *B65B 5/103* (2013.01);

(Continued)

(58) Field of Classification Search

CPC ........... B65B 5/103; B65B 1/30; B65B 35/12; B65B 35/18; B65B 57/18; B65B 57/20;

(Continued)

(56) References Cited

U.S. PATENT DOCUMENTS 3,042,183 A 7/1962 Ackley
3,572,547 A * 3/1971 Walberg .................. A01C 7/04 221/277

(Continued)

FOREIGN PATENT DOCUMENTS

CA 2185620 C 8/2000
CN 1089706 C * 8/2002 .......... B65B 19/226

(Continued)

OTHER PUBLICATIONS

Office Action with Search Report issued from the Chinese Patent Office for related Application No. 2018800080392.3 dated Jul. 7, 2022 (21 Pages including English Translation).

(Continued)

*Primary Examiner* — Rakesh Kumar
(74) *Attorney, Agent, or Firm* — Michael Best & Friedrich LLP

(57) ABSTRACT

An automatic packager including a cartridge and a cartridge mechanism is provided. The cartridge for the automatic packager includes a reservoir for storing a plurality of medications and a wheel including a bottom portion placed in the reservoir. The cartridge also includes a scooping member provided on the wheel to rotate with the wheel and singulate a medication from the reservoir. The cartridge mechanism for the automatic packager includes a platform configured to receive a medication from a cartridge and a camera system. The cartridge mechanism also includes an electronic processor coupled to the camera system configured to dispense the medication from the cartridge in response to determining that the expected medication is delivered to the platform and return the medication to the cartridge in response to determining that the expected medication is not delivered to the platform.

20 Claims, 47 Drawing Sheets

Related U.S. Application Data division of application No. 16/160,535, filed on Oct. 15, 2018, now Pat. No. 10,583,941.

(60) Provisional application No. 62/710,353, filed on Feb. 16, 2018, provisional application No. 62/572,204, filed on Oct. 13, 2017.

(51) Int. Cl.

| | |
|---|---|
| ***A61J 7/00*** | (2006.01) |
| ***B65B 5/10*** | (2006.01) |
| ***B65B 35/12*** | (2006.01) |
| ***B65B 35/18*** | (2006.01) |
| ***B65B 57/14*** | (2006.01) |
| ***B65B 57/20*** | (2006.01) |

(52) U.S. Cl.

CPC .............. *B65B 35/12* (2013.01); *B65B 35/18* (2013.01); *B65B 57/14* (2013.01); *B65B 57/20* (2013.01); *A61J 2200/70* (2013.01); *A61J 2205/60* (2013.01)

(58) Field of Classification Search

CPC ......... B65B 57/14; A61J 1/035; A61J 7/0076; A61J 2200/70; A61J 2205/60

USPC .................................................. 221/203, 211

See application file for complete search history.

(56) References Cited

U.S. PATENT DOCUMENTS 3,709,598 A 1/1973 Vandenberg et al.
3,756,402 A 9/1973 Wagers, Jr. et al.
3,802,547 A * 4/1974 Wagers, Jr. ........ B65G 47/1471 198/483.1
3,811,552 A 5/1974 Wagers, Jr. et al.
3,838,766 A 10/1974 Wagers, Jr. et al.
3,917,055 A * 11/1975 VandenBerg ........... A61J 3/074 198/380
3,933,239 A 1/1976 Yoshida
3,957,152 A * 5/1976 Heitmann .............. A24C 5/322 198/462.1
4,018,358 A 4/1977 Johnson et al.
4,353,456 A 10/1982 Yamamoto
4,376,442 A * 3/1983 Gomez ................ G07B 15/066 453/32
4,479,573 A * 10/1984 Ackley, Sr. ............. B41F 17/36 198/399
4,546,901 A 10/1985 Buttarazzi
4,664,290 A * 5/1987 Martin .................. A01C 7/046 403/17
4,682,683 A * 7/1987 Ackley, Sr. ........ B65G 47/1471 198/380
4,697,721 A 10/1987 Johnson et al.
5,176,285 A 1/1993 Shaw
5,472,113 A 12/1995 Shaw
5,522,512 A 6/1996 Archer et al.
5,564,593 A 10/1996 East, Sr.
5,609,268 A 3/1997 Shaw
5,638,657 A 6/1997 Archer et al.
5,921,376 A * 7/1999 Michell .............. B65G 47/8823 198/476.1
6,006,946 A 12/1999 Williams et al.
6,036,812 A 3/2000 Williams et al.
6,079,284 A 6/2000 Yamamoto et al.
6,085,938 A * 7/2000 Coughlin ................ G07F 11/44 221/277
6,108,030 A 8/2000 Yamamoto et al.
6,185,901 B1 2/2001 Aylward
6,202,385 B1 3/2001 Kim
6,219,587 B1 4/2001 Ahlin et al.
6,234,343 B1 5/2001 Papp
6,263,639 B1 7/2001 Kim
6,266,946 B1 7/2001 Aylward
6,269,612 B1 8/2001 Aylward
6,286,421 B1 9/2001 Ackley
6,324,253 B1 11/2001 Yuyama et al.
6,330,351 B1 12/2001 Yasunaga
6,345,487 B1 2/2002 Luciano et al.
6,367,232 B2 4/2002 Kim
6,401,429 B2 6/2002 Aylward
6,434,911 B1 8/2002 Yamamoto et al.
6,439,422 B1 8/2002 Papp et al.
6,449,921 B1 9/2002 Kim
6,450,089 B2 9/2002 Ackley
6,481,347 B2 11/2002 Ackley
6,497,342 B2 12/2002 Zhang et al.
6,505,460 B2 1/2003 Aylward
6,505,461 B1 1/2003 Yasunaga
6,510,962 B1 * 1/2003 Lim .................... G07F 17/0014 700/243
6,535,637 B1 3/2003 Wootton et al.
6,601,729 B1 8/2003 Papp
6,604,019 B2 8/2003 Ahlin et al.
6,607,094 B2 * 8/2003 MacDonald ............ G07F 11/24 221/121
6,681,149 B2 1/2004 William et al.
6,684,914 B2 2/2004 Gershman et al.
6,702,146 B2 3/2004 Varis
6,739,455 B2 5/2004 Yamamoto et al.
6,741,731 B1 5/2004 Yamamoto et al.
6,805,245 B2 10/2004 Kenneway
6,848,593 B2 2/2005 Papp
6,892,512 B2 5/2005 Rice et al.
6,898,919 B2 5/2005 Kim
6,899,144 B1 5/2005 Geltser et al.
6,899,148 B1 5/2005 Geltser et al.
6,966,452 B2 11/2005 Kim
6,970,769 B2 11/2005 Rice et al.
6,983,579 B2 1/2006 Rice et al.
6,988,634 B2 1/2006 Varis
7,010,899 B2 3/2006 McErlean et al.
7,059,098 B2 6/2006 Kim
7,073,544 B2 7/2006 Geltser et al.
7,079,236 B2 7/2006 Yamamoto
7,102,741 B2 9/2006 Ackley, Jr. et al.
7,124,791 B2 10/2006 Geltser et al.
7,185,477 B2 3/2007 Rice et al.
7,219,703 B2 5/2007 Geltser et al.
7,255,247 B2 8/2007 Aylward
7,302,311 B2 11/2007 Varis
7,383,674 B2 6/2008 Van Eenoo
7,383,862 B2 6/2008 Geltser et al.
7,386,965 B2 6/2008 McErlean et al.
7,395,841 B2 7/2008 Geltser et al.
7,398,895 B2 7/2008 Kim
7,407,050 B2 8/2008 Maruyama et al.
7,409,977 B2 8/2008 Rice et al.
7,412,814 B2 8/2008 Rice et al.
7,430,838 B2 10/2008 Rice et al.
7,451,583 B2 11/2008 Kim
7,456,946 B2 11/2008 Ackley, Jr. et al.
7,516,836 B2 4/2009 Trygar et al.
7,530,211 B2 5/2009 McErlean et al.
7,631,670 B2 12/2009 Geltser et al.
7,661,248 B2 2/2010 Conti
7,668,618 B2 2/2010 Szesko et al.
7,701,568 B2 4/2010 Ackley, Jr. et al.
7,726,514 B2 6/2010 Janet et al.
7,886,506 B2 * 2/2011 Knoth ..................... G07F 11/44 53/247
7,995,831 B2 8/2011 Eller et al.
8,015,777 B2 9/2011 Yagyu et al.
8,020,724 B2 9/2011 Remis et al.
8,037,992 B2 10/2011 Ackley, Jr.
8,068,934 B2 11/2011 Saltsov
8,072,590 B2 12/2011 Ackley, Jr. et al.
8,110,057 B2 2/2012 Rice et al.
8,117,809 B2 2/2012 McErlean et al.
8,136,332 B2 3/2012 Rice et al.
8,146,331 B2 4/2012 Soloman
8,261,939 B2 9/2012 Knoth
8,269,958 B2 9/2012 Ackley, Jr. et al.

(56) References Cited

U.S. PATENT DOCUMENTS

| | | | | |
|---|---|---|---|---|
| 8,275,481 | B2 | 9/2012 | Rice et al. | |
| 8,295,582 | B2 | 10/2012 | Eller et al. | |
| 8,340,392 | B2 | 12/2012 | Kim | |
| 8,348,094 | B2 | 1/2013 | Remis et al. | |
| 8,373,081 | B2 | 2/2013 | Ackley et al. | |
| 8,392,020 | B2 | 3/2013 | Terzini | |
| 8,397,946 | B2 | 3/2013 | Portney | |
| 8,417,375 | B2 * | 4/2013 | Horev | G06M 7/00 700/230 |
| 8,457,361 | B2 | 6/2013 | Julius et al. | |
| 8,480,834 | B2 | 7/2013 | Rice et al. | |
| 8,483,872 | B2 * | 7/2013 | Ratnakar | G07F 9/02 700/242 |
| 8,511,478 | B2 | 8/2013 | Terzini | |
| 8,539,742 | B2 | 9/2013 | McErlean et al. | |
| 8,571,297 | B2 | 10/2013 | Eller et al. | |
| 8,582,863 | B2 | 11/2013 | Van Den Brink | |
| 8,584,434 | B2 | 11/2013 | Kodama et al. | |
| 8,584,715 | B2 | 11/2013 | Stoeckel et al. | |
| 8,646,591 | B2 * | 2/2014 | De Ruijter | B65G 47/1471 198/397.01 |
| 8,727,208 | B2 | 5/2014 | Poisner | |
| 8,734,061 | B2 | 5/2014 | Terzini | |
| 8,745,961 | B2 | 6/2014 | Terzini | |
| 8,770,413 | B2 | 7/2014 | Ackley et al. | |
| 8,791,993 | B2 | 7/2014 | Kim | |
| 8,794,483 | B2 * | 8/2014 | Czarnek | A61J 7/02 221/172 |
| 8,943,779 | B2 | 2/2015 | Amano et al. | |
| 8,959,878 | B2 | 2/2015 | Okuma | |
| 8,966,863 | B2 | 3/2015 | Amano et al. | |
| 8,973,338 | B2 | 3/2015 | Terzini | |
| 9,037,291 | B2 | 5/2015 | Terzini | |
| 9,043,015 | B2 * | 5/2015 | Ratnakar | A61J 7/0445 700/244 |
| 9,063,096 | B2 * | 6/2015 | Gertitschke | B65B 5/103 |
| 9,101,962 | B2 | 8/2015 | Ackley et al. | |
| 9,116,887 | B2 * | 8/2015 | Botten | G06F 18/22 |
| 9,233,767 | B2 | 1/2016 | Amano et al. | |
| 9,233,789 | B2 * | 1/2016 | Koike | B65D 83/04 |
| 9,245,093 | B2 * | 1/2016 | Shaw | G16H 20/13 |
| 9,248,949 | B2 | 2/2016 | Leifeld et al. | |
| 9,251,493 | B2 * | 2/2016 | Jacobs | H04N 23/90 |
| 9,259,766 | B2 | 2/2016 | Ackley et al. | |
| 9,283,149 | B2 * | 3/2016 | Czarnek | A61J 7/02 |
| 9,311,451 | B2 | 4/2016 | Bae et al. | |
| 9,387,155 | B2 | 7/2016 | Morioka et al. | |
| 9,468,948 | B2 | 10/2016 | Ackley et al. | |
| 9,475,633 | B2 | 10/2016 | Hoover et al. | |
| 9,517,855 | B2 | 12/2016 | Murokh | |
| 9,637,323 | B2 | 5/2017 | Kim | |
| 9,731,909 | B2 | 8/2017 | Kim | |
| 9,757,772 | B2 | 9/2017 | Ackley et al. | |
| 9,766,114 | B2 | 9/2017 | Ademe | |
| 9,776,755 | B2 | 10/2017 | Kondo et al. | |
| 9,836,583 | B2 | 12/2017 | Garcia et al. | |
| 9,886,751 | B2 | 2/2018 | Jacobs et al. | |
| 9,965,594 | B2 | 5/2018 | Portney | |
| RE46,910 | E | 6/2018 | Aylward et al. | |
| 9,994,347 | B2 | 6/2018 | Yuyama et al. | |
| 10,968,001 | B2 * | 4/2021 | Van Der Meij | B65B 39/007 |
| 11,006,662 | B1 * | 5/2021 | Williams | A24D 3/0287 |
| 11,167,933 | B2 * | 11/2021 | Heim | B65B 37/04 |
| 11,305,898 | B2 | 4/2022 | Holmes | |
| 2002/0014053 | A1 | 2/2002 | Kim | |
| 2002/0092275 | A1 | 7/2002 | Kim | |
| 2002/0130066 | A1 | 9/2002 | Yuyuma et al. | |
| 2003/0034354 | A1 * | 2/2003 | Chirnomas | G07F 11/04 221/2 |
| 2003/0111484 | A1 * | 6/2003 | Pearson | G07F 17/0092 221/211 |
| 2003/0116068 | A1 * | 6/2003 | Sauder | A01C 7/0443 111/180 |
| 2004/0176873 | A1 | 9/2004 | Kim | |
| 2005/0021173 | A1 | 1/2005 | Pinney et al. | |
| 2005/0204972 | A1 * | 9/2005 | Eben | A01C 7/0443 111/185 |
| 2005/0234591 | A1 | 10/2005 | Kim | |
| 2005/0244510 | A1 | 11/2005 | Smith | |
| 2006/0006190 | A1 * | 1/2006 | Janet | G07F 17/0092 221/211 |
| 2006/0118573 | A1 * | 6/2006 | Ganz | G07F 13/025 221/254 |
| 2006/0271237 | A1 | 11/2006 | Kim | |
| 2007/0129844 | A1 | 6/2007 | Kim | |
| 2008/0011764 | A1 | 1/2008 | Geltser et al. | |
| 2008/0061074 | A1 | 3/2008 | Remis et al. | |
| 2008/0119958 | A1 | 5/2008 | Bear et al. | |
| 2008/0179387 | A1 | 7/2008 | Cantlay et al. | |
| 2008/0307757 | A1 | 12/2008 | Heim et al. | |
| 2009/0055116 | A1 | 2/2009 | Chen et al. | |
| 2009/0057328 | A1 * | 3/2009 | Ratnakar | G07F 11/26 221/1 |
| 2009/0094947 | A1 | 4/2009 | Aylward | |
| 2009/0138122 | A1 | 5/2009 | Wagner | |
| 2010/0108405 | A1 * | 5/2010 | Kieselhorst | G01G 19/393 177/25.18 |
| 2010/0115892 | A1 | 5/2010 | Aylward et al. | |
| 2010/0268376 | A1 * | 10/2010 | Janet | G07F 11/44 221/221 |
| 2011/0113730 | A1 | 5/2011 | Aylward | |
| 2011/0142554 | A1 | 6/2011 | Terzini | |
| 2011/0146835 | A1 | 6/2011 | Terzini | |
| 2011/0278319 | A1 | 11/2011 | Knoth | |
| 2011/0290818 | A1 | 12/2011 | Leifeld et al. | |
| 2012/0200596 | A1 | 8/2012 | Gotou et al. | |
| 2012/0290129 | A1 | 11/2012 | Luciano, Jr. et al. | |
| 2012/0296592 | A1 | 11/2012 | Luciano, Jr. et al. | |
| 2013/0058550 | A1 | 3/2013 | Tanimoto et al. | |
| 2013/0170732 | A1 | 7/2013 | Gotou et al. | |
| 2013/0188038 | A1 | 7/2013 | Tanimoto et al. | |
| 2013/0218326 | A1 | 8/2013 | Chudy et al. | |
| 2013/0240555 | A1 | 9/2013 | Kim | |
| 2014/0097195 | A1 * | 4/2014 | Anthony | G16H 20/13 221/13 |
| 2014/0097197 | A1 * | 4/2014 | Nguyen | A61J 1/03 221/154 |
| 2014/0318078 | A1 * | 10/2014 | Kondo | G16H 20/13 382/141 |
| 2014/0358278 | A1 * | 12/2014 | Zhang | G16H 20/13 700/240 |
| 2015/0039124 | A1 | 2/2015 | Mistovich et al. | |
| 2015/0051730 | A1 | 2/2015 | Portney et al. | |
| 2015/0069080 | A1 | 3/2015 | DiMartino et al. | |
| 2015/0129603 | A1 | 5/2015 | Koike et al. | |
| 2015/0196459 | A1 * | 7/2015 | Pearson | A61J 7/02 221/211 |
| 2015/0367970 | A1 | 12/2015 | Barrett et al. | |
| 2016/0075460 | A1 * | 3/2016 | Despa | A61J 7/0084 700/240 |
| 2016/0122045 | A1 | 5/2016 | Kames et al. | |
| 2016/0122060 | A1 | 5/2016 | Sweet et al. | |
| 2016/0159554 | A1 * | 6/2016 | Daniels | B65G 47/1492 221/253 |
| 2016/0199260 | A1 | 7/2016 | Andersen, Sr. | |
| 2016/0247345 | A1 * | 8/2016 | Ratnakar | G16H 70/40 |
| 2016/0304229 | A1 * | 10/2016 | Hellenbrand | B65B 9/08 |
| 2017/0020785 | A1 | 1/2017 | McCullough | |
| 2017/0081069 | A1 | 3/2017 | Murokh | |
| 2017/0132867 | A1 | 5/2017 | Berg et al. | |
| 2017/0254762 | A1 | 9/2017 | Yoo | |
| 2017/0270274 | A1 * | 9/2017 | García | A61J 7/0084 |
| 2017/0301087 | A1 | 10/2017 | Yuyama et al. | |
| 2017/0304153 | A1 * | 10/2017 | Williamson | G07F 17/0092 |
| 2017/0305589 | A1 | 10/2017 | Yuyama et al. | |
| 2017/0312182 | A1 | 11/2017 | Ma | |
| 2017/0341110 | A1 | 11/2017 | Ackley et al. | |
| 2017/0351839 | A1 * | 12/2017 | Hellenbrand | B65G 1/0407 |
| 2017/0354574 | A1 | 12/2017 | Feng et al. | |
| 2017/0357775 | A1 | 12/2017 | Ekin | |
| 2018/0068087 | A1 | 3/2018 | Garcia et al. | |
| 2018/0170591 | A1 | 6/2018 | Koike et al. | |

(56) References Cited

U.S. PATENT DOCUMENTS

| | | | | |
|---|---|---|---|---|
| 2018/0225818 | A1 | 8/2018 | Jacobs et al. | |
| 2019/0112080 | A1* | 4/2019 | Holmes | B65B 57/14 |
| 2020/0165014 | A1 | 5/2020 | Holmes | |

FOREIGN PATENT DOCUMENTS

| | | | | |
|---|---|---|---|---|
| EP | 0295872 | A2 | 12/1988 | |
| EP | 3081500 | A1 * | 10/2016 | B65B 57/14 |
| JP | 62-028319 | A | 2/1987 | |
| JP | 2005192702 | A | 7/2005 | |
| WO | WO-2010115208 | A1 * | 10/2010 | G07F 11/002 |
| WO | 2012163710 | A1 | 12/2012 | |
| WO | WO-2015084640 | A1 * | 6/2015 | A61J 7/02 |
| WO | 2016141102 | A1 | 9/2016 | |
| WO | 2017159819 | A1 | 9/2017 | |

OTHER PUBLICATIONS

International Search Report and Written Opinion for Application No. PCT/US2018/055880 dated Feb. 15, 2019 (22 pages).

Supplementary Search Report issued from the European Patent Office for related Application No. EP18865828 dated Jun. 4, 2021 (8 Pages).

Notice of Reasons for Rejection issued from the Japanese Patent Office for related Application No. 2020-542049 dated Aug. 9, 2022 (16 Pages including English Translation).

IP Australia Examination Report No. 1 for standard patent application No. 2018347638, dated Sep. 14, 2023 (6 pages).

Japanese Patent Office Notice of Reason(s) for Rejection for application No. 2023-041759, dated Aug. 29, 2023 (5 pages with translation).

Korean Patent Office Action for Application No. 10-2020-7011884, dated Oct. 24, 2023 (9 pages with translation).

European Patent Office. Office Action for related Application No. EP18865828 dated Sep. 3, 2024 (5 Pages).

Japanese Patent Office Notice of Reason(s) for Rejection for Application No. 2024-025301, dated Nov. 26, 2024 (8 pages with translation).

Canadian Patent Office. Office Action for Application No. 3,078,492, dated Dec. 17, 2024 (4 pages).

IP Australia Examination Report No. 1 for standard patent Application No. 2024202766, dated Apr. 10, 2025 (3 pages).

* cited by examiner

UNIVERSAL FEED MECHANISM FOR AUTOMATIC PACKAGER

FIELD OF THE INVENTION

The present invention relates to an automatic packager for medications. More particularly, the present invention relates to a feed mechanism for providing medications to an automatic packager.

SUMMARY

One embodiment provides a cartridge for an automatic packager including a reservoir for storing a plurality of medications and a wheel including a bottom portion placed in the reservoir. The wheel is rotatable with respect to the reservoir. The cartridge also includes a scooping member provided on the wheel to rotate with the wheel and singulate a medication from the reservoir.

Another embodiment provides a cartridge mechanism for an automatic packager including a platform configured to receive a medication from a cartridge and a camera system. The cartridge mechanism also includes an electronic processor coupled to the camera system. The electronic processor is configured to control the camera system to capture an image of the platform and determine whether an expected medication was delivered to the platform based on the image. The electronic processor is also configured to dispense the medication from the cartridge in response to determining that the expected medication is delivered to the platform. The electronic processor is further configured to return the medication to the cartridge in response to determining that the expected medication is not delivered to the platform.

Another embodiment provides a method of dispensing medications from a cartridge using a cartridge mechanism. The method includes delivering a medication to a platform of the cartridge mechanism and controlling, using the electronic processor, a camera system to capture an image of the platform. The method also includes determining, using the electronic processor, whether an expected medication was delivered to the platform based on the image. The method includes dispensing the medication from the cartridge in response to determining that the expected medication is delivered to the platform and returning the medication to the cartridge in response to determining that the expected medication is not delivered to the platform.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Pharmacies use several types of packaging to provide pharmaceutical products or medications to consumers. The types of packaging may include strip packages, blister cards, and the like. Most pharmacies use automatic packagers in order to package medications into strip packages or blister cards and to provide instructions on these packages. In some embodiments, blister cards may also be packaged by hand by a pharmacist or pharmacy technician. The automatic packagers allow the pharmacies to serve a large number of customers by packaging the medications efficiently. The automatic packagers include a motor base to receive one or more cassettes. Each cassette stores one particular kind or size of medication and is operated by the motor base to dispense the medications one by one into the packager.

Due to the mechanism involved in individually dispensing medications from the cassettes, the cassettes are expensive, store a limited amount of medications, and take a lot of space. Pharmacies may have to maintain a large number of cassettes to service the patients, which compounds the cost. Cassettes also lack verification systems to verify that medications are properly being dispensed from the cassettes.

In order to reduce the cost to the pharmacies, independent embodiments of the present invention provide a universal feed mechanism for packagers that allow pharmacies to use inexpensive universal bulk canisters to store and to dispense different types (e.g., shapes, sizes, etc.) of medications to the packagers. The universal canisters have a high capacity to store several hundreds of medications. As referred to here, medications may include pills, capsules, tablets, and the like.

Figure 1A:
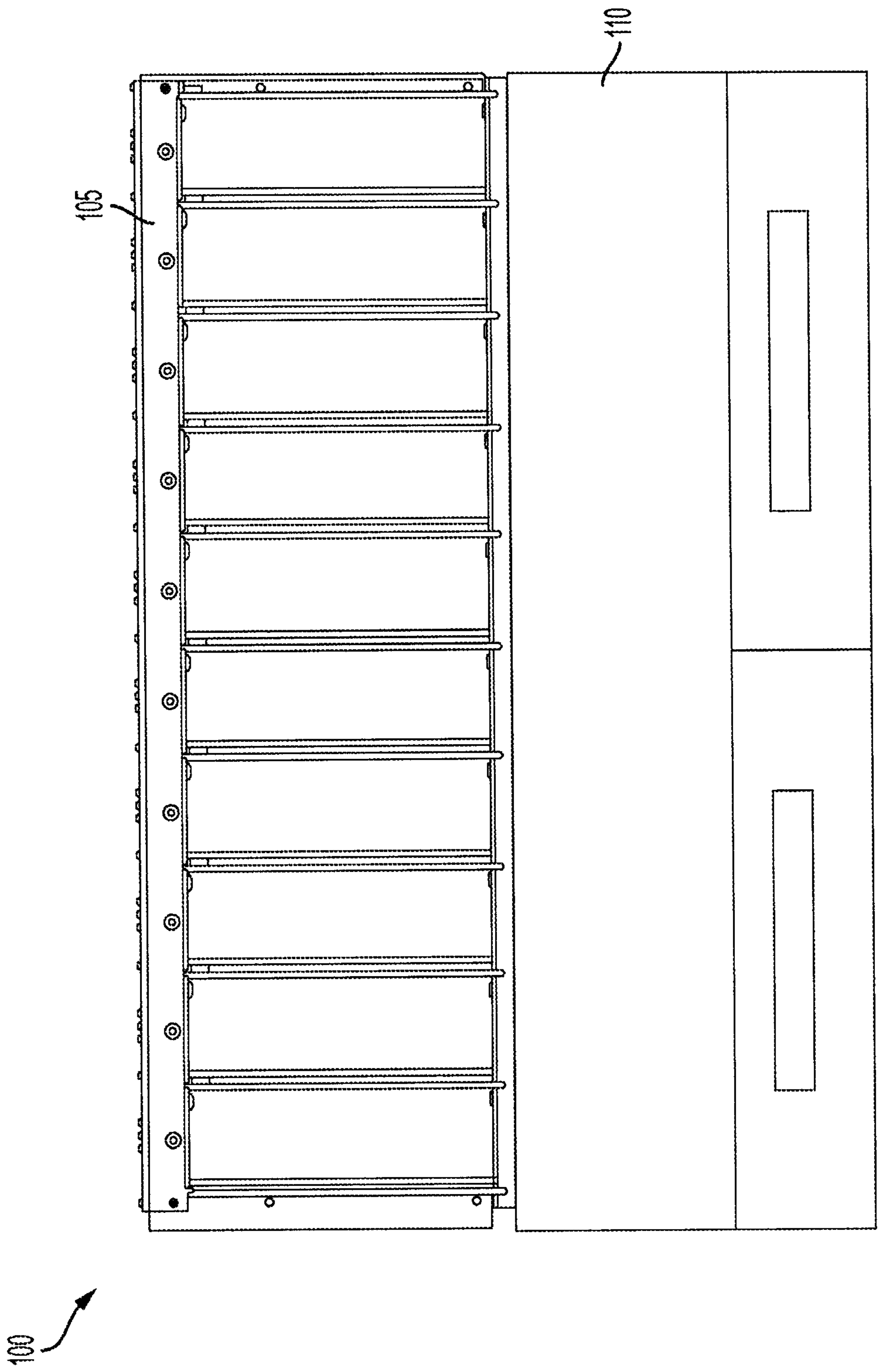
FIGS. 1A-C are plan views of an automatic packager in accordance with some embodiments.
Figure 1B:
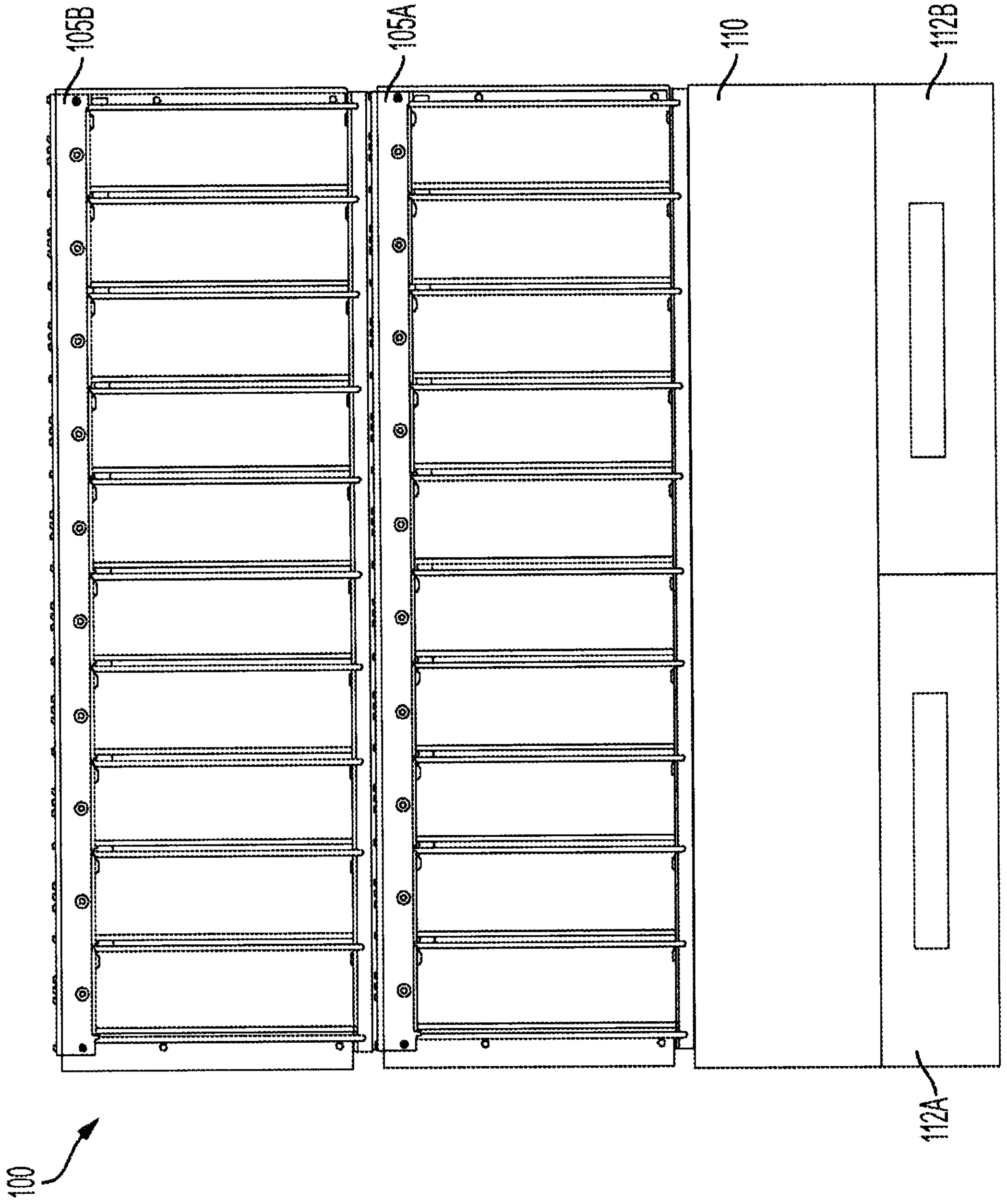
Figure 1C:
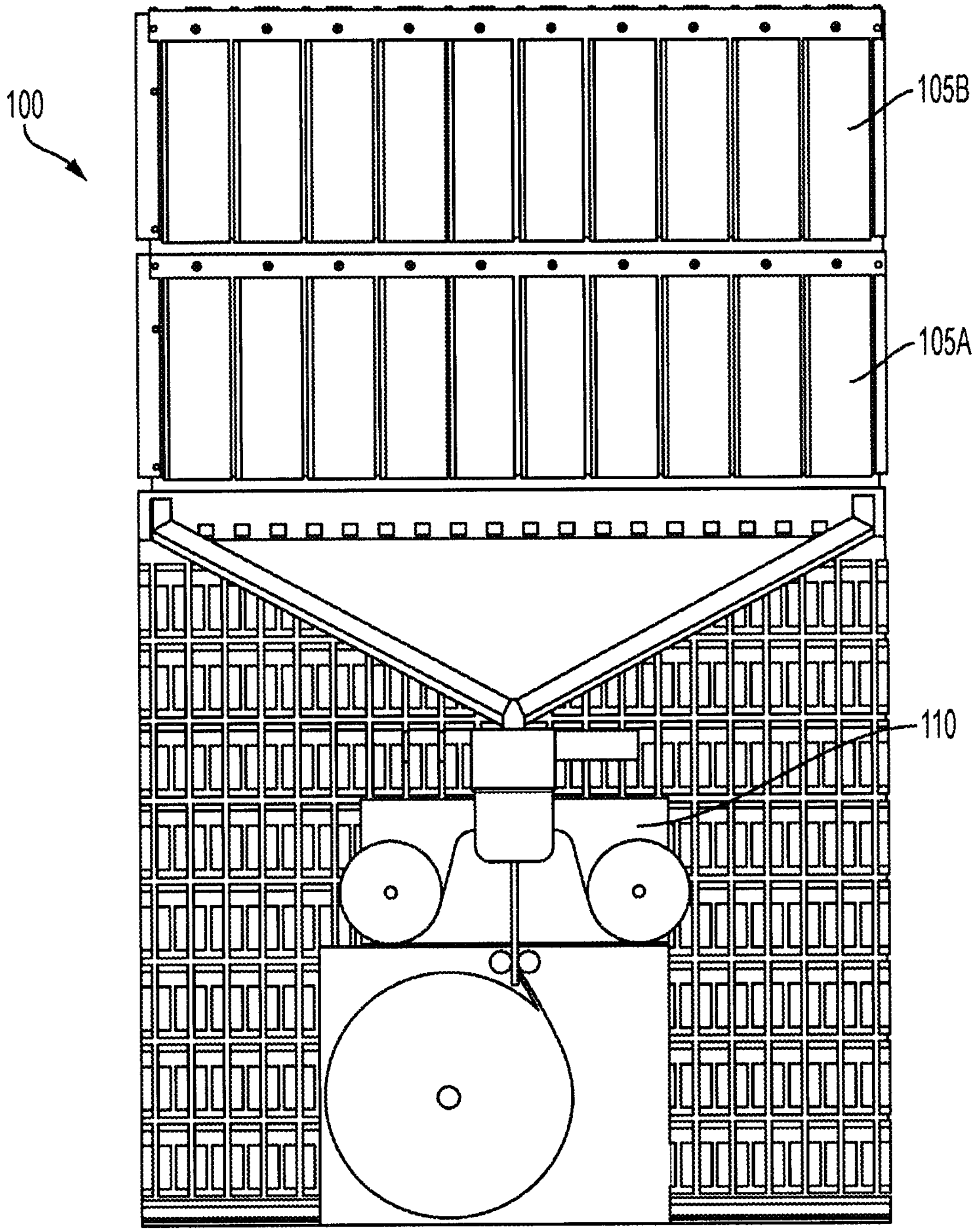

FIGS. 1A-C illustrate example automatic packagers 100 including a first universal feed cassette 105A, a second universal feed cassette 105B, and a packaging unit 110. The first universal feed cassette 105A and the second universal feed cassette 105B may be collectively referred to as a universal feed cassette 105. The universal feed cassette 105 receives medications from the bulk canisters and individually dispenses pills to the packaging unit 110. Each universal feed cassette 105 may dispense 10 separate pills at the same time. In the arrangements illustrated in FIGS. 1B and 1C including two universal feed cassettes 105, the automatic packager 100 may be used to dispense and package twenty different pills at the same time. In some embodiments, the automatic packager 100 may include only a single universal feed cassette 105.

The packaging unit 110 receives the individual pills and packages them into a blister card or pouch packages to be provided to the consumer. In the example illustrated in FIGS. 1A and 1B, the packaging unit is a blister card packager 110. The blister card packager 110 receives individual medications from the universal feed cassette 105 and packs them into blister cards for distribution to consumers. The blister card packager 110 includes a first drawer 112A and a second drawer 112B. The blister card packager 110 alternates between packing a blister card in the first drawer 112A and the second drawer 112B. As such, the pharmacist may access the first drawer 112A to remove a packed blister card while the blister card packager 110 is packing a blister card in the second drawer 112B. In some embodiments, the blister cards may be automatically packaged and the label may be automatically applied by the blister card packager 110. Alternatively, the blister cards may be packaged and the label may be applied by a pharmacist or pharmacy technician.

In the example illustrated in FIG. 1C, the packaging unit is a strip packager 110. An example strip packager is described in U.S. Patent Application Publication No. 2013/0318931 and U.S. Patent Application Publication No. 2017/0015445, the entire contents of both of which are hereby incorporated by reference. FIGS. 1A-C illustrate only example embodiments of an automatic packager 100. The automatic packager 100 may include more or fewer components than those illustrated in FIGS. 1A-C and may perform functions other than those explicitly described herein.

Figure 2:
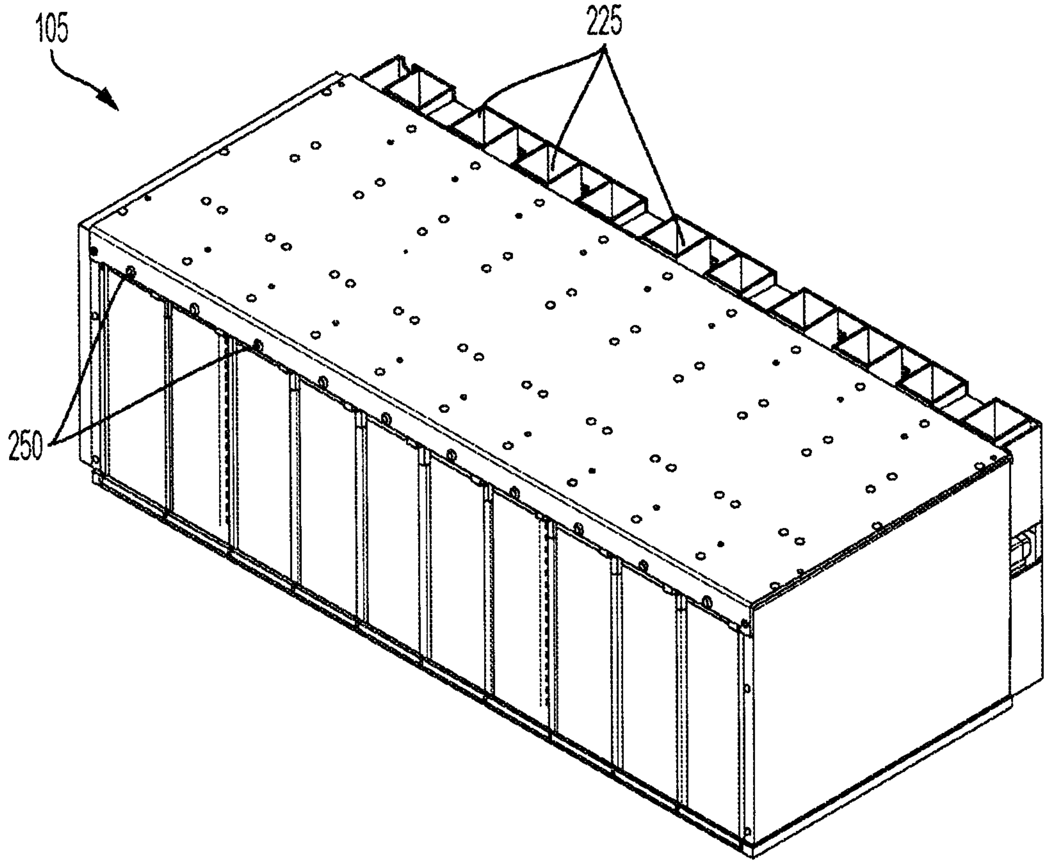
FIG. 2 is a perspective view of a universal feed cassette in accordance with some embodiments.
Figure 3:
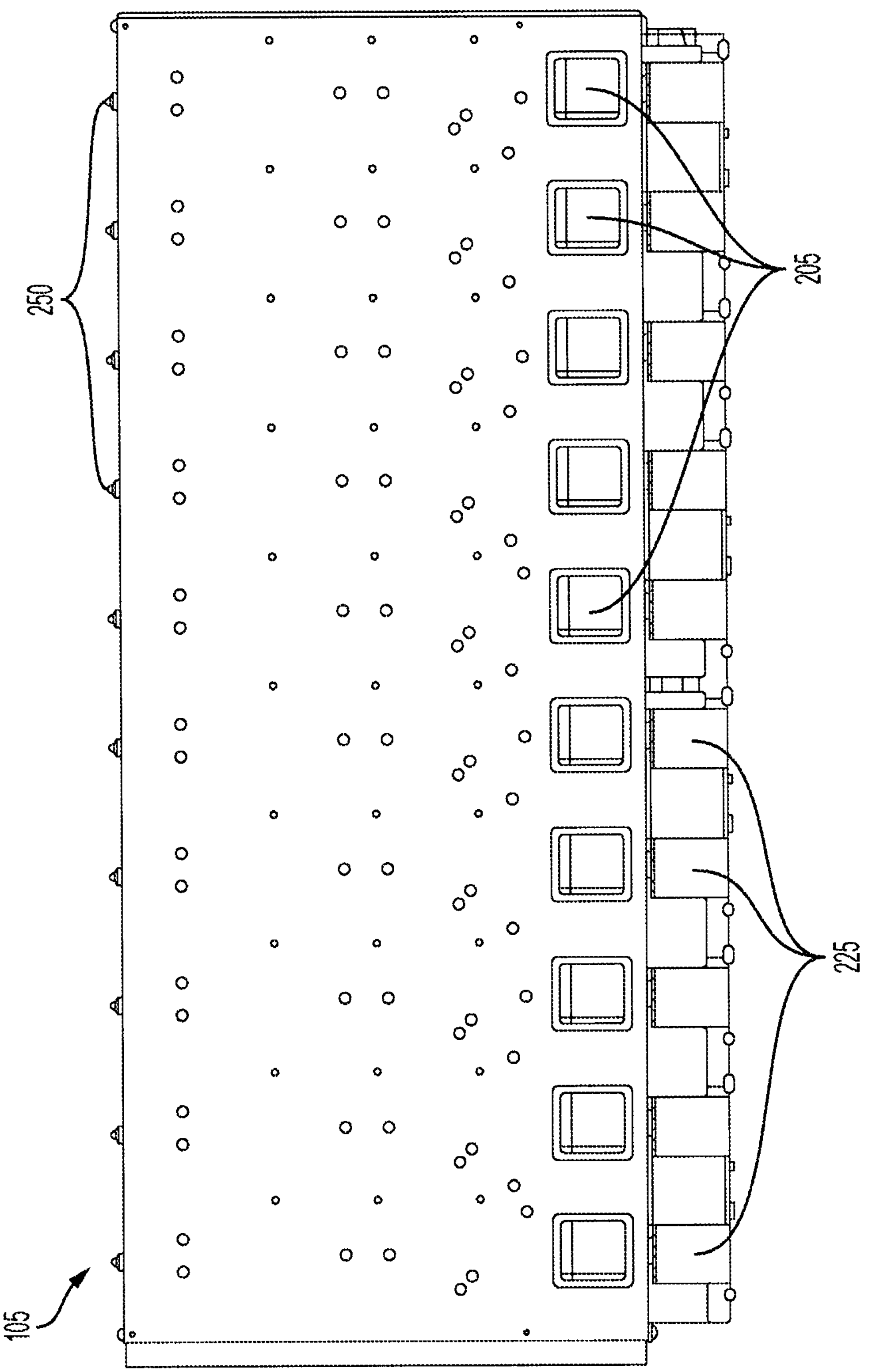
FIG. 3 is a bottom plan view of the universal feed cassette of FIG. 2 in accordance with some embodiments.
Figure 4:
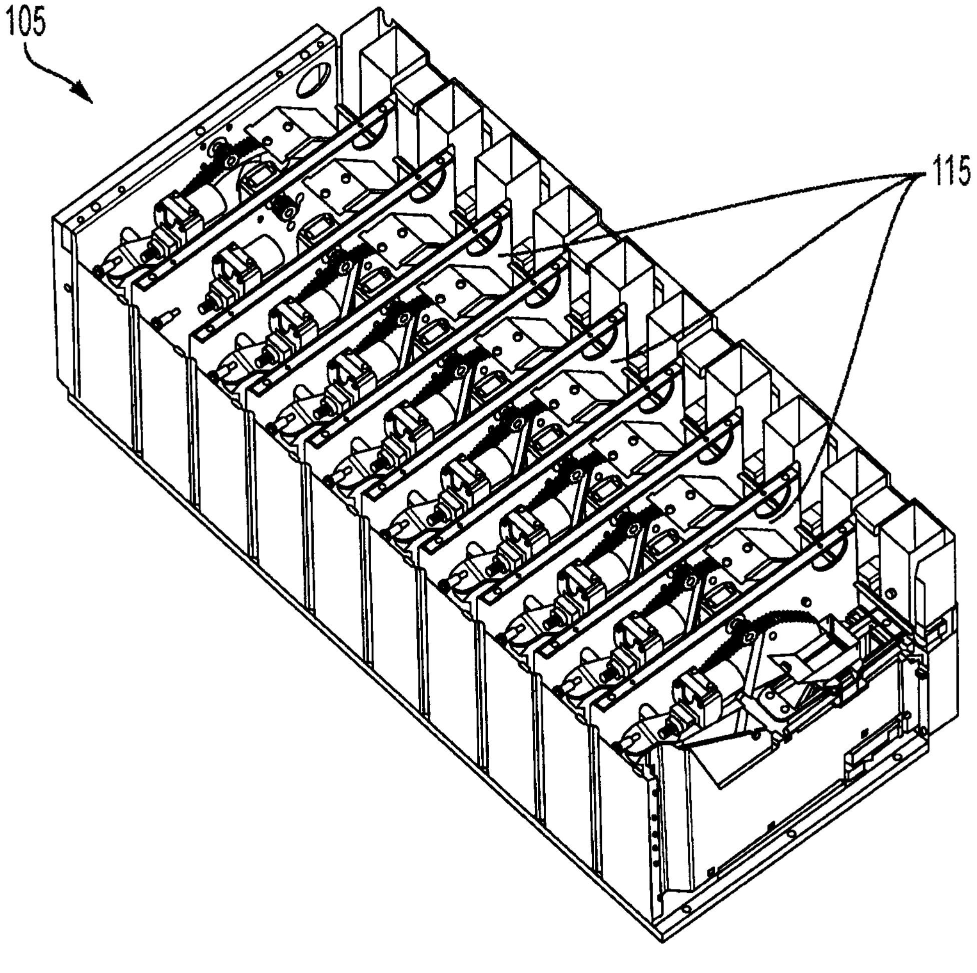
FIG. 4 is a perspective view of the universal feed cassette of FIG. 2 with top and side frames removed in accordance with some embodiments.
Figure 5:
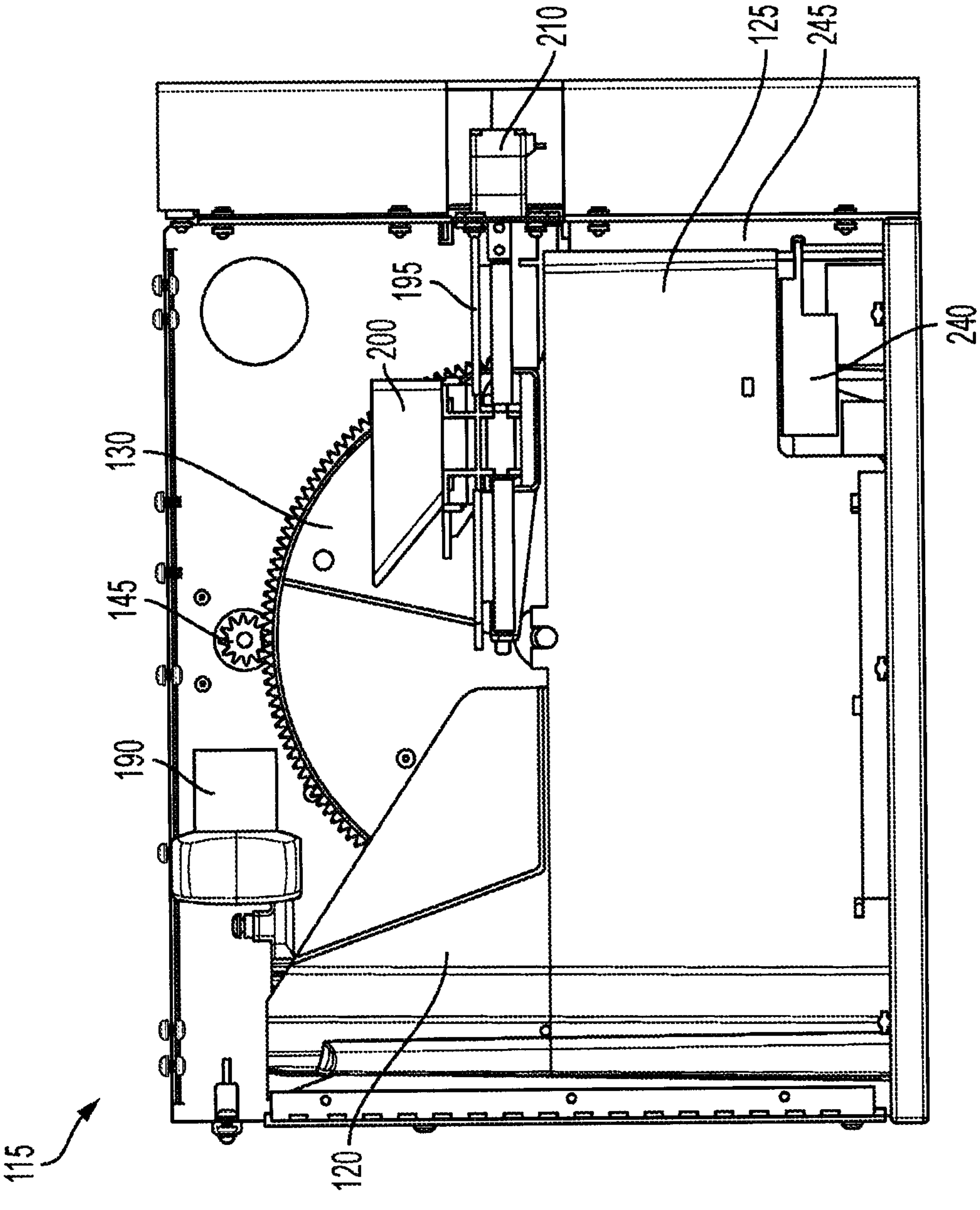
FIG. 5 is a front plan view of a cartridge of the universal feed mechanism of FIG. 2 in accordance with some embodiments.

FIGS. 2-6 illustrate multiple views of the universal feed cassette 105. As shown in FIG. 4, the universal feed cassette 105 includes a plurality of cartridges 115 arranged within the housing of the universal feed cassette 105. In one example, the universal feed cassette may include up to ten cartridges 115. A pharmacist may load medications from bulk canisters into each of the cartridges 115. The same medications may be loaded into each cartridge 115, or different medications may be loaded into each cartridge 115. The cartridges 115 independently dispense the medications to the packaging unit 110.

Referring to FIGS. 2 and 3, the universal feed cassette 105 includes a dispensing opening 205 through which the cartridges dispense medications to the packaging unit 110. Additionally, the universal feed cassette 105 also includes pass-through conduits 225 at the rear of the universal feed cassette 105. On the automatic packager 100, the pass-through conduits 225 of the first universal feed cassette 105A are aligned with the dispensing openings 205 of the second universal feed cassette 105B. As such, the packaging unit 110 receives medications from the first universal feed cassette 105A through the dispensing openings 205 of the first universal feed cassette 105A and receives the medications from the second universal feed cassette 105B through the pass-through conduits 225 of the first universal feed cassette 105A.

As shown in FIGS. 5-7 and 11, each cartridge 115 includes a spout 120, a reservoir 125, a wheel 130, a camera system 135, and a shuttle system 140 (for example, a verification system). The cartridge 115 also includes other electronics and sensors that are not illustrated. The spout 120 is provided on top of the reservoir 125 to guide the medications from the bulk canister to the reservoir 125. The reservoir 125 stores the medications during the dispensing process. The reservoir 125 and the spout 120 are disengageable from the cartridge 115, allowing a pharmacist to remove the reservoir 125 and the spout 120 after the dispensing process. The pharmacist may return any unused medications after the dispensing process to the bulk container by detaching the reservoir 125 and emptying the reservoir 125 into the bulk container using the spout. The pharmacist may also clean the spout 120 and the reservoir 125 if the cartridge 115 is going to be loaded with a different type of medications.

Figure 6:
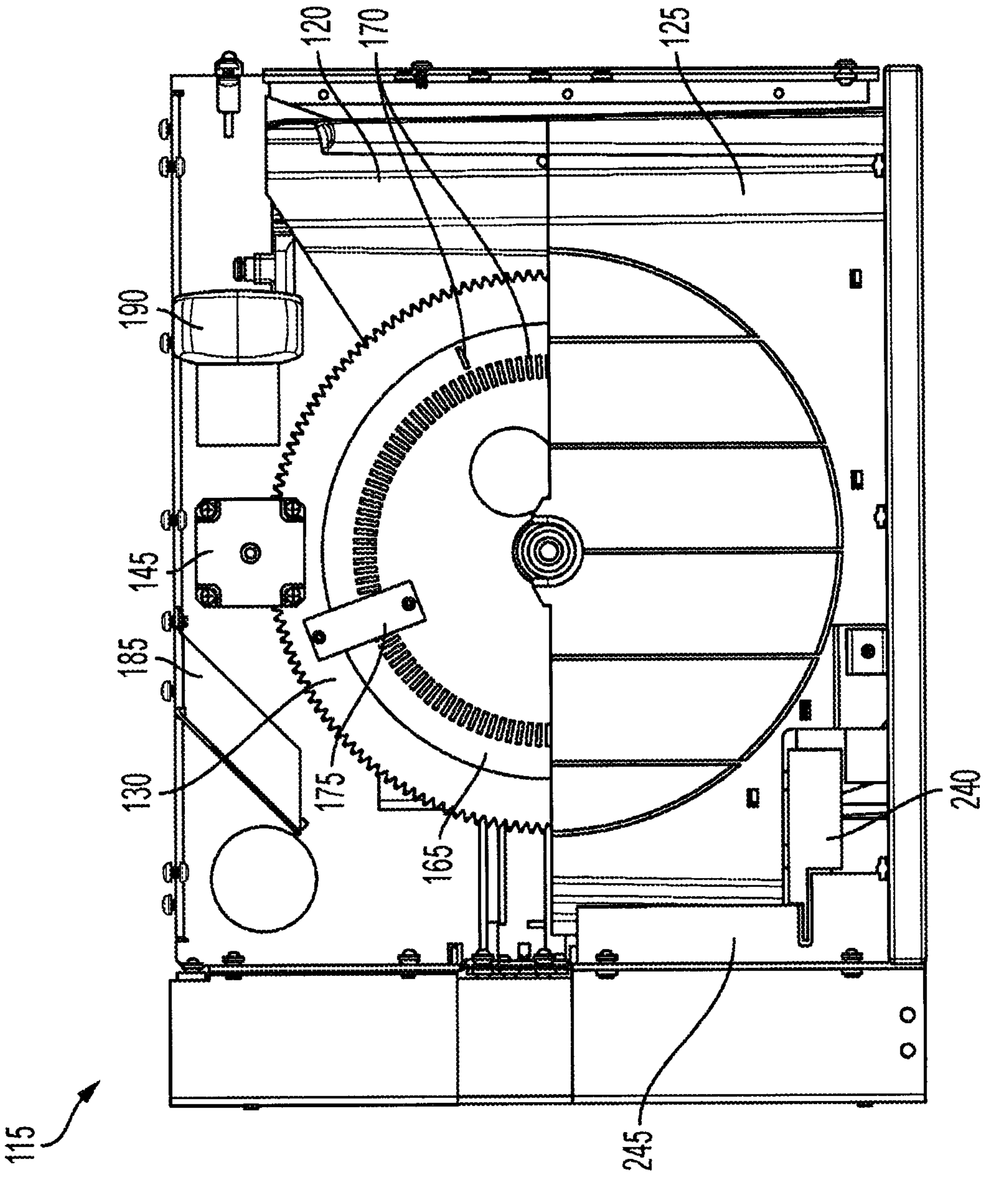
FIG. 6 is a back plan view of the cartridge of FIG. 5 in accordance with some embodiments.
Figure 7:
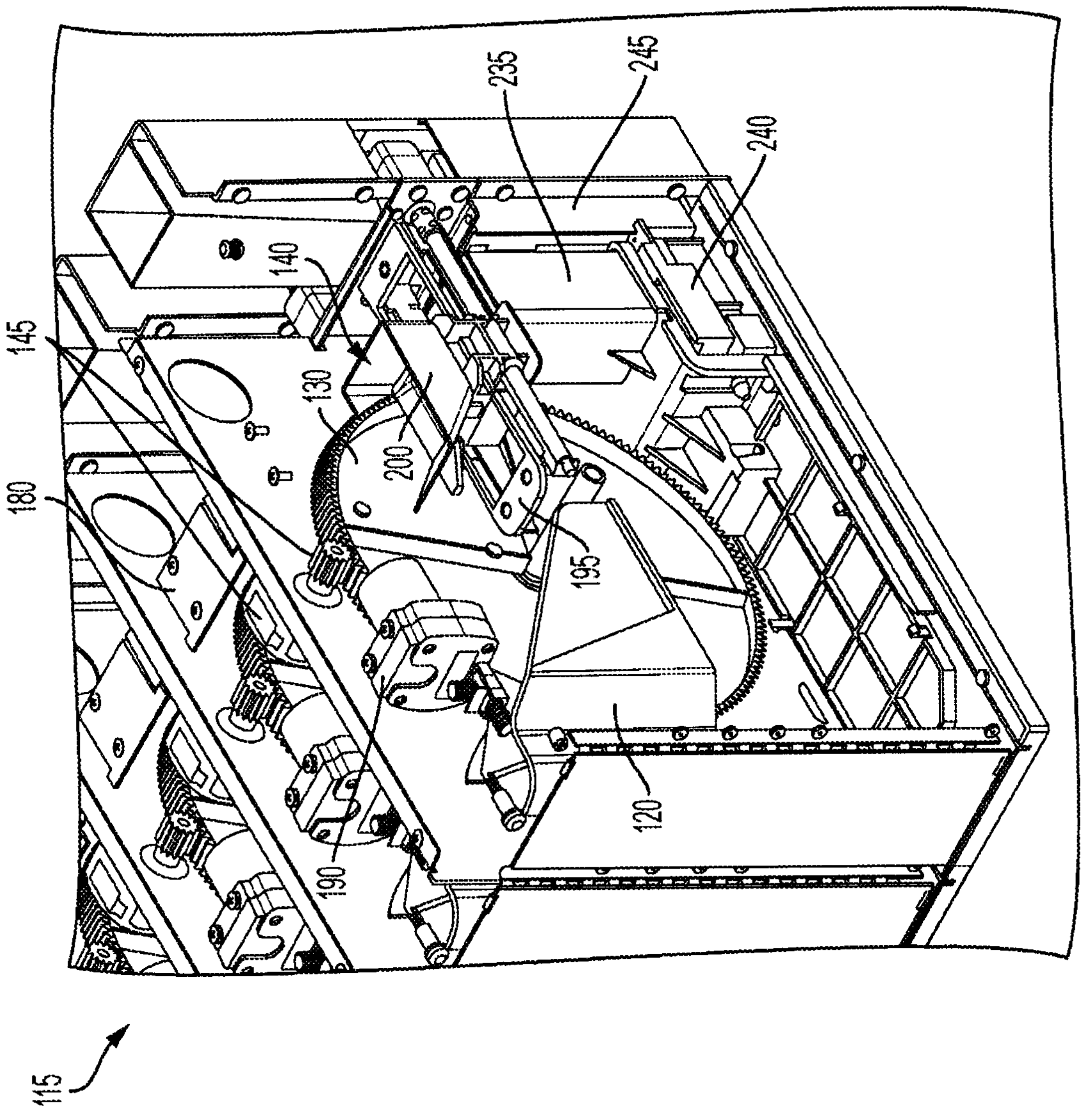
FIG. 7 is a perspective view of the cartridge of FIG. 5 with a reservoir removed, in accordance with some embodiments.

The wheel 130 is provided inside the cartridge 115 and includes a bottom portion that is placed in the reservoir 125. The wheel 130 is driven by a motor assembly 145 provided at the top of the cartridge 115. Particularly, the wheel 130 includes teeth that interlock with the motor assembly 145 and the motor assembly 145 rotates the wheel 130 using the interlocking teeth of the wheel and the motor assembly 145. Referring to FIG. 6, a sensor disk 165 is fixed to the rear surface of the wheel 130 and includes magnetic bars 170. The magnetic bars 170 are detected by a position sensor 175 of the motor assembly 145 to determine the speed and/or position of the wheel 130. The position sensor 175 is fixed to a side housing of the cartridge 115 such that the position sensor 175 is aligned with the magnetic bars 170 of the sensor disk 165. In one example, the position sensor 175 is a Hall-effect sensor.

Figure 8:
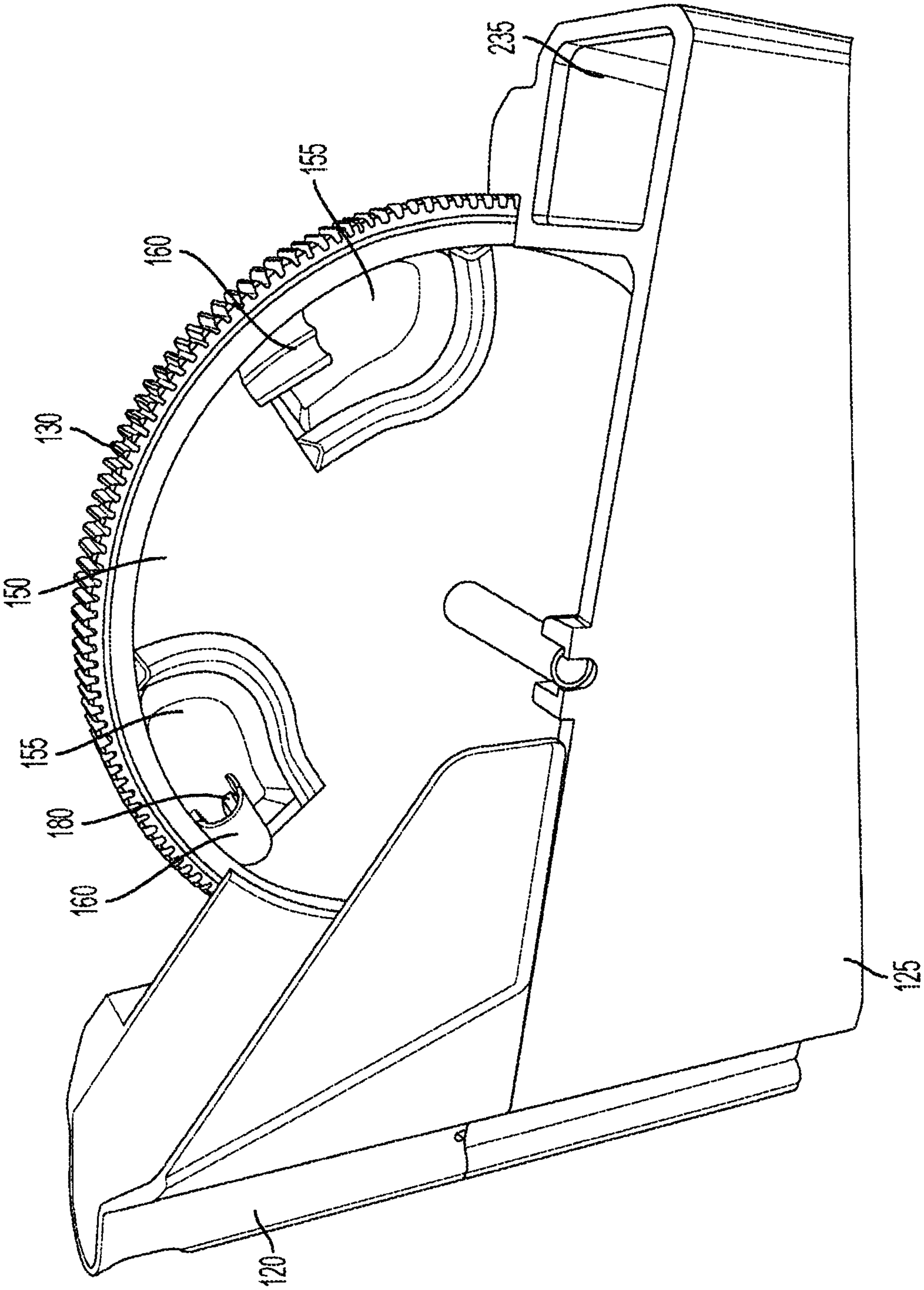
FIG. 8 is a perspective view of a scooping disc of the cartridge of FIG. 5 in accordance with some embodiments.
Figure 9A:
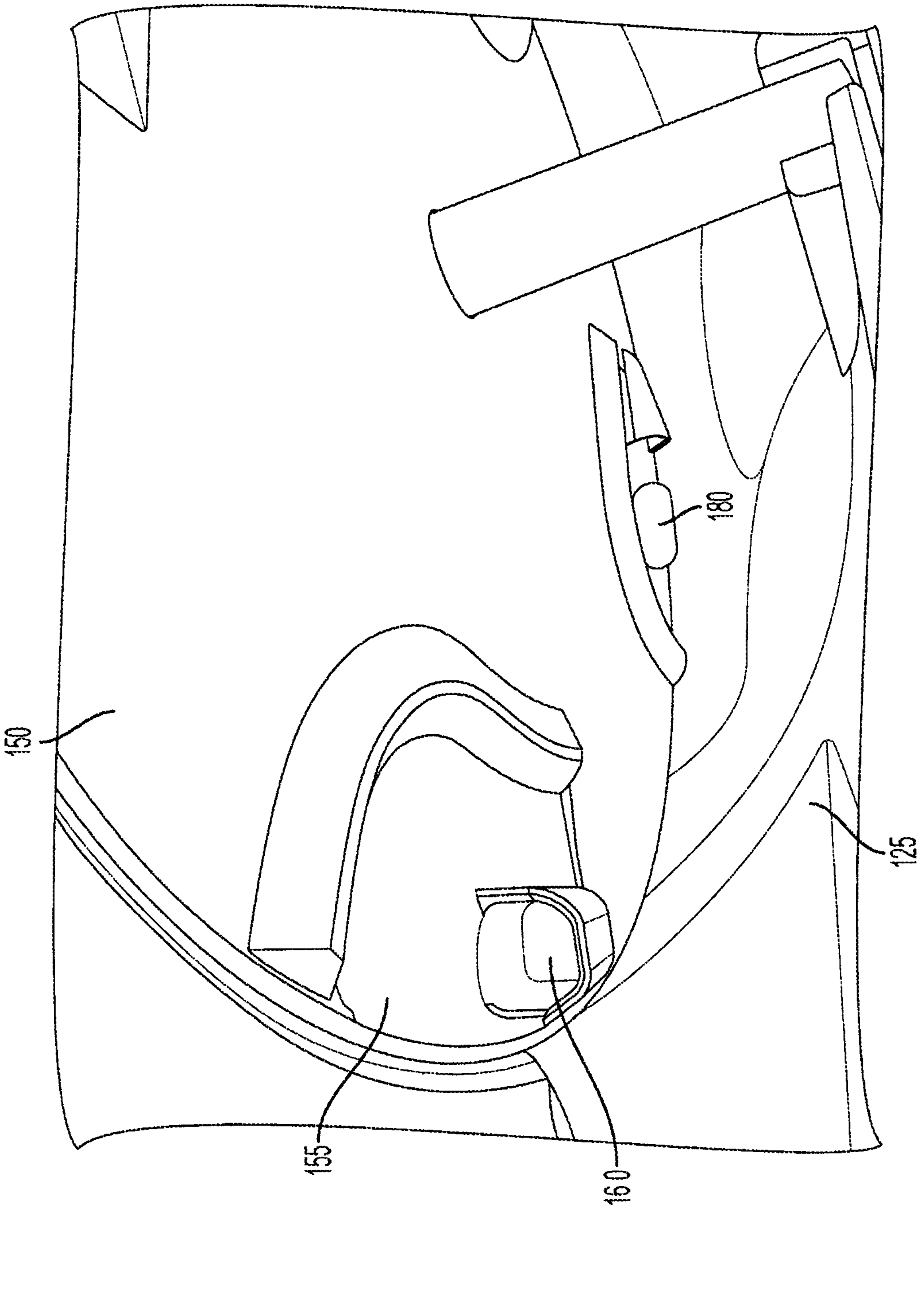
FIGS. 9A and 9B are perspective views of the scooping disc of FIG. 8 in accordance with some embodiments.
Figure 9B:
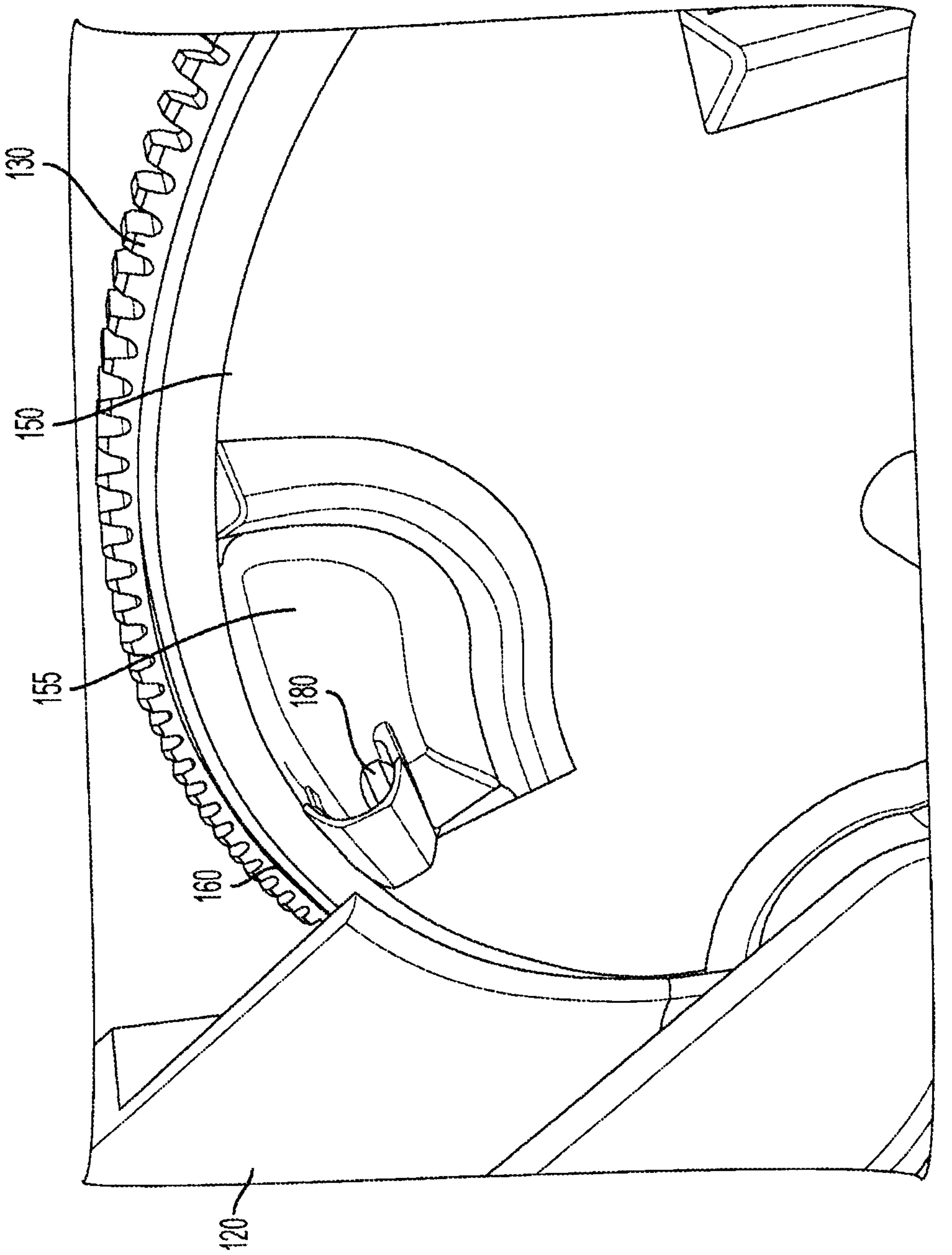

Referring to FIGS. 8-9B, a scooping disc 150 (for example, a scooping member or scooping attachment) snaps on to the wheel 130 to scoop medications 180 from the reservoir 125. The scooping disc 150 includes one or more inward projections 155 and a pocket 160 at an outer corner of the inward projection 155. In the illustrated example, the scooping disc 150 includes four inward projections 155 and four pockets 160. The inward projections 155 project into the disc towards the wheel 130. During rotation of the wheel 130, when the inward projections 155 encounter the reservoir 125 and the multitude of medications 180 in the reservoir 125, the medications 180 move inward into the inward projections 155. The medications 180 are oriented in a direction of the pocket 160 due to the rotation of the wheel 130 and the inward projections 155. The pocket 160 scoops individual medications 180 when the pocket 160 is rotated past the oriented medications 180. The motor assembly 145 continues to rotate the wheel 130 such that the pocket 160 moves past the top of the wheel 130 and delivers the scooped medication 180 to the shuttle system 140. In some embodiments, rather than the inward projection 155 and the pocket 160, the scooping disc 150 may include holes to pick up medications 180. In these embodiments, a vacuum system may be used to pick up medications 180 from the reservoir 125. For example, a vacuum pump may be placed at the back of the wheel 130 to provide a vacuum force through the holes. When the holes are moved to the reservoir 125 by the rotation of the wheel 130, the vacuum force causes the medications 180 to be stuck to the holes. In some embodiments, rather than being separate from the wheel 130, the scooping disc 150 (for example, scooping member) may be formed integrally with the wheel 130. The wheel 130 and the scooping disc 150 may together be referred to as a singulating mechanism.

Each cartridge 115 may include a scooping disc 150 having differently sized inward projections 155 and pockets 160. This allows the different cartridges 115 to be used for different sizes or types of medications 180. The scooping disc 150 may also be detachable such that a pharmacist may change the scooping disc based on the size or type of the medication being dispensed from the cartridge 115.

The medications 180 are individually delivered to the shuttle system 140 when the pockets 160 and the puckered projections 155 pass by the shuttle system 140. The camera system 135 may be used to verify that an expected medication 180 (for example, only a single, whole (or unbroken) medication 180) is delivered to the shuttle system 140. The illustrated camera system 135 includes a mirror 185 placed over the shuttle system 140 and a camera 190 placed on top of the spout 120. The mirror 185 is slanted such that the camera 190 may acquire an image of the contents of the shuttle system 140. The camera system 135 may additionally include a lighting system (e.g., an LED lighting system) to illuminate the contents of the shuttle system 140 when the camera 190 is capturing an image.

Figure 10:
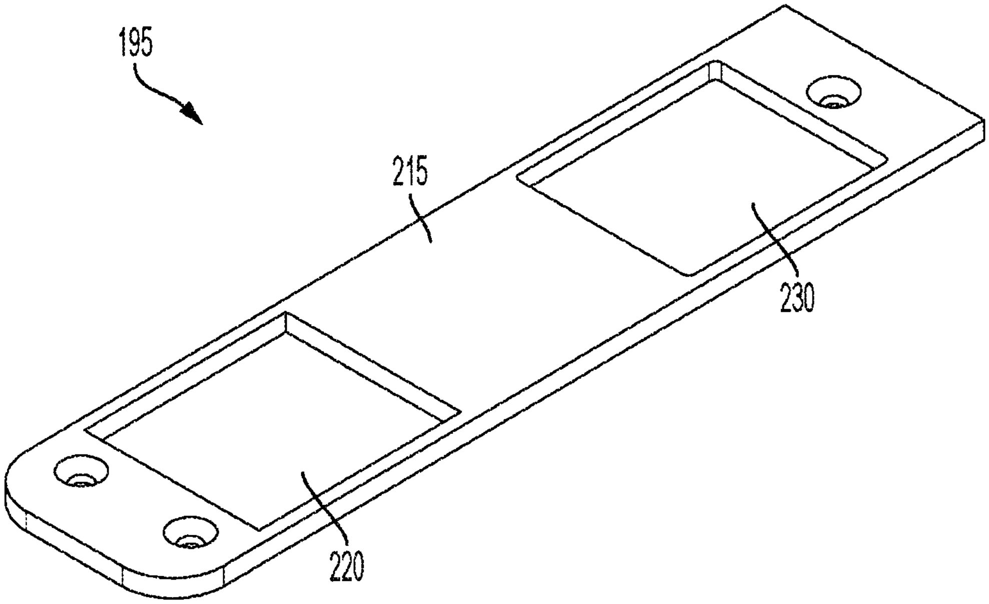
FIG. 10 is a perspective view of a platform of the cartridge of FIG. 5 in accordance with some embodiments.

The shuttle system 140 includes a platform 195, a shuttle 200, and a shuttle drive 210. Referring to FIG. 10, the platform 195 includes a base portion 215 in the middle, a first opening 220 on a first side of the base portion 215, and a second opening 230 on a second side of the base portion 215. The first opening 220 is positioned over the reservoir 125 to return the one or more medications 180 to the reservoir 125. The second opening 230 is positioned over a dispensing opening 205 (shown in FIG. 3) provided at a bottom of each cartridge 115. The platform 195 may be made from a clear or translucent plastic material. An LED lighting system, as described above, may be provided over and/or under the platform 195 to illuminate the contents on the base portion 215 of the platform 195 when the camera system 135 is capturing an image of the contents. The LED lighting system may emit visible or infrared light to illuminate the base portion 215 for the camera 190.

The shuttle 200 may be moved between the base portion 215, the first opening 220, and the second opening 230. The shuttle 200 transfers the medications from the base portion 215 either to the reservoir 125 through the first opening 220 or to the dispensing opening 205 through the second opening 230. The shuttle 200 is driven by a shuttle drive 210. The shuttle drive 210 may be a motor assembly, an actuator, or the like that moves the shuttle 200 between the base portion 215, the first opening 220 (e.g., a first position), and the second opening 230 (e.g., a second position).

Referring back to FIGS. 5-7, the cartridge 115 may additionally include a conduit 235 (FIG. 7) between the second opening 230 and the dispensing opening 205. A pill sensor 240 may be provided alongside the conduit 235 that senses whether a pill is dispensed through the conduit 235. The pill sensor 240 may be an object sensor such as an infrared sensor, an ultrasonic sensor, a photoelectric sensor, a light/laser beam, a camera and the like. A PCB assembly 245 including the electronics of the cartridge 115 may also be provided alongside the conduit 235. The PCB assembly 245 is electrically coupled to the camera system 135, the shuttle system 140, and/or the pill sensor 240 to control operation of the cartridge 115.

The universal feed cassette 105 may also include an indicator system 250 (see FIG. 11), for example, an LED indicator system. In the example illustrated, one or more LEDs are provided for each cartridge 115. The indicator system 250 may change colors to indicate the status of each cartridge 115. For example, the indicator system 250 may turn on a green LED to indicate that a cartridge 115 is functioning properly. The indicator system 250 may turn on a red LED to indicate that a cartridge 115 is empty or that there is a jam in a cartridge 115. The indicator system 250 may also indicate, for example, whether a cartridge 115 is locked or unlocked, whether a cartridge 115 needs to be replaced, and the like.

Figure 11:
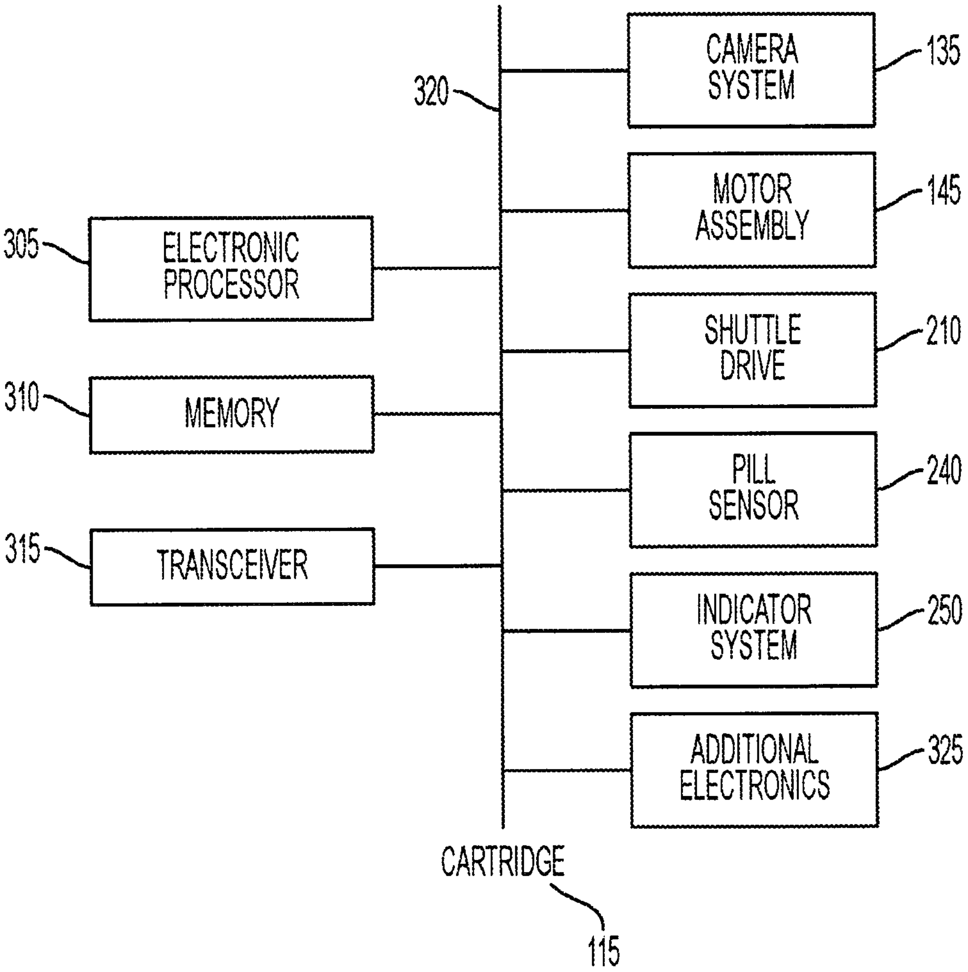
FIG. 11 is a block diagram of the cartridge of FIG. 5 in accordance with some embodiments.

FIG. 11 is a block diagram of one embodiment of the cartridge 115. In the example illustrated, the cartridge 115 includes an electronic processor 305, a memory 310, a transceiver 315, the camera system 135, the shuttle drive 210, and the pill sensor 240. The electronic processor 305, the memory 310, the transceiver 315, the camera system 135, the motor assembly 145, the shuttle drive 210, and the pill sensor 240 communicate over one or more control and/or data buses (for example, a communication bus 320). FIG. 10 illustrates only one example embodiment of the cartridge 115. The cartridge 115 may include more or fewer components and may perform functions other than those explicitly described herein.

In some embodiments, the electronic processor 305 is implemented as a microprocessor with separate memory, such as the memory 310. In other embodiments, the electronic processor 305 may be implemented as a microcontroller (with memory 310 on the same chip). In other embodiments, the electronic processor 305 may be implemented using multiple processors. In addition, the electronic processor 305 may be implemented partially or entirely as, for example, a field-programmable gate array (FPGA), an applications specific integrated circuit (ASIC), and the like, and the memory 310 may not be needed or be modified accordingly. In the example illustrated, the memory 310 includes non-transitory, computer-readable memory that stores instructions that are received and executed by the electronic processor 305 to carry out the functionality of the cartridge 115 described herein. The memory 310 may include, for example, a program storage area and a data storage area. The program storage area and the data storage area may include combinations of different types of memory, such as read-only memory and random-access memory.

The transceiver 315 enables wired or wireless communication between the electronic processor 305 and the control system of the automatic packager 100. In some embodiments, rather than a transceiver 315 the cartridge 115 may include separate transmitting and receiving components, for example, a transmitter and a receiver.

The camera system 135 receives control signals from the electronic processor 305. Based on the control signals received from the electronic processor 305, the camera system 135 controls the camera 190 and the indicator system 250 that illuminates the platform 195. The motor assembly 145 may send position sensor 175 signals to the electronic processor 305 and receive control signals to operate a motor of the motor assembly 145 based on the position sensor signals. As described above, the shuttle drive 210 may be a motor assembly or an actuator. The shuttle drive 210 may also additionally include a position sensor to determine the position of the shuttle 200. The shuttle drive 210 may send the position sensor signals to the electronic processor 305, which sends control signals to the shuttle drive 210 to move the shuttle 200 based on the position sensor signals. In some embodiments, the shuttle system 140 may also include a shuttle home sensor, which indicates whether the shuttle 200 is at a home position. Signals from the shuttle home sensor are provided to the electronic processor 305 to control the movement of the shuttle 200.

The pill sensor 240 communicates with the electronic processor 305 to provide an indication of whether or not a pill is dispensed through the conduit 235. The electronic processor 305 also controls the indicator system 250 to provide an indication of the status of each cartridge 115. The cartridge 115 may also include additional electronics 325 such as a cartridge sensor and a solenoid lock. The cartridge sensor determines whether the cartridge 115 is in a correct position in the universal feed cassette 105 and whether the cartridge 115 is installed properly. The solenoid lock keeps the cartridge 115 in position during a dispensing process to inhibit other medications (e.g., of a different kind than the ones being dispensed by the cartridge 115) from being added to the cartridge 115.

Figure 12:
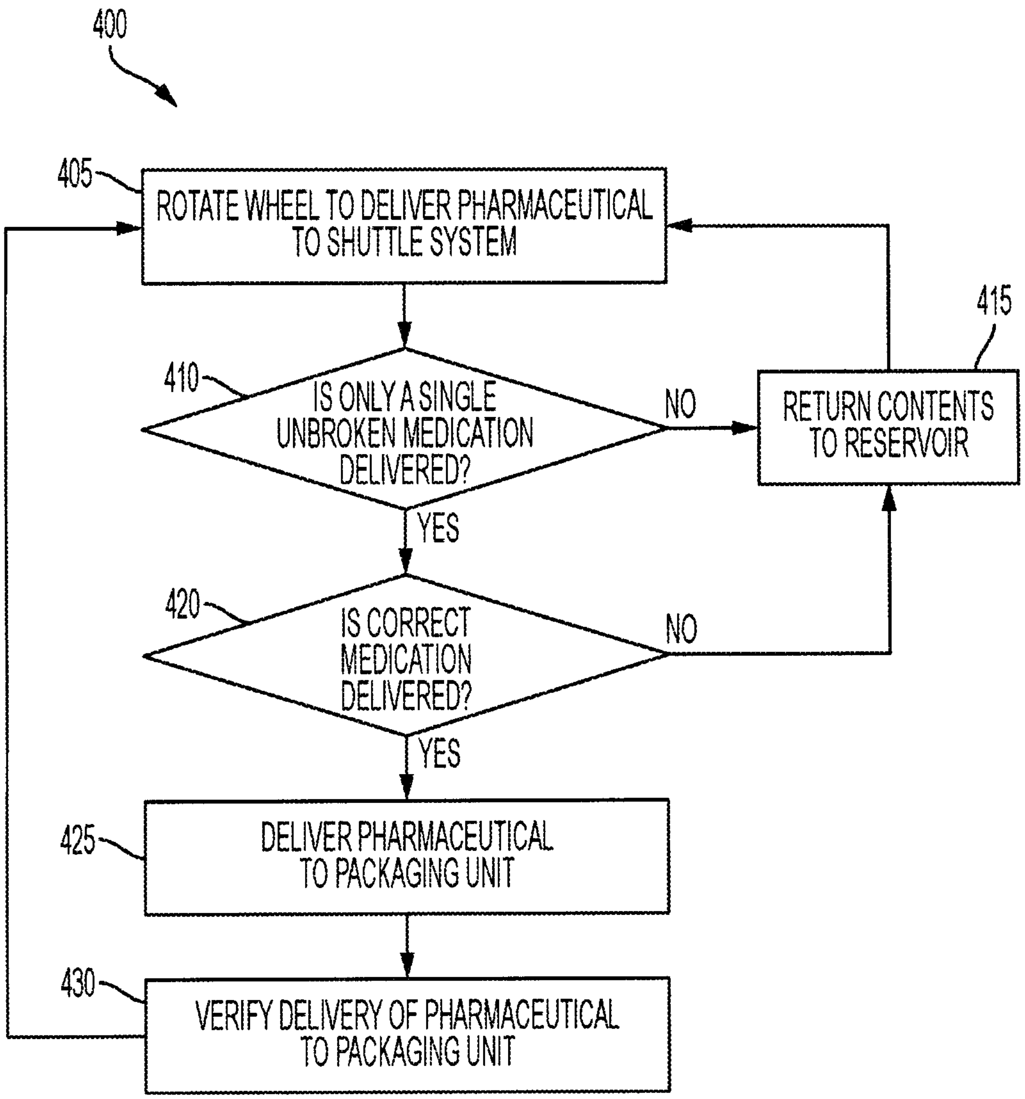
FIG. 12 is a flowchart of a method of dispensing medications from the cartridge of FIG. 5 in accordance with some embodiments.

FIG. 12 is a flowchart illustrating one example method 400 of dispensing medications from the cartridge 115. As illustrated in FIG. 12, the method 400 includes rotating the wheel 130 to deliver a medication 180 to the shuttle system 140 (at block 405). When the dispensing process begins, the electronic processor 305 provides control signals to the motor assembly 145 to rotate the wheel 130. The scooping disc 150 fixed to the wheel 130 scoops individual medications 180 using the pockets 160. In some embodiments, the scooping disc 150 may pick up medications 180 using a vacuum system as described above. In these embodiments, the electronic processor 305 may also provide control signals to operate the vacuum system. The scooping disc 150 delivers the medication 180 to the shuttle system 140 when wheel 130 is rotated such that the pocket 160 is positioned above the shuttle system 140. The medication 180 is delivered to the base portion 215 of the platform 195.

The automatic packager 100 may pack only a single medication of a kind in any one package. Accordingly, the cartridge 115 may need to verify that an expected medication 180 (for example, a single unbroken medication 180) is dispensed to the packaging unit 110. The method 400 further includes determining whether only a single unbroken medication 180 is delivered to the shuttle system 140 (at block 410). This may also be referred to as singulation verification. The electronic processor 305 controls the camera system 135 to acquire an image of contents of the base portion 215. The mirror 185 reflects the contents of base portion 215 to the camera 190, which captures the image. The camera 190 provides the captured image to the electronic processor 305 for verification. The electronic processor 305 may use image recognition techniques on the captured image to ensure that only a single unbroken medication 180 is delivered to the shuttle system. Example image recognition techniques are described in U.S. Patent Application Publication No. 2018/0091745, the entire contents of which are hereby incorporated by reference.

When the electronic processor 305 determines that more than one medication 180 has been delivered to the shuttle system 140 or that a broken medication 180 has been delivered to the shuttle system 140, the method 400 includes returning the contents of the shuttle system 140 to the reservoir 125 (at block 415). The electronic processor 305 controls the shuttle drive 210 to move the shuttle 200 from the base portion 215 to the first opening 220 (e.g., the first position). The shuttle 200 returns the contents from the base portion 215 to the reservoir 125 through the first opening 220. The method 400 returns to block 405 to deliver the next medication 180 to the shuttle system 140.

When the electronic processor 305 determines that only one unbroken medication 180 has been delivered to the shuttle system 140, the method 400 includes determining whether the correct medication 180 is delivered to the shuttle system 140 (at block 420). As described above, the electronic processor 305 may use the above incorporated image recognition techniques to determine whether the correct type of medication 180 has been delivered to the shuttle system 140.

When the electronic processor 305 determines that the incorrect type of medication 180 is delivered to the shuttle system 140, the method 400 moves to block 415 to return the contents of the shuttle system 140 to the reservoir 125, as described above. Accordingly, in blocks 410 and 420, the method 400 is determining whether an expected medication 180 is delivered to the shuttle system 140. In some embodiments, determining whether an expected medication 180 is delivered may include only one of the blocks 410 or 420 or the blocks 410 and 420 may be performed in a different order. In other embodiments, rather than checking for whether a single unbroken medication 180 is delivered to the shuttle system 140, determining whether an expected medication 180 may include determining whether a correct type of medication is delivered to the shuttle system 140 regardless of the number of medications delivered to the shuttle system 140. In yet other embodiments, determining whether an expected medication 180 may include determining whether a correct number of medications is delivered to the shuttle system 140.

When the electronic processor 305 determines that the correct type of medication 180 is delivered to the shuttle system 140, the method 400 includes delivering the medication 180 to the packaging unit 110 (at block 425). The electronic processor 305 controls the shuttle drive 210 to move the shuttle 200 from the base portion 215 to the second opening 230 (e.g., the second position). The shuttle 200 delivers the medication 180 from the base portion 215 to the packaging unit 110 through the second opening 230, the conduit 235, and the dispensing opening 205.

The method 400 also includes verifying the delivery of the medication 180 to the packaging unit 110 (at block 430). The pill sensor 240 detects whether or not a pill was dispensed through the conduit 235 and provides indicating signals to the electronic processor 305. When the electronic processor 305 determines that a medication 180 was delivered to the packaging unit 110, the method returns to block 405 to deliver the next medication. When the electronic processor 305 determines that a medication 180 was not delivered to the packaging unit 110, the electronic processor 305 sends an interrupt to the control system of the automatic packager 100 and returns to block 405 to re-deliver the medication 180.

Figure 13:
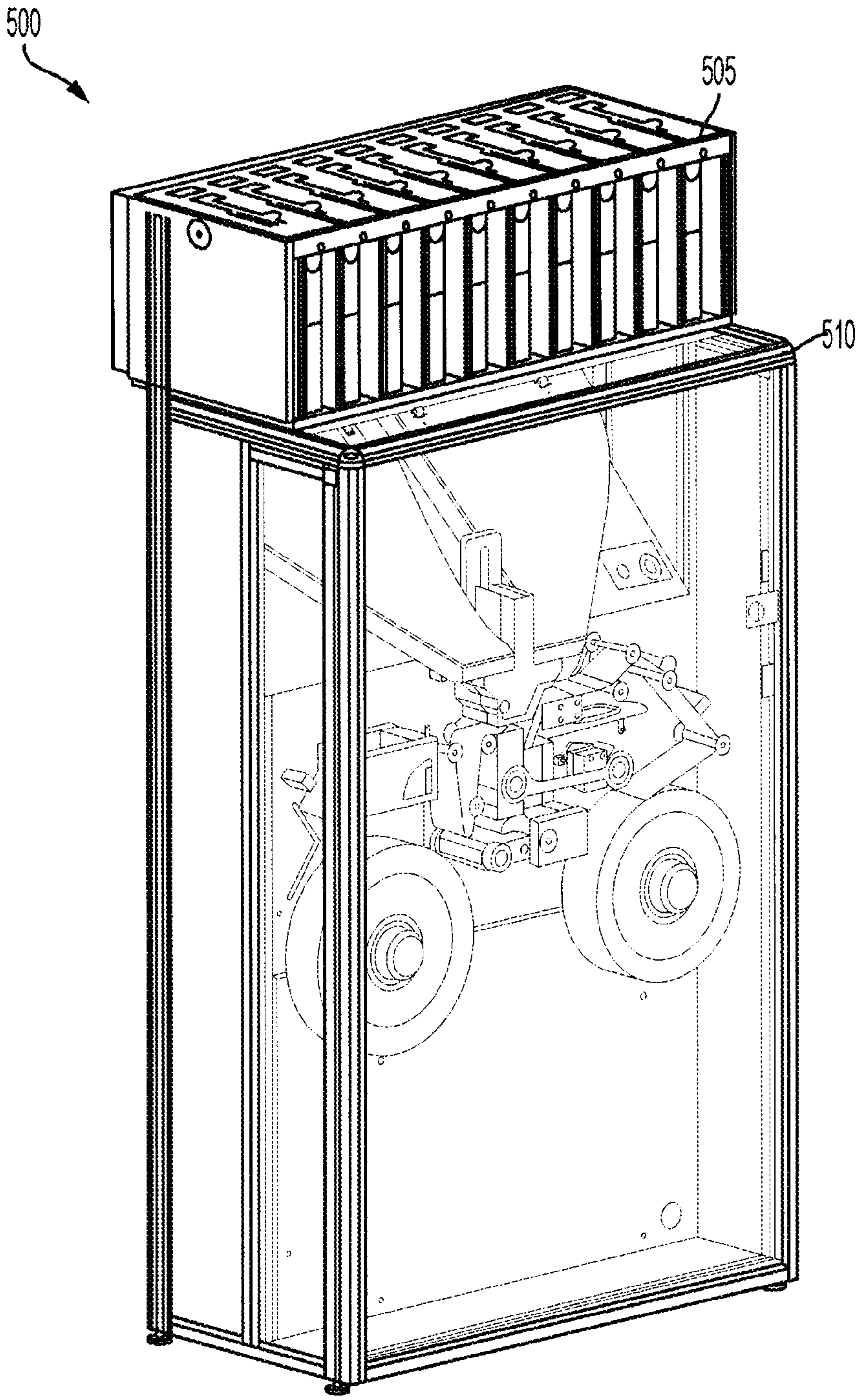
FIG. 13 is a perspective view of an automatic packager in accordance with some embodiments.

FIG. 13 illustrates an example automatic packager 500 including a universal feed cassette 505 and a packaging unit 510 according to another embodiment. The universal feed cassette 505 receives medications from the bulk canisters and individually dispenses pills to the packaging unit 510. Each universal feed cassette 505 may dispense 10 separate pills at the same time. In some embodiments, the automatic packager 500 may include more than one universal feed cassette 505.

In the example illustrated in FIG. 13, the packaging unit is a strip packager 510. An example strip packager is described in U.S. Patent Application Publication No. 2013/0318931 and U.S. Patent Application Publication No. 2017/0015445, the entire contents of both of which are hereby incorporated by reference. FIG. 13 illustrates only one example embodiment of an automatic packager 500. The automatic packager 500 may include more or fewer components than those illustrated in FIG. 13 and may perform functions other than those explicitly described herein.

Figure 14A:
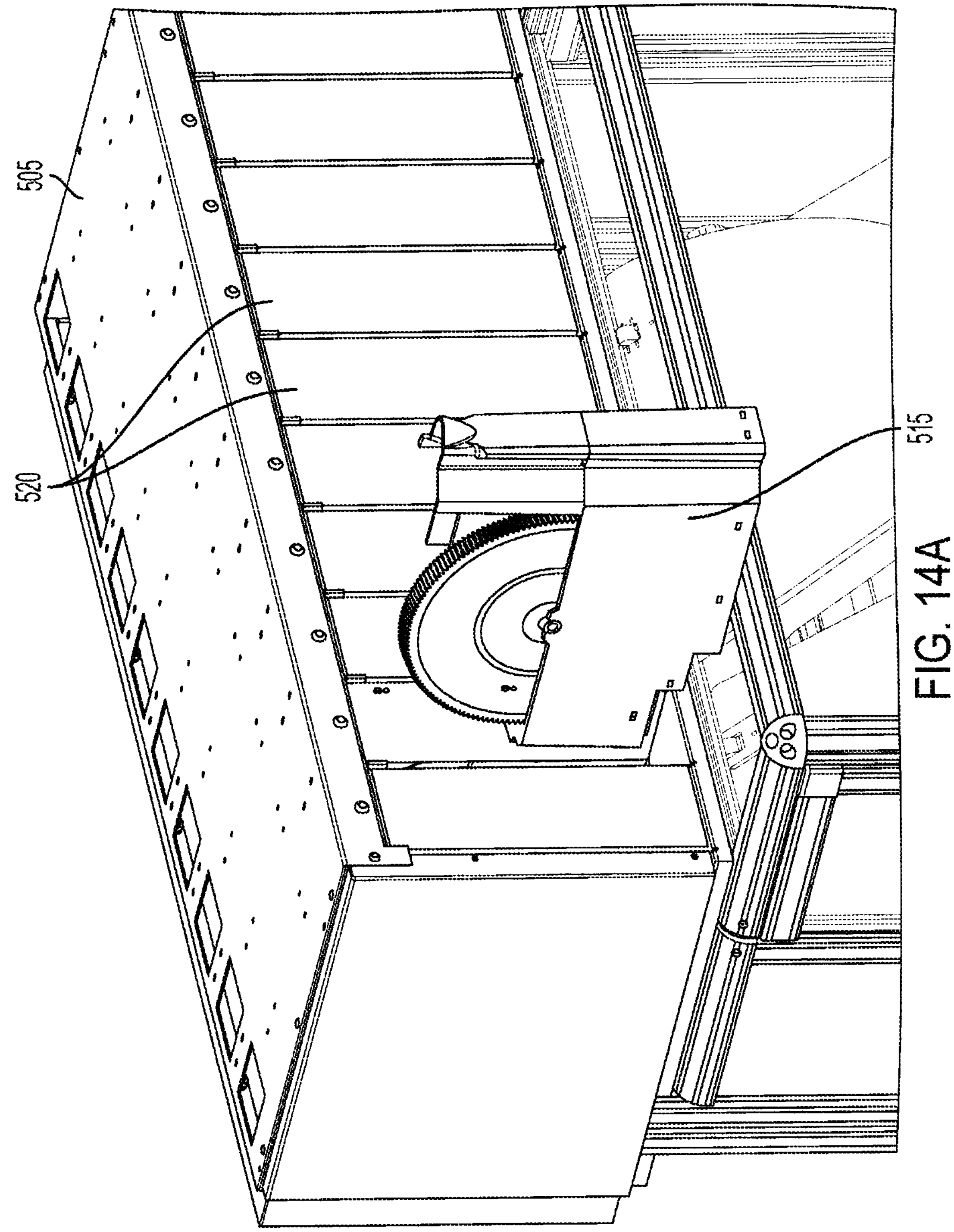
FIGS. 14A and 14B are perspective views of a universal feed cassette in accordance with some embodiments.
Figure 14B:
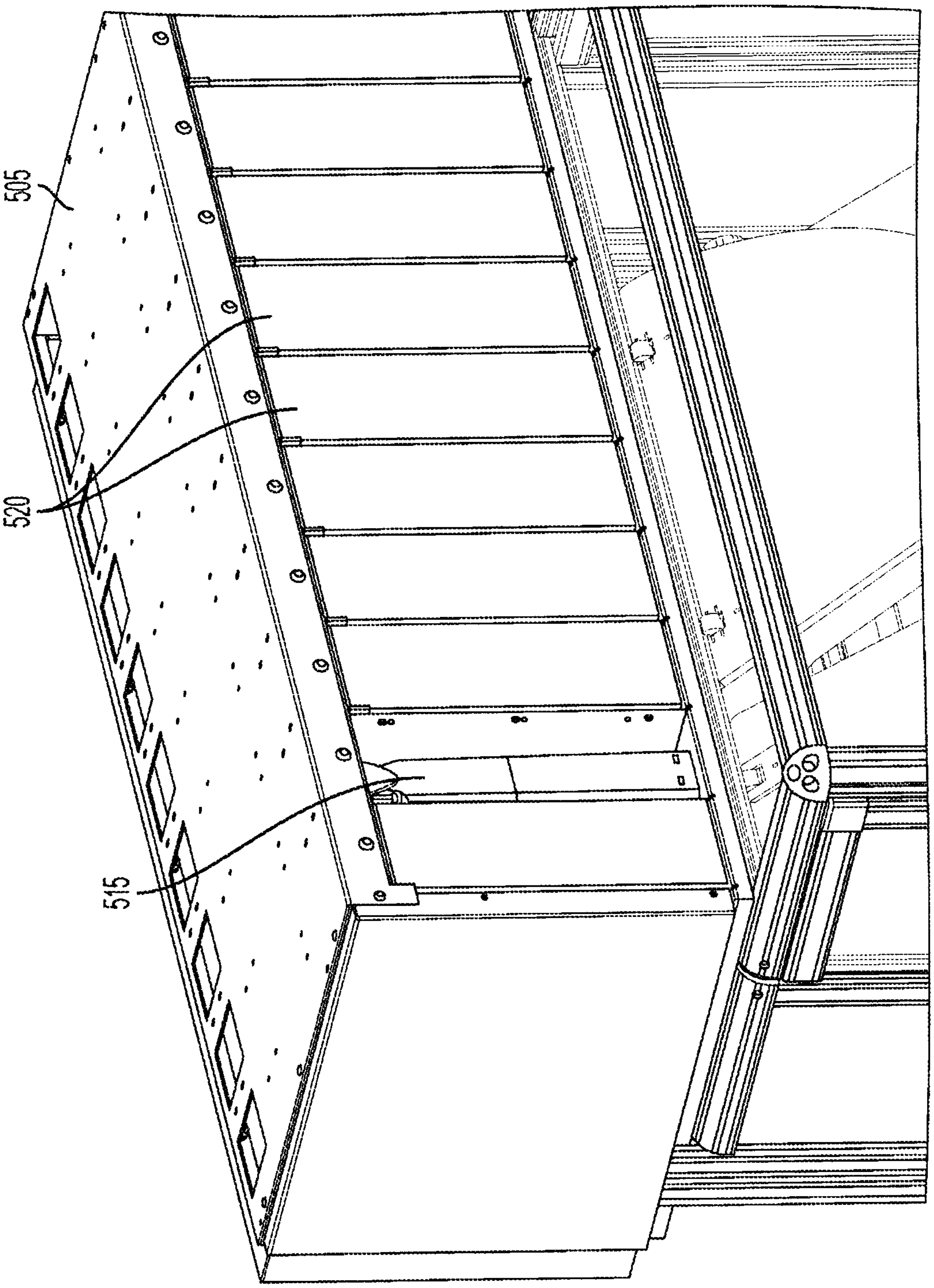

Referring to FIGS. 14A and 14B, the universal feed cassette 505 includes a plurality of cartridges 515 arranged within the housing of the universal feed cassette 505. In one example, the universal feed cassette 505 may include up to ten cartridges 515 that are received in cartridge slots 520. A pharmacist may load medications from bulk canisters into each of the cartridges 515. The same medications may be loaded into each cartridge 515, or different medications may be loaded into each cartridge 515. The cartridges 515 independently dispense the medications to the packaging unit 510.

The cartridges 515 are removable fixed to the universal feed cassette 505. A pharmacist or technician may remove each individual cartridge 515 from the cartridge slot 520 to fill the cartridge 515 with medications from a bulk canister. The cartridge 515 can then be placed into any of the cartridge slot 520.

Figure 15A:
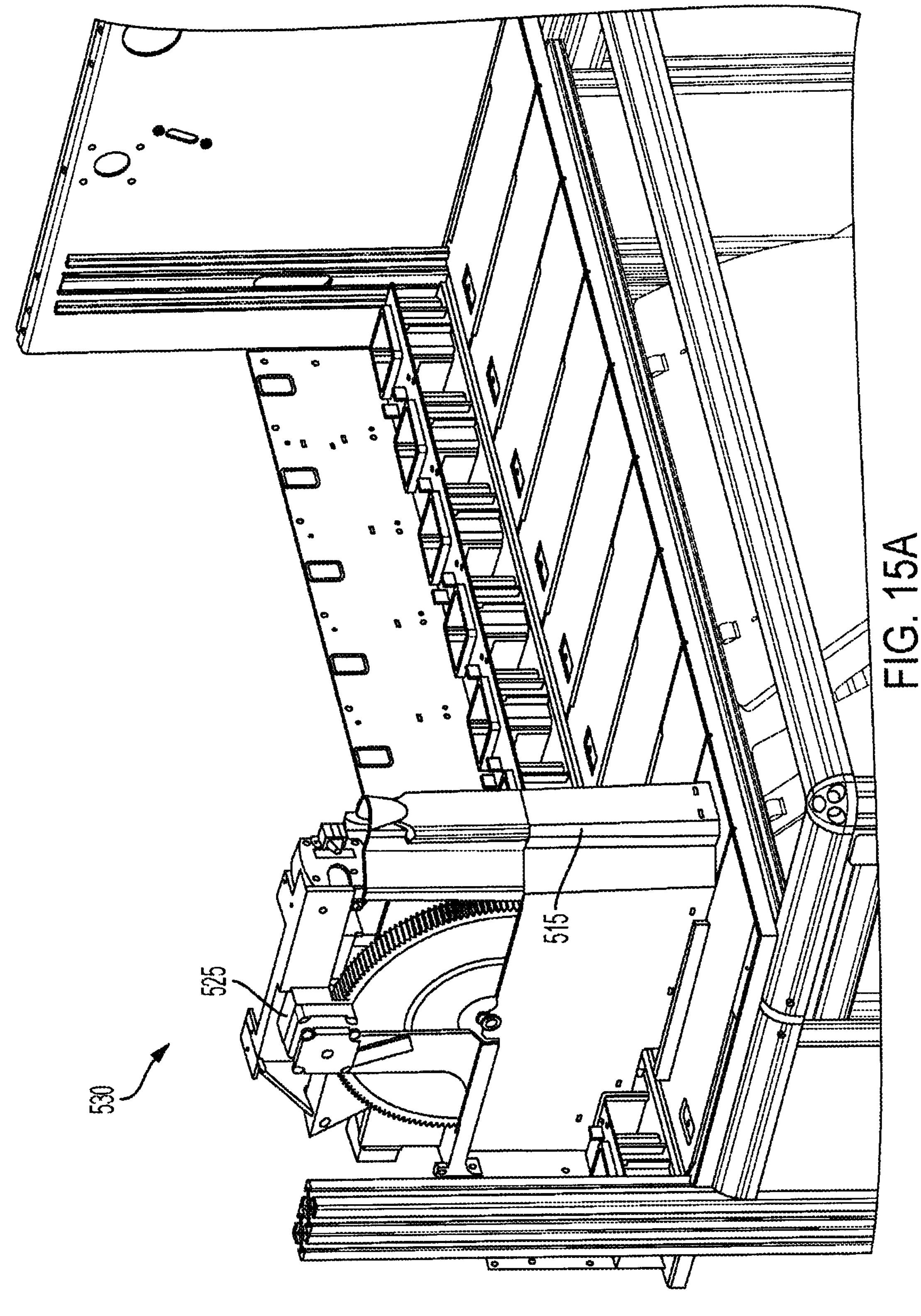
FIGS. 15A, 15B, and 15C are perspective views of the universal feed cassette with top and side frames removed and illustrating a cartridge assembly of the universal feed mechanism in accordance with some embodiments.
Figure 15B:
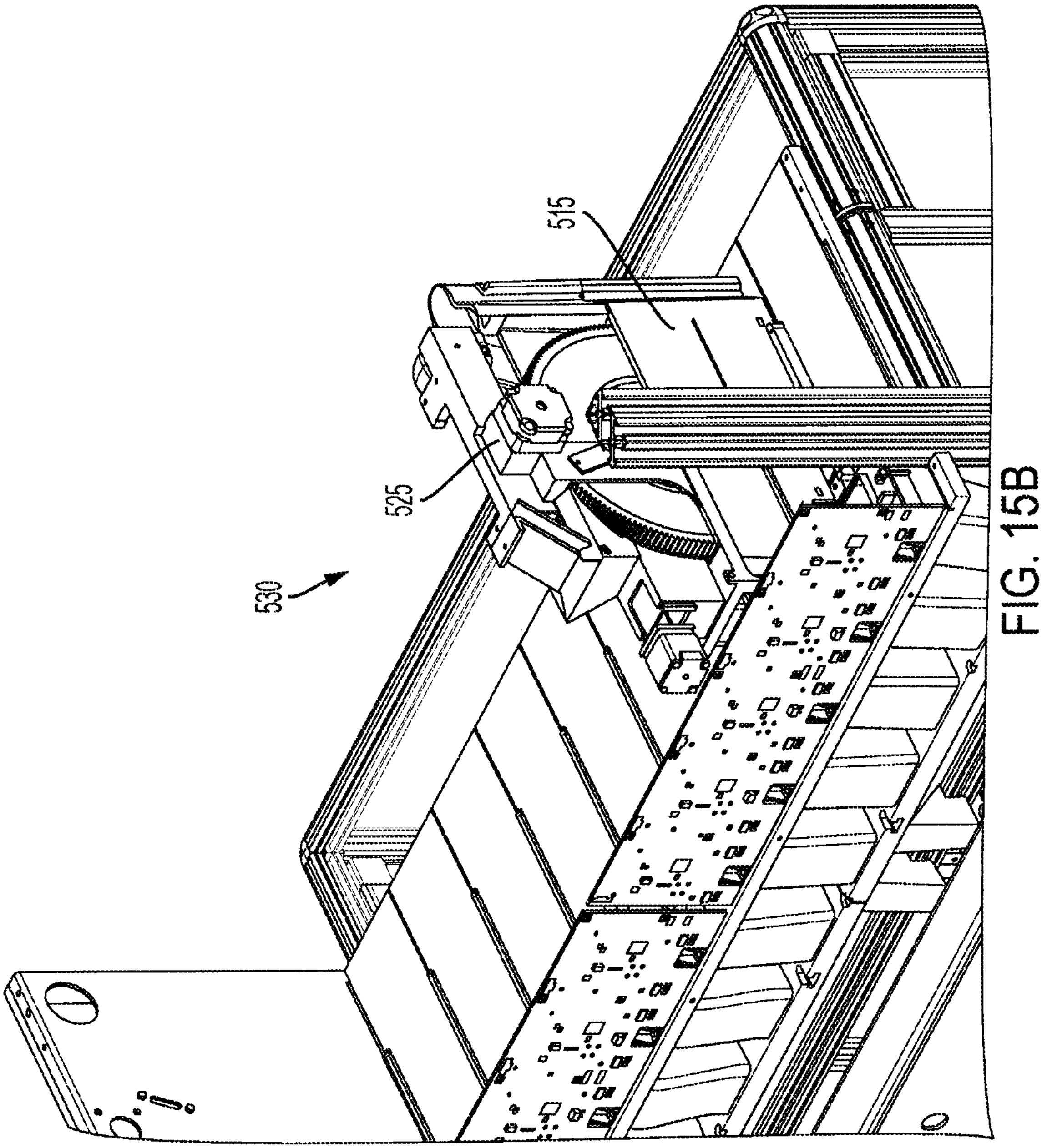
Figure 15C:
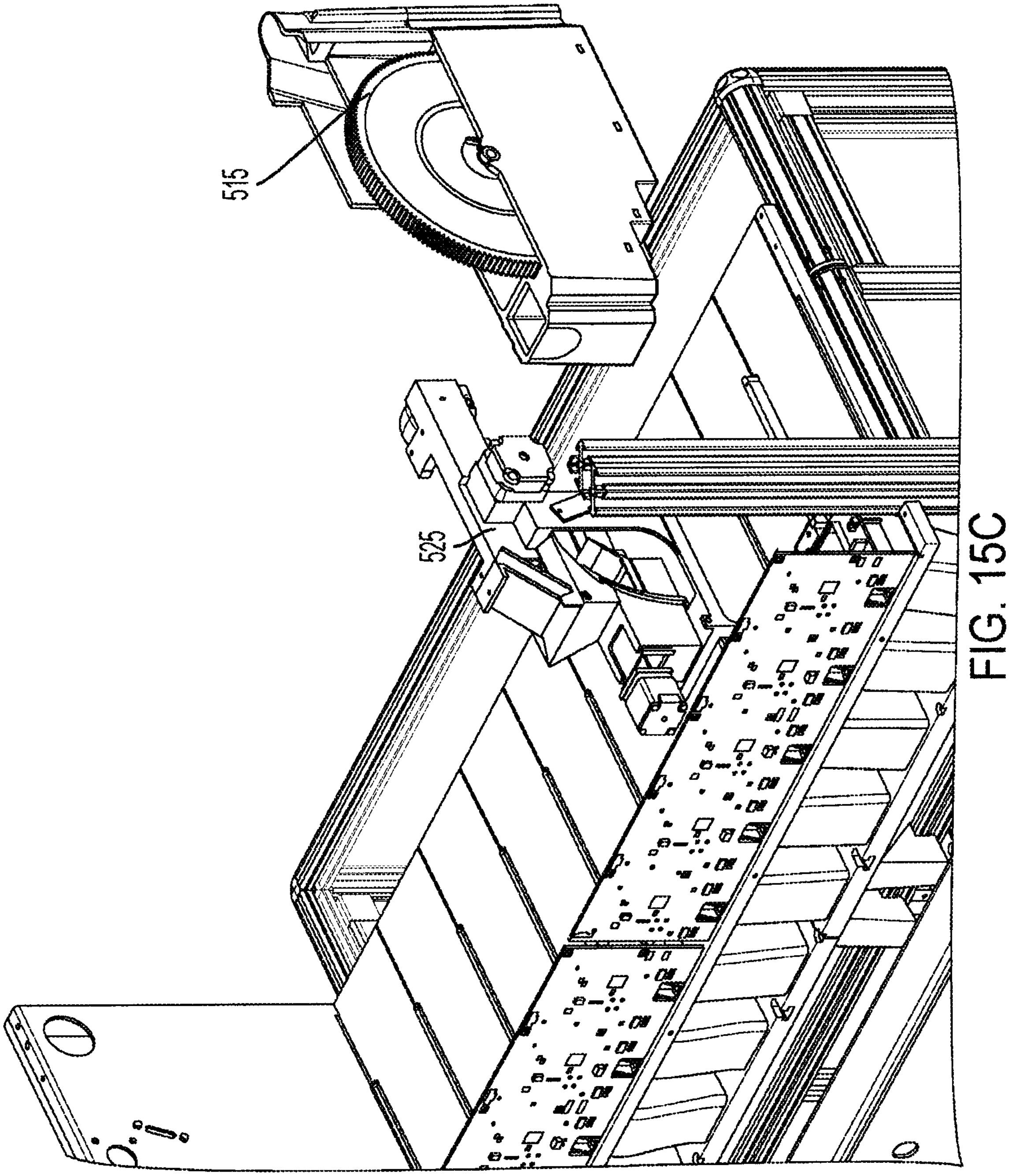

Referring to FIGS. 15A, 15B, and 15C, each cartridge slot 520 includes a cartridge mechanism 525 that is activated to dispense medications from the cartridge 515. The cartridge mechanism 525 and the cartridge 515 may together be referred to as a cartridge assembly 530. When the cartridge 515 is received in a cartridge slot 520, the cartridge 515 is removably fixed to the cartridge mechanism 525.

Figure 16:
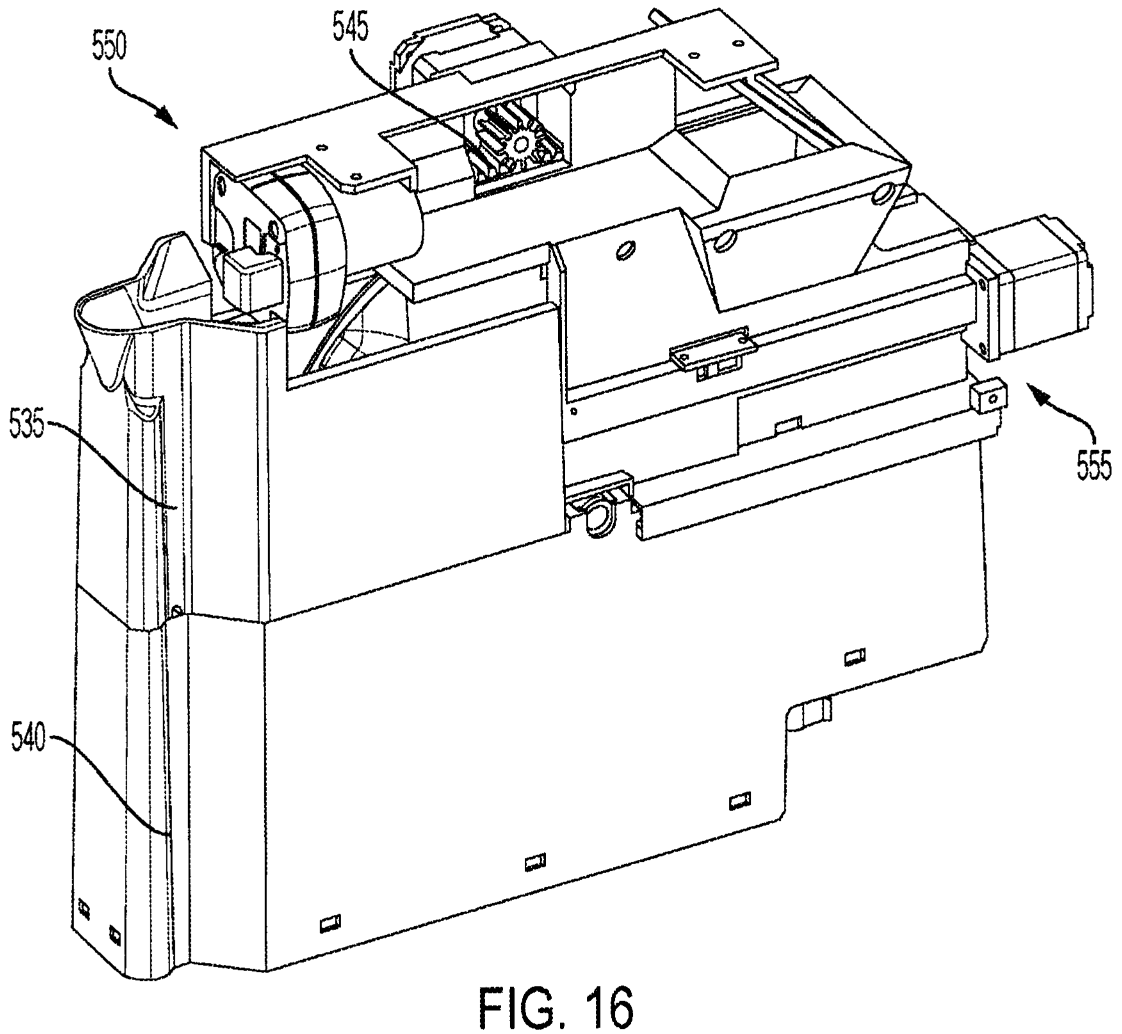
FIG. 16 is a perspective view of the cartridge assembly of FIG. 15 in accordance with some embodiments.
Figure 17A:
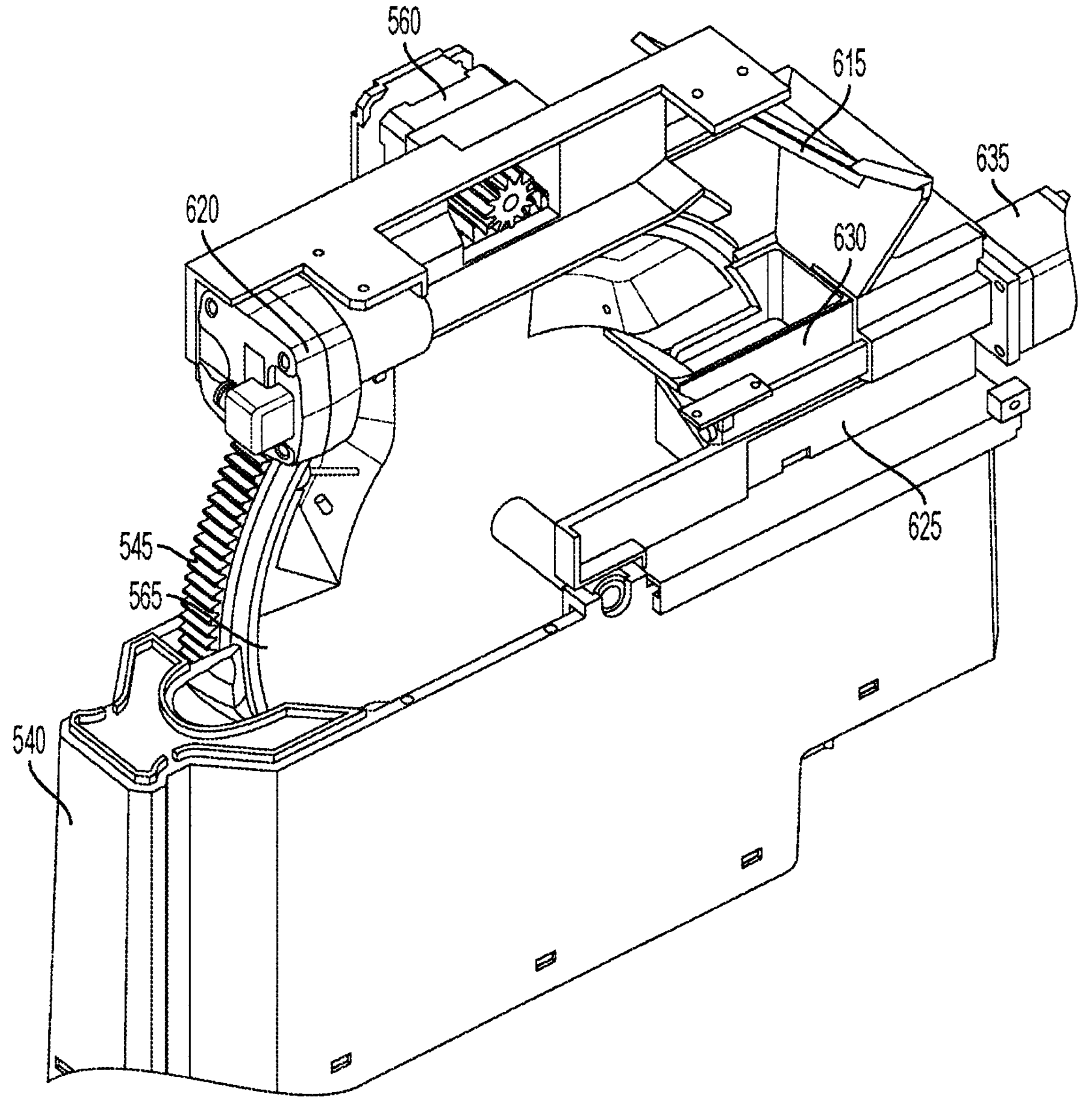
FIGS. 17A, 17B, and 17C are perspective views of the cartridge of FIG. 15 with a spout removed in accordance with some embodiments.
Figure 17B:
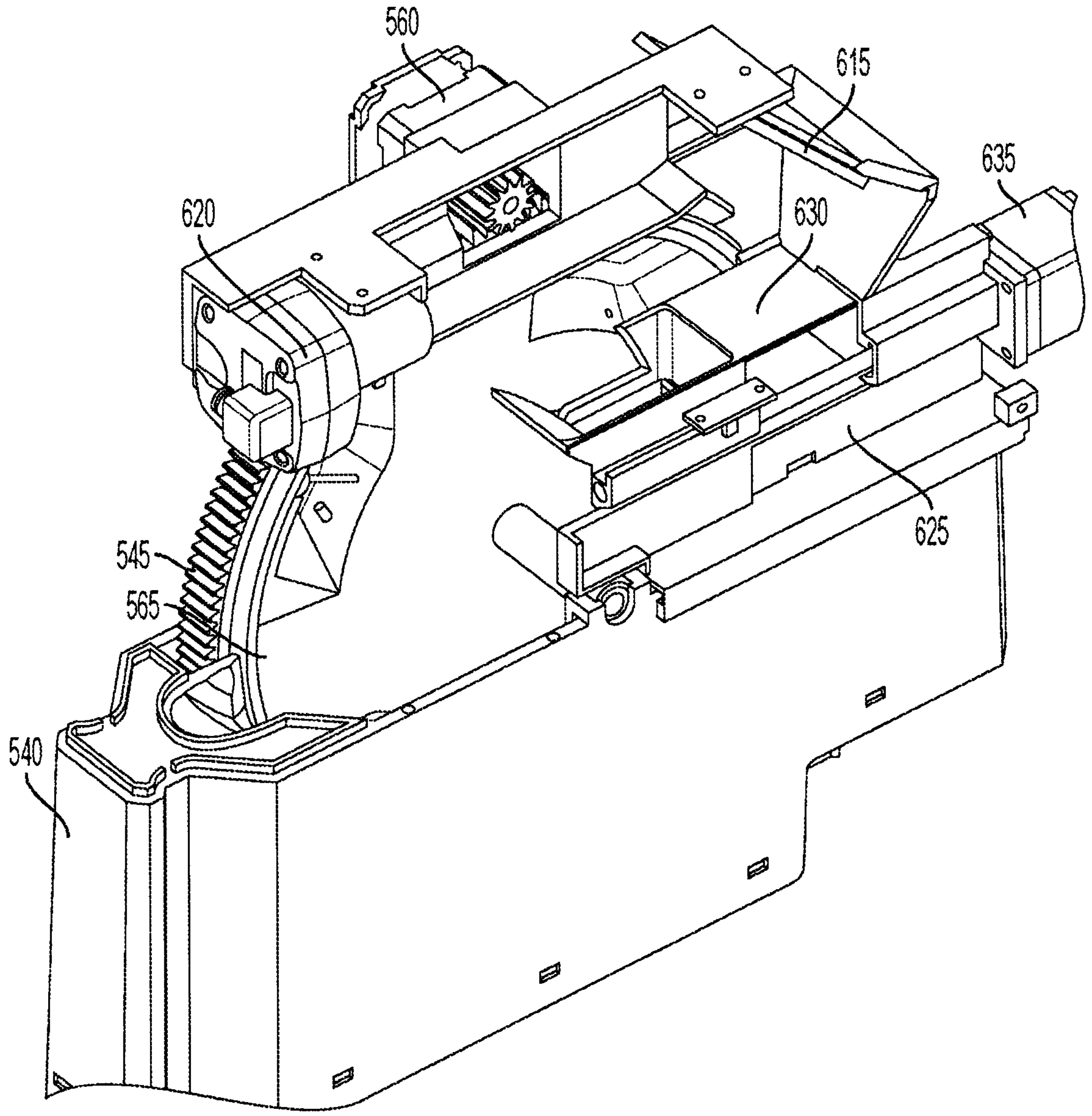
Figure 17C:
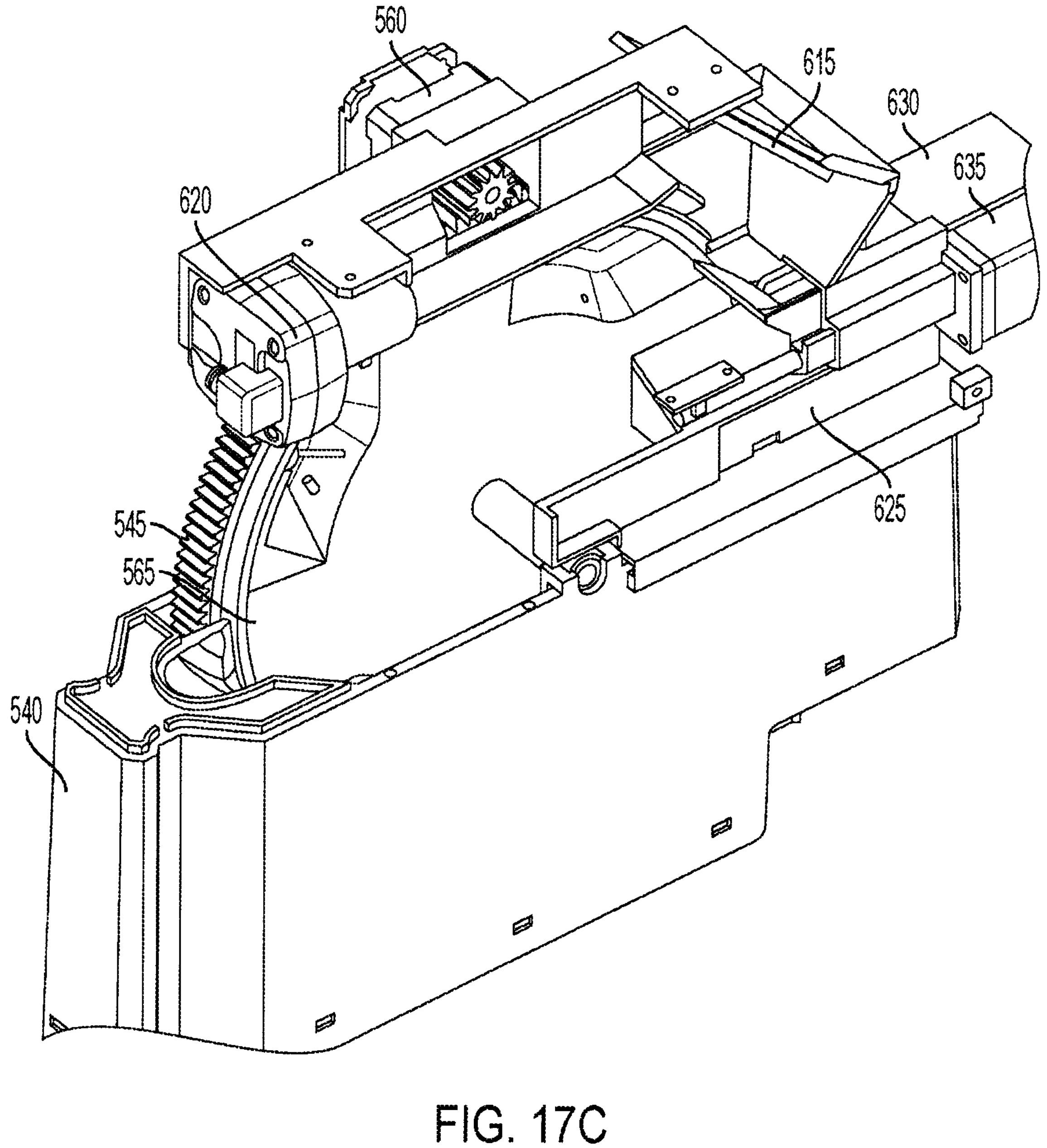

Referring to FIGS. 16-17C, the cartridge assembly 530 includes a spout 535, a reservoir 540, a wheel 545, a camera system 550, and a shuttle system 555 (for example, a verification system). The cartridge assembly 530 also includes other electronics and sensors that are not illustrated. The spout 535 is provided on top of the reservoir 540 to guide the medications from the bulk canister to the reservoir 540. The reservoir 540 stores the medications during the dispensing process. The reservoir 540 and the spout 535 are disengageable from the cartridge 515, allowing a pharmacist to remove the reservoir 540 and the spout 535 after the dispensing process. The pharmacist may return any unused medications after the dispensing process to the bulk container by detaching the reservoir 540 and emptying the reservoir 540 into the bulk container using the spout 535. The pharmacist may also clean the spout 535 and the reservoir 540 if the cartridge 515 is going to be loaded with a different type of medications.

The wheel 545 is provided inside the cartridge 515 and includes a bottom portion that is placed in the reservoir 540. The wheel 545 is driven by a motor assembly 560 provided at the top of the cartridge assembly 530. Particularly, the wheel 545 includes teeth that interlock with the motor assembly 560 and the motor assembly 560 rotates the wheel 545 using the interlocking teeth of the wheel 545 and the motor assembly 560. As described above, a position sensor assembly may be used to determine the position and/or speed of the wheel 545 to control the rotation of the wheel 545.

Referring to FIGS. 18A-20, a scooping disc 565 (for example, a scooping member or scooping attachment) is mounted to the wheel 545 to scoop medications 180 from the reservoir 540. The scooping disc 565 includes one or more inward projections 570 and a holding pin 575 projecting from an inside portion of the scooping disc 565. In the illustrated example, the scooping disc 565 includes four inward projections 570 and four holding pins 575. The inward projection 570 projects into the disc towards the when 545. The inward projection 570 includes a stopper 580 along a circumferential end of the inward projection 570. The holding pin 575 and the stopper 580 are used to hold a medication 180 during a rotation of the scooping disc 565.

Figure 18A:
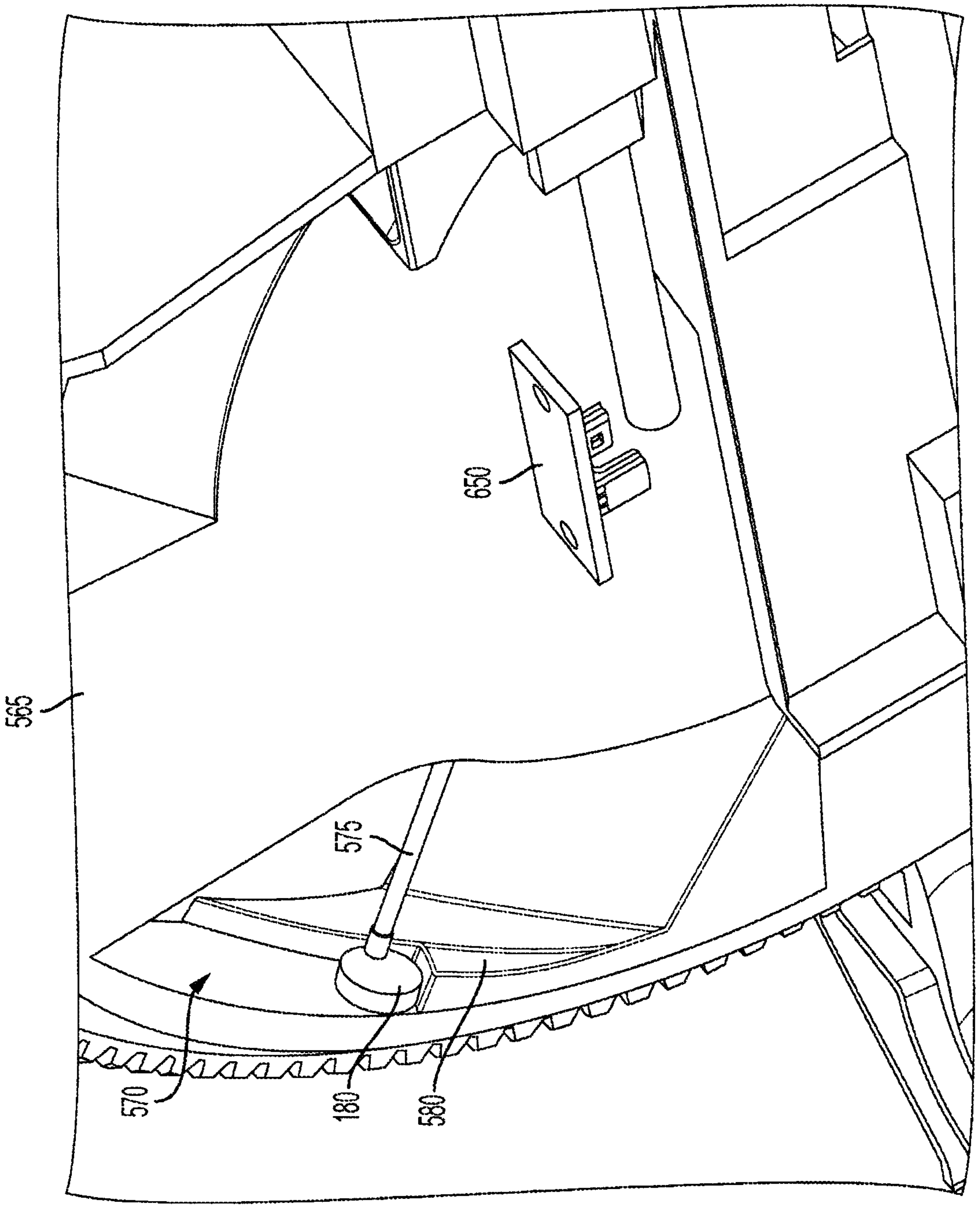
FIGS. 18A, 18B, and 18C are perspective views of a scooping disc of the cartridge of FIG. 15 in accordance with some embodiments.
Figure 18B:
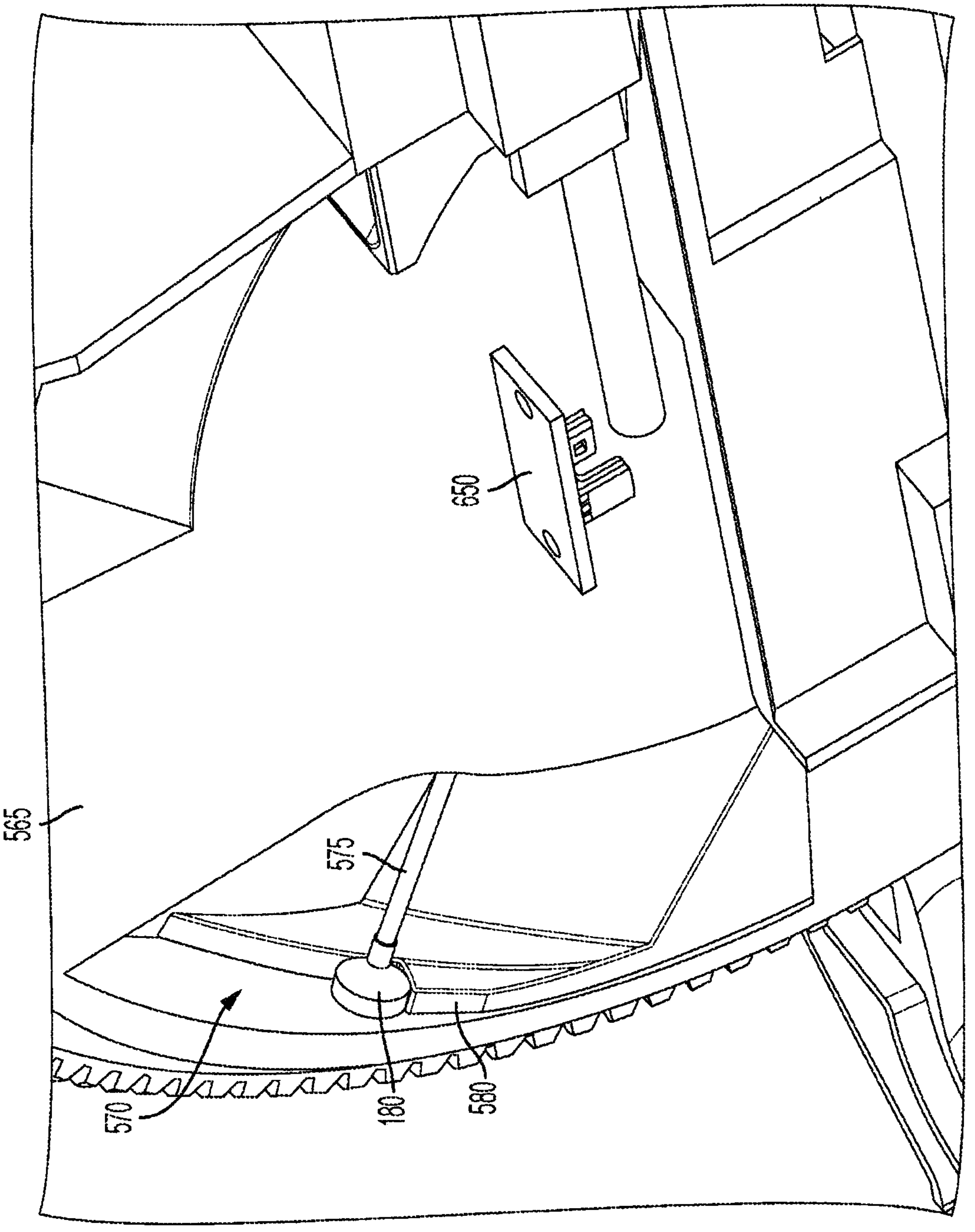
Figure 18C:
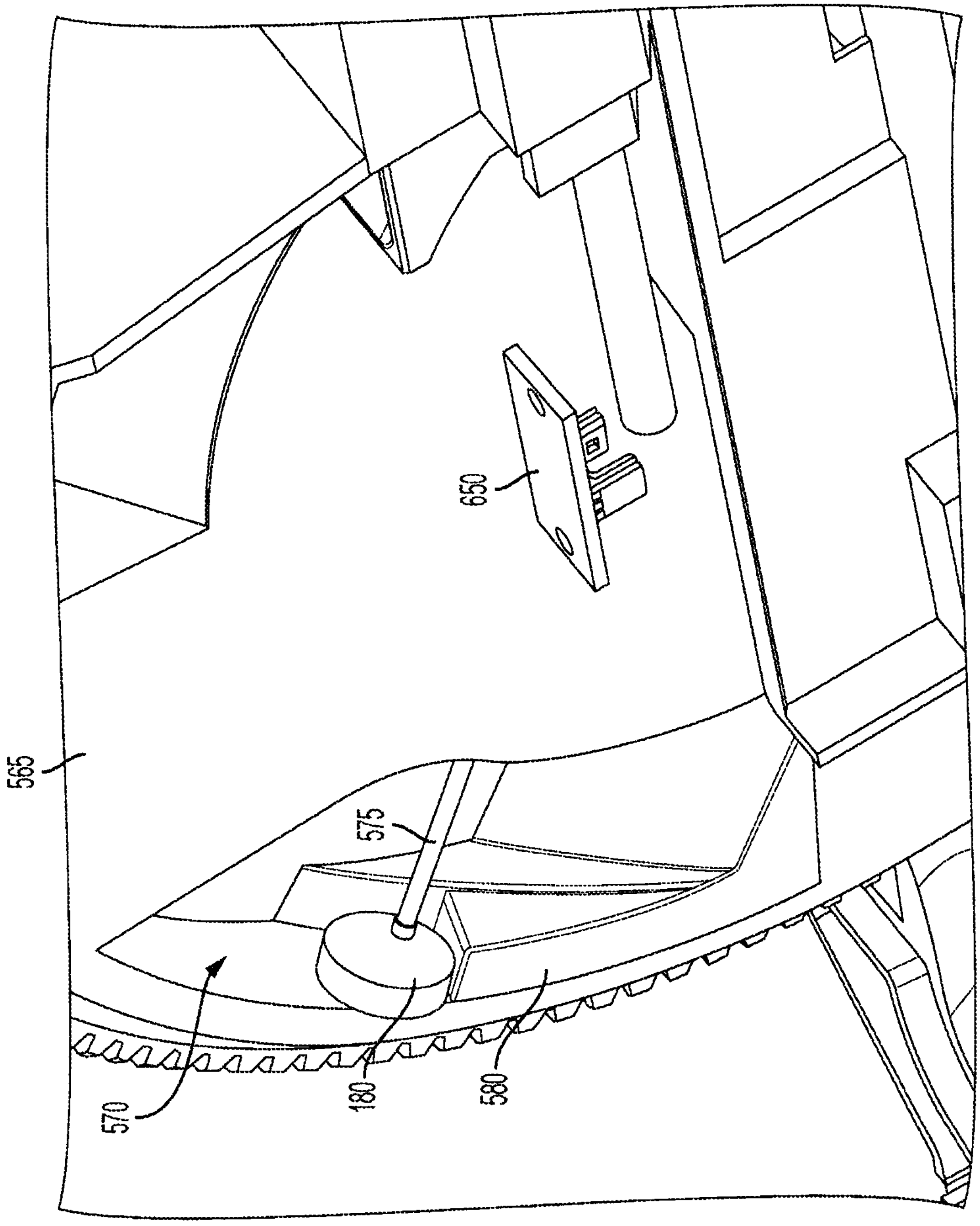
Figure 19:
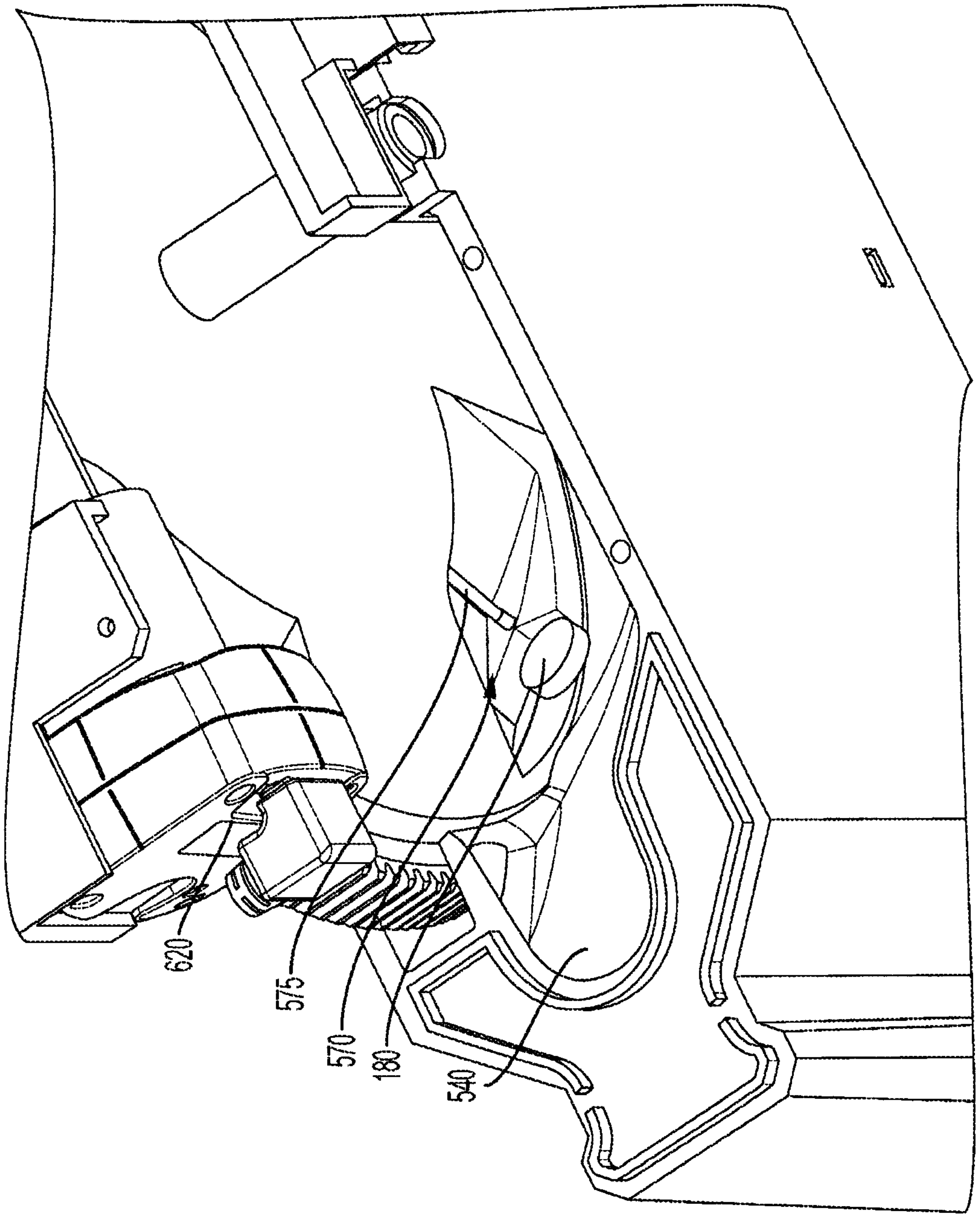
FIG. 19 is a perspective view of a scooping disc of the cartridge of FIG. 15 in accordance with some embodiments.

During rotation of the wheel 545 and the scooping disc 565, when the inward projections 570 encounter the reservoir 540 and a plurality of medications 180 in the reservoir 540, the medications 180 move inward into the inward projections 570. The holding pin 575 is retracted when the inward projection 570 is moving along the reservoir 540 at a downward position of the wheel 545. As the inward projection 570 moves out of the reservoir 540, the holding pin 575 is advanced towards the circumferential end of the inward projection 570 to engage a medication 180. As a consequence as shown in FIGS. 18A-18C, the medication 180 is held between the circumferential end of the inward projection 570, the holding pin 575, and the stopper 580. The inward projection 570 and the holding 575 may be used to hold a medication 180 of many different sizes. That is, the same cartridge 515 may be used for any type of medication 180. Typically, only a single medication 180 is pinched between the holding pin 575 and the inward projection 570, while the other medications 180 fall back into the reservoir 540 during the rotation of the wheel 545. As the inward projection 570 approaches the shuttle system 555, the holding pin 575 is once again retracted to release the medication 180 into the shuttle system 555. The wheel 545 and the scooping disc 565 may together be referred to as a singulating mechanism. In some embodiments, rather than being separate from the wheel 545, the scooping disc 565 (for example, a scooping member) may be formed integrally with the wheel 545.

Figure 21:
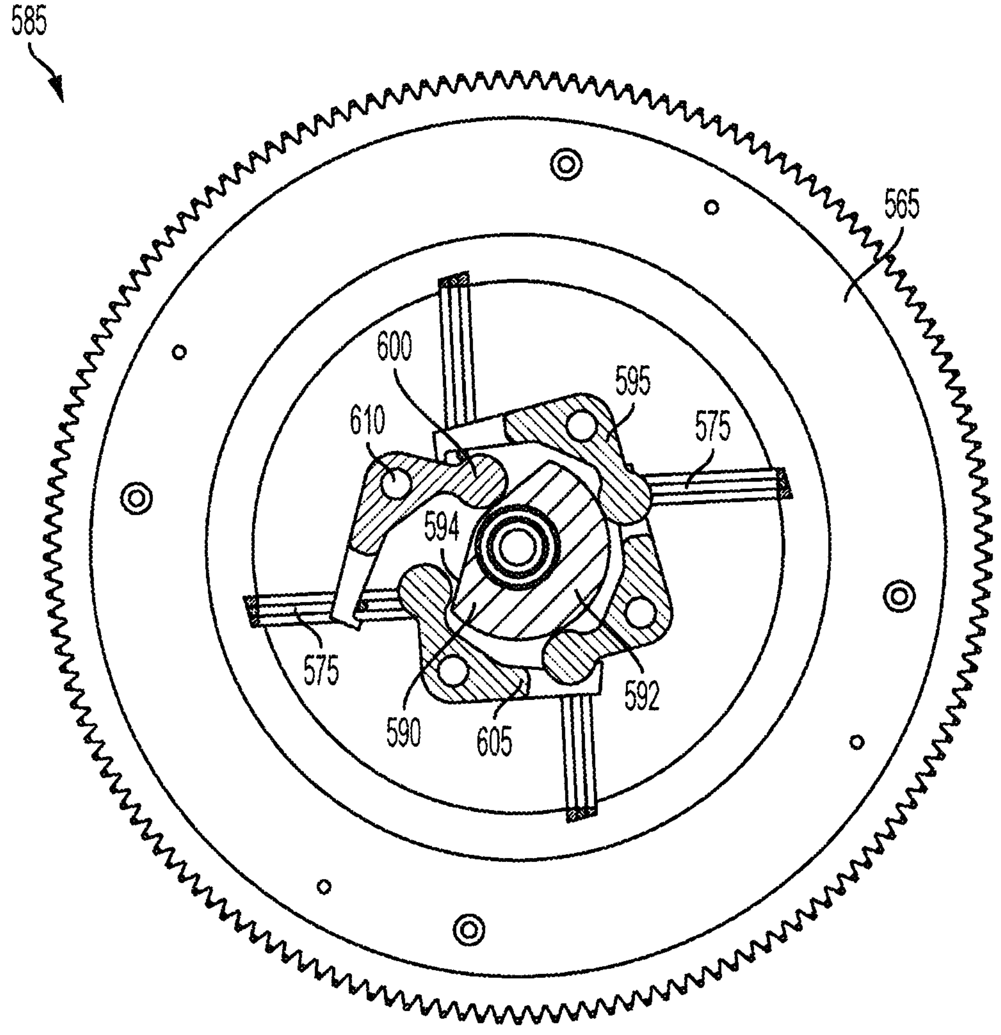
FIG. 21 is a plan view of the scooping disc of the cartridge of FIG. 15 illustrating a cam and follower mechanism in accordance with some embodiments.

FIG. 21 illustrates a cam and follower mechanism 585 that is used to advance and retract the holding pins 575. The cam and follower mechanism 585 is provided, for example, on an inside surface of the scooping disc 565 between the scooping disc 565 and the wheel 545. The cam and follower mechanism 585 includes a cam 590 and a plurality of followers 595. As illustrated in FIG. 21, the cartridge assembly 530 includes four followers 595 and four holding pins 575, one per each inward projection 570. The cam 590 includes an arc portion 592 and a cut-off portion 594. The arc portion 592 extends farther to a center portion of the cam 590 than the cut-off portion 594. The follower 595 includes a first arm 600 that engages the cam 590 and a second arm 605 that is fixed to the holding pin 575. The first arm 600 and the second arm 605 are pivoted about a center portion 610 of the follower 595.

When the first arm 600 is engaged by the arc portion 592 of the cam 590, the first arm 600 is pushed towards the circumference of the wheel 545. As a consequence, due to the pivoting action of the center portion 610, the second arm 605 is retracted towards the center of the wheel 545, thereby retracting the holding pin 575. When the first arm 600 is engaged by the cut-off portion 594 of the cam 590, the first arm 600 moves towards the center of the when 545. As a consequence, due to the pivoting action of the center portion 610, the second arm 605 is advanced towards the circumference of the wheel 545 thereby advancing the holding pin 575 into the inward projection 570. The cam 590 is fixed such that the holding pin 575 is retracted when the inward projection 570 is dropping a medication 180 into the shuttle system 555 and when the inward projection 570 is within the reservoir. Additionally, the cam 590 is fixed such that the holding pin 575 is advanced when the inward projection 570 exits the reservoir 540.

Figure 20:
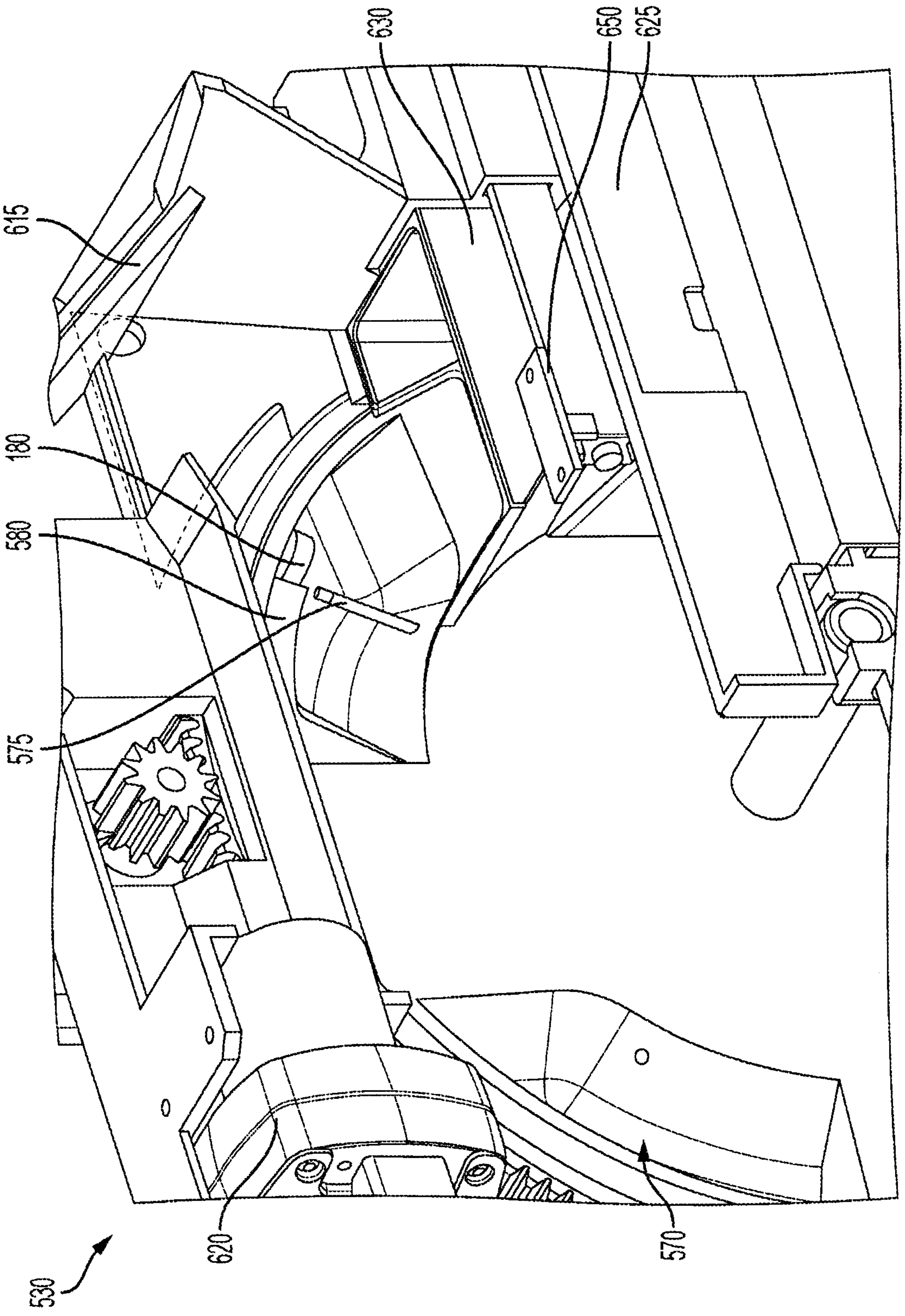
FIG. 20 is another perspective view of the scooping disc of the cartridge of FIG. 15 in accordance with some embodiments.

Referring to FIG. 20, the medications 180 are individually delivered to the shuttle system 555 when the holding pins 575 are retracted above the shuttle system 555. The camera system 550 may be used to verify that an expected medication 180 (for example, a single, whole (or unbroken) medication 180) is delivered to the shuttle system 555. The illustrated camera system 135 includes a mirror 615 placed over the shuttle system 555 and a camera 620 placed on top of the spout 535. The mirror 615 is slanted such that the camera 620 may acquire an image of the contents of the shuttle system 555. The camera system 550 may additionally include a lighting system (e.g., an LED lighting system) to illuminate the contents of the shuttle system 555 when the camera 620 is capturing an image.

The shuttle system 555 includes a platform 625, a shuttle 630, and a shuttle drive 635. The platform 625 may be made from a clear or translucent plastic material. An LED lighting system, as described above, may be provided over and/or under the platform 625 to illuminate the contents on the platform 625 when the camera system 550 is capturing an image of the contents. The LED lighting system may emit visible or infrared light to illuminate the platform 625 for the camera 620.

The shuttle 630 may be moved between the platform 625, over the reservoir 540, and over a conduit 640 (shown in FIG. 15C). The shuttle 630 transfers the medications from the platform 625 either to the reservoir 540 or to the conduit 640. The shuttle 630 is driven by the shuttle drive 635. The shuttle drive 635 may be a motor assembly, an actuator, or the like that moves the shuttle 630 between the platform 625, over the reservoir 540, and over the conduit 640.

The conduit 640 is similar to the conduit 235 described above. Additionally, the universal feed cassette 505 and the cartridge assembly 530 may include components similar to the universal feed cassette 105 and the cartridge 115 as described above.

Figure 22:
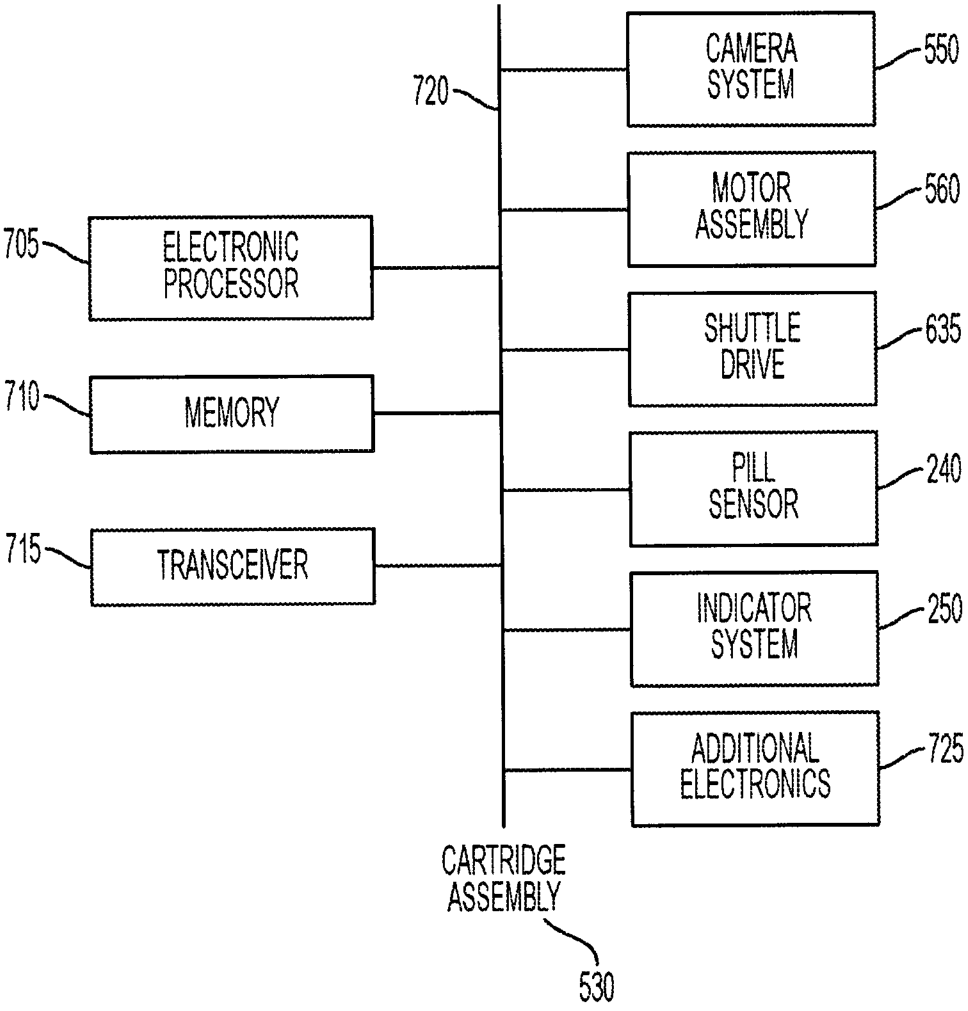
FIG. 22 is a block diagram of the cartridge assembly of FIG. 15 in accordance with some embodiments.

FIG. 22 is a block diagram of one embodiment of the cartridge assembly 530. In the example illustrated, the cartridge assembly 530 includes an electronic processor 705, a memory 710, a transceiver 715, the camera system 550, the shuttle drive 635, and the pill sensor 240. The electronic processor 705, the memory 710, the transceiver 715, the camera system 550, the motor assembly 560, the shuttle drive 635, and the pill sensor 240 communicate over one or more control and/or data buses (for example, a communication bus 720). FIG. 22 illustrates only one example embodiment of the cartridge assembly 530. The cartridge assembly 530 may include more or fewer components and may perform functions other than those explicitly described herein.

In some embodiments, the electronic processor 705, the memory 710, and the transceiver 715 are implemented similar to the electronic processor 305, the memory 310, and the transceiver 315. In some embodiments, the universal feed cassette 505 or the automatic packager may include a single electronic processor 705, a single memory 710, and a single transceiver 715 that control all the cartridge assemblies 530.

The camera system 550 receives control signals from the electronic processor 705. Based on the control signals received from the electronic processor 705, the camera system 550 controls the camera 620 and the lighting system that illuminates the platform 625. The motor assembly 560 may send position sensor signals to the electronic processor 705 and receive control signals to operate a motor of the motor assembly 560 based on the position sensor signals. As described above, the shuttle drive 635 may be a motor assembly or an actuator. The shuttle drive 635 also includes a position sensor 650 (shown in FIGS. 18A-18C) to determine the position of the shuttle 630. The shuttle drive 635 may send the position sensor 650 signals to the electronic processor 705, which sends control signals to the shuttle drive 635 to move the shuttle 630 based on the position sensor signals. In some embodiments, the shuttle system 555 may also include a shuttle home sensor, which indicates whether the shuttle 630 is at a home position. Signals from the shuttle home sensor are provided to the electronic processor 705 to control the movement of the shuttle 630.

The pill sensor 240 communicates with the electronic processor 705 to provide an indication of whether or not a pill is dispensed through the conduit 640. The electronic processor 705 also controls the indicator system 250 to provide an indication of the status of each cartridge 515. The cartridge 515 may also include additional electronics 725 such as a cartridge sensor and a solenoid lock. The cartridge sensor determines whether the cartridge 515 is in a correct position in the universal feed cassette 505 and whether the cartridge 515 is installed properly. The solenoid lock keeps the cartridge 515 in position during a dispensing process to inhibit other medications (e.g., of a different kind than the ones being dispensed by the cartridge 515) from being added to the cartridge 515.

Figure 23:
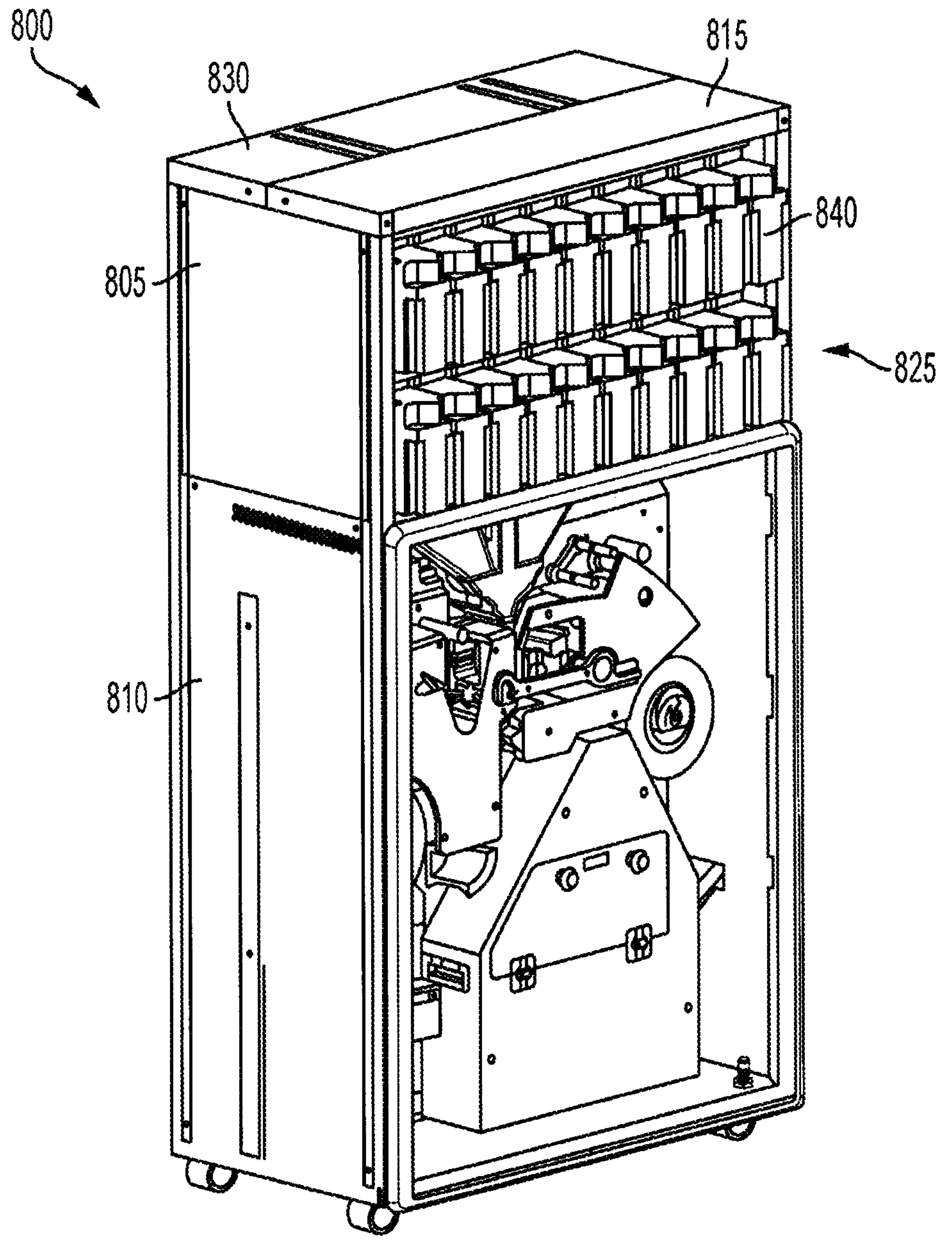
FIG. 23 is a front perspective view of an automatic packager in accordance with some embodiments.

FIG. 23 illustrates an example automatic packager 800 including a universal feed cassette 805 and a packaging unit 810 according to yet another embodiment. In the illustrated example, the universal feed cassette 805 can dispense up to 20 separate pills at the same time. In the example illustrated in FIG. 23, the packaging unit 810 is a strip packager. As discussed above, an example strip packager is described in U.S. Patent Application Publication No. 2013/0318931 and U.S. Patent Application Publication No. 2017/0015445, the entire contents of both of which are hereby incorporated by reference.

Figure 24:
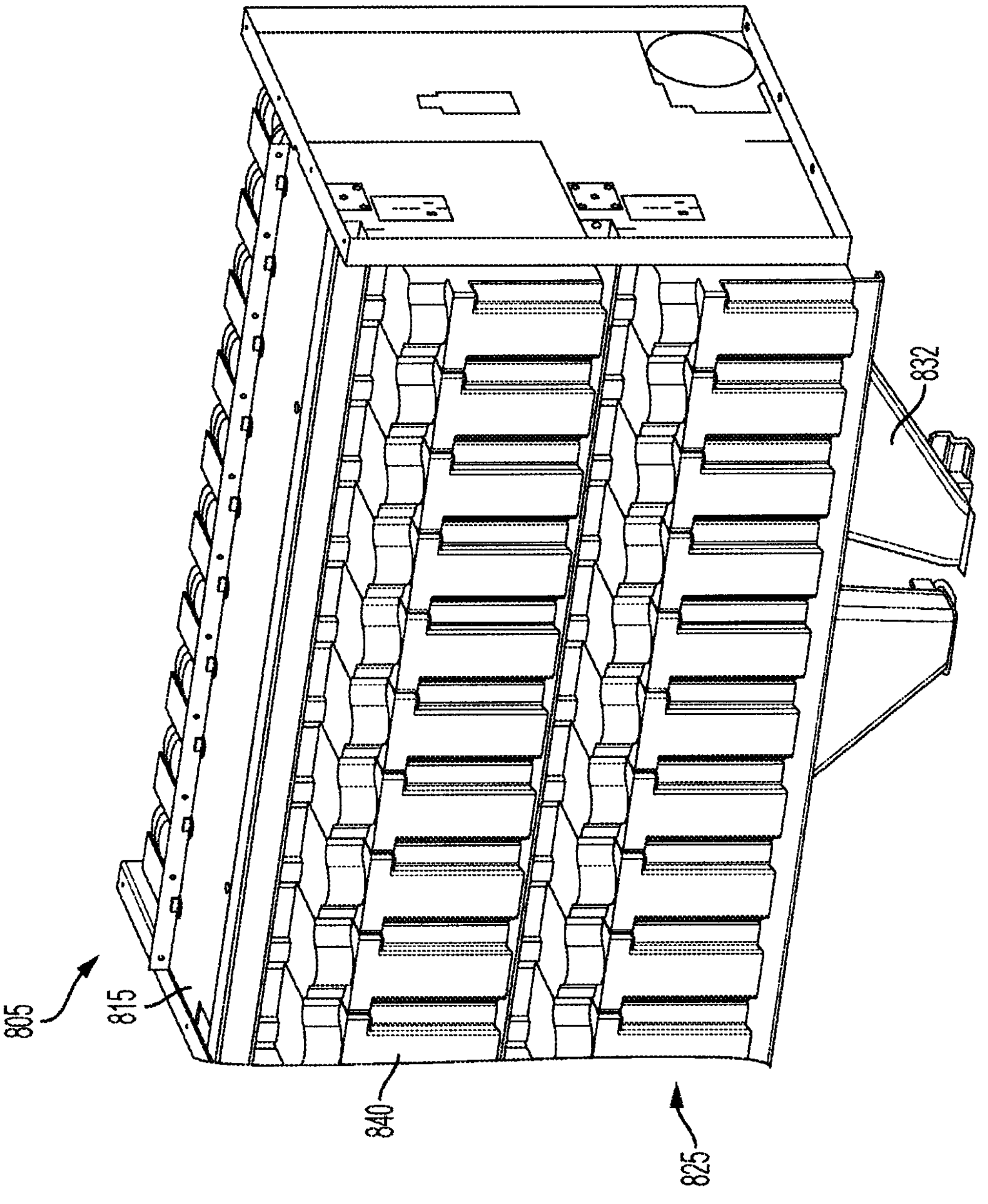
FIG. 24 is a front perspective view of a universal feed cassette of the automatic packager of FIG. 23 in accordance with some embodiments.
Figure 25:
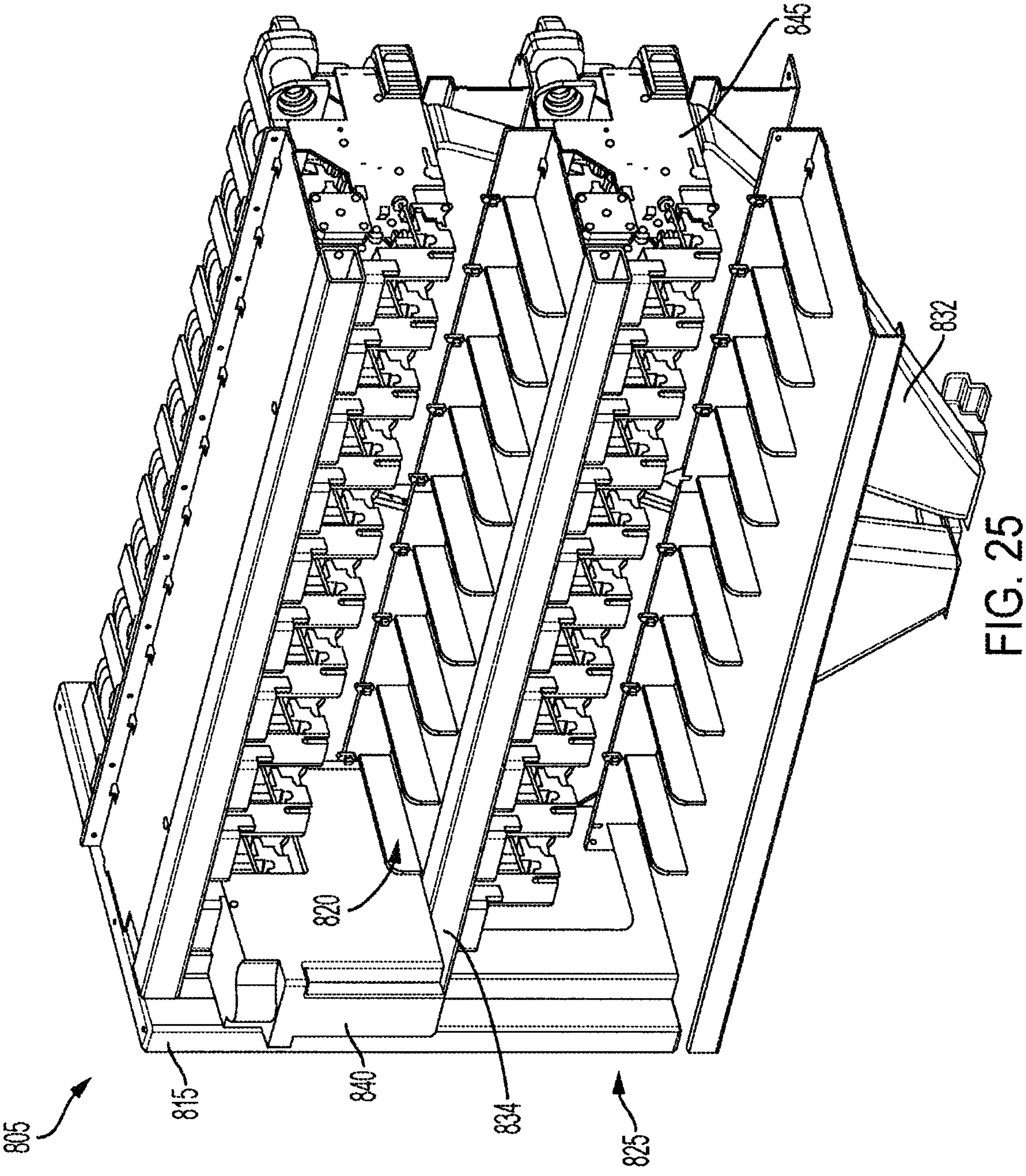
FIG. 25 is a front perspective view of the universal feed cassette of FIG. 24 with a part of a housing removed in accordance with some embodiments.
Figure 26:
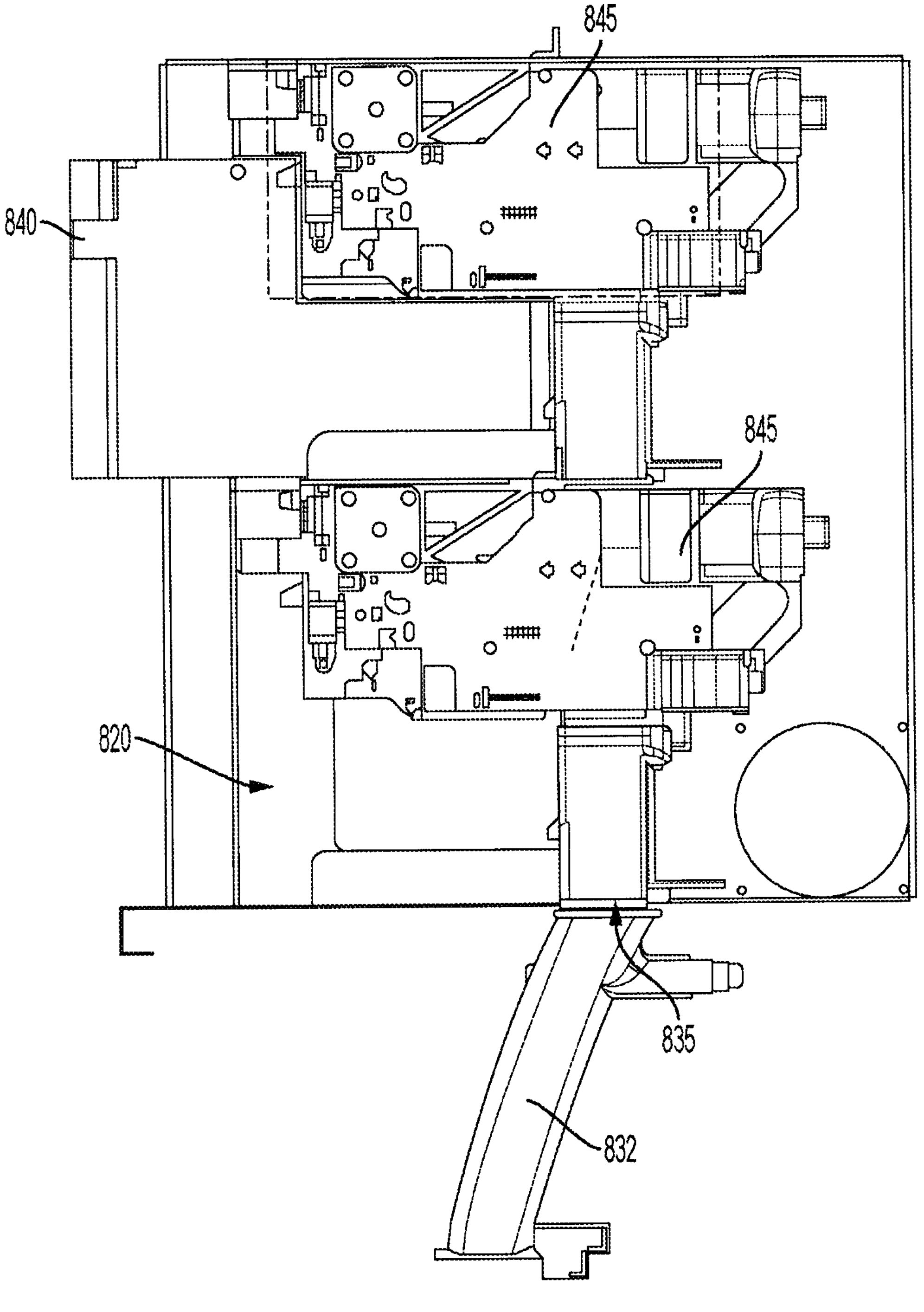
FIG. 26 is a plan view of the universal feed cassette of FIG. 24 in accordance with some embodiments.
Figure 27:
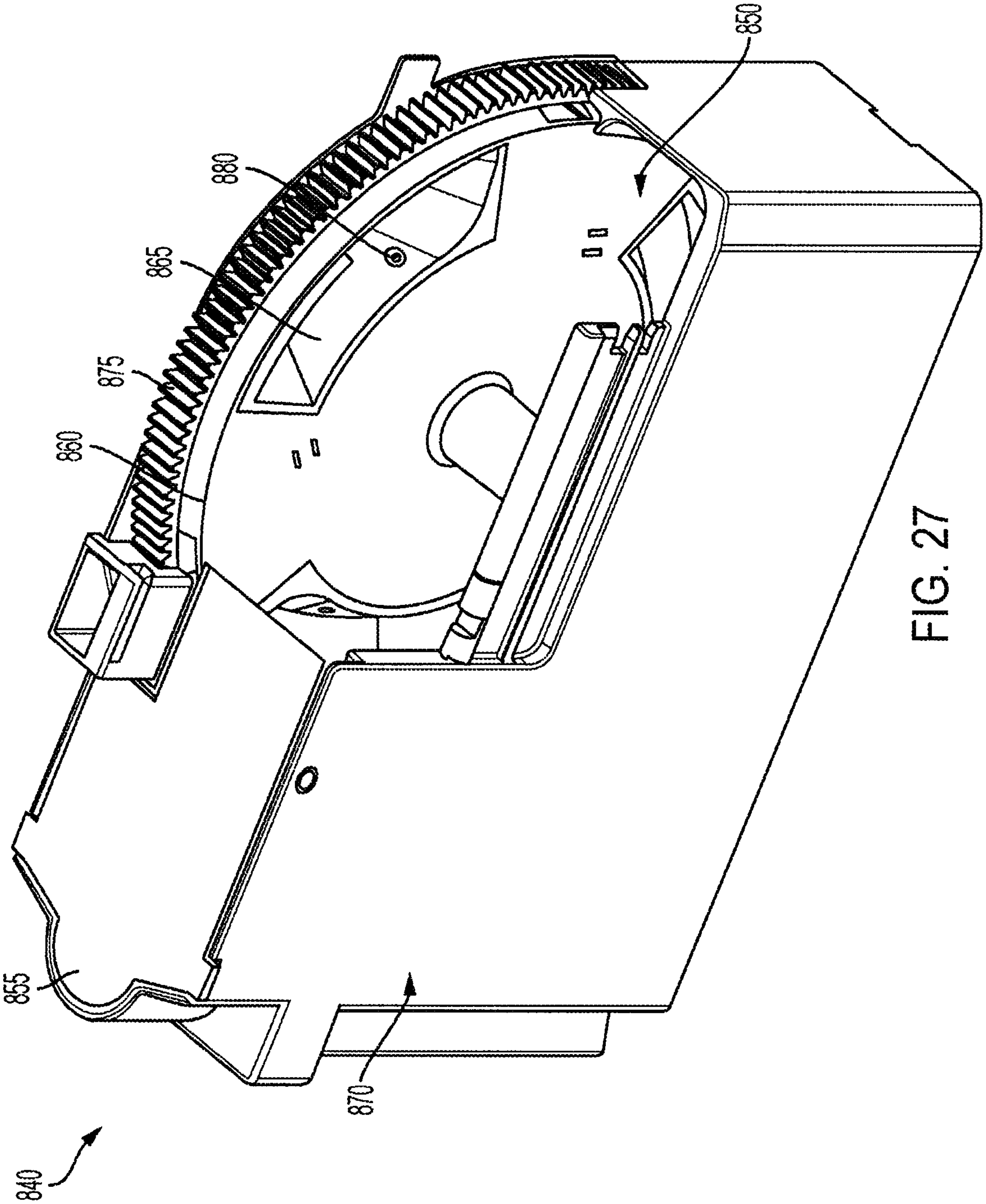
FIG. 27 is a perspective view of a cartridge of the universal feed cassette of FIG. 24 in accordance with some embodiments.

Referring to FIGS. 24-26, the universal feed cassette 805 includes a housing 815 having a plurality of cartridge slots 820 within the housing 815. An opening 825 is provided on a front side (e.g., a first side) of the housing 815 and a cassette cover 830 covers a back side (e.g., a second side) of the housing 815. Dispensing openings 835 are provided on the bottom side of the housing 815. The dispensing openings 835 are in communication with a chute 832 of the packaging unit 810.

In the example illustrated in FIGS. 24-26, the universal feed cassette 805 includes up to twenty cartridge slots 820. The cartridge slots 820 are arranged in a duplex-formation such that a second row of cartridge slots 820 are provided above a first row of cartridge slots 820 within the housing 815. FIG. 26 illustrates a side-profile view of the duplex-formation of the cartridge slots 820. A separating platform 834 is provided between the first row and the second row of cartridge slots 820. The cartridge slots 820 receive cartridges 840 through the opening 825. A plurality of cartridge mechanisms 845, one for each cartridge slot 820 is fixed to the top of the housing 815—for the second row of cartridge slots 820—and the separating platform 834—for the first row of cartridge slots 820. When received in the cartridge slots 820, the cartridges 840 are connected to the cartridge mechanism 845. The cartridge mechanism 845 individually dispenses medications 180 from the cartridge 840 as described in detail below. The dispensing openings 835 transfer the medications 180 from the cartridges 840 to the packaging unit 810 for packaging. The cassette cover 830 can be removed to access the cartridge mechanisms 845 from the back side of the housing 815. The cartridge mechanisms 845 are removably fixed to the housing 815 such that a technician can remove a cartridge mechanism 845 for servicing.

Referring to FIGS. 27-30, the cartridge 840 includes a reservoir 850, a reservoir cover 855, a wheel 860, and scooping members 865. The reservoir 850 stores the medications 180 during the dispensing process. The wheel 860 is provided on one side of the cartridge 840 and extends into the bottom portion of the reservoir 850. The bottom portion of the reservoir 850 has a curved shape starting from the side opposite that of the wheel 860, the front side, and the back side and ending at the center of the bottom portion of the wheel 860 (see FIG. 30). The curved shape of the reservoir 850 directs the medications 180 within the reservoir 850 towards the bottom of the wheel 860 and particularly into the scooping members 865 of the wheel 860.

The reservoir cover 855 covers a portion (e.g., a spout portion 870) of the reservoir 850. The reservoir cover 855 is pivotably attached to the spout portion 870 to pivot between an open position and a closed position. When a pharmacist is emptying the contents of the cartridge 840, the reservoir cover 855 pivots to the open position to allow the medications 180 to flow out of the reservoir 850 into the bulk containers. During the dispensing process, the cartridge mechanism 845 includes a stopper 846 to inhibit the reservoir cover 855 from opening. As such, the medications 180 within the reservoir 850 are not accessible outside the machine during the dispending process.

Teeth 875 are provided on the outer circumferential surface of the wheel 860. During the dispensing process, the teeth 875 interlock with teeth of a shaft driven by a motor assembly of the cartridge mechanism 845. The wheel 860 is provided with three scooping members 865 to scoop individual medications 180 from the reservoir 850. The scooping members 865 include an inward projection 866 extending into the wheel 860. The curved surface of the reservoir 850 guides the medications 180 into the inward projections of the scooping members 865. The scooping members 865 include a stopper 868 along a circumferential end of the inward projections that hold the medications 180 when the wheel 860 is being rotated. Scooping members 865 may be made in different sizes to accommodate the different sizes of medications 180. The scooping members 865 can be swapped to configure the cartridges 840 to dispense medications 180 of different sizes. The scooping members 865 may also be removed for cleaning. In some embodiments, rather than being separate from the wheel 860, the scooping members 865 may be formed integrally with the wheel 860. In these embodiments, the wheels 860 or cartridges 840 may be swapped to dispense medications 180 of different sizes.

Figure 32:
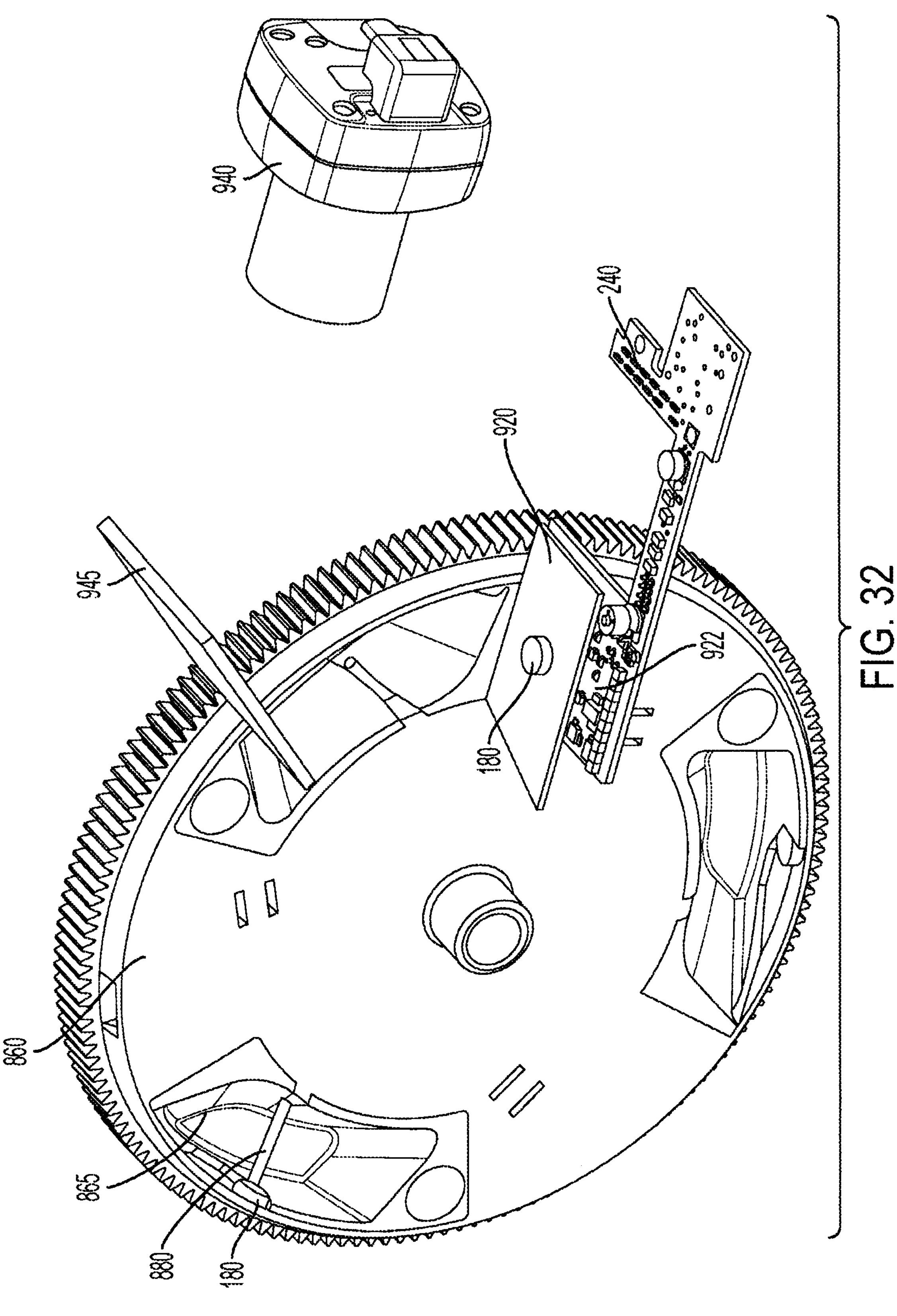
FIG. 32 is a perspective view of the wheel of the cartridge of FIG. 27 and the camera system and the shuttle system of the cartridge mechanism of FIG. 31 in accordance with some embodiments.
Figure 33:
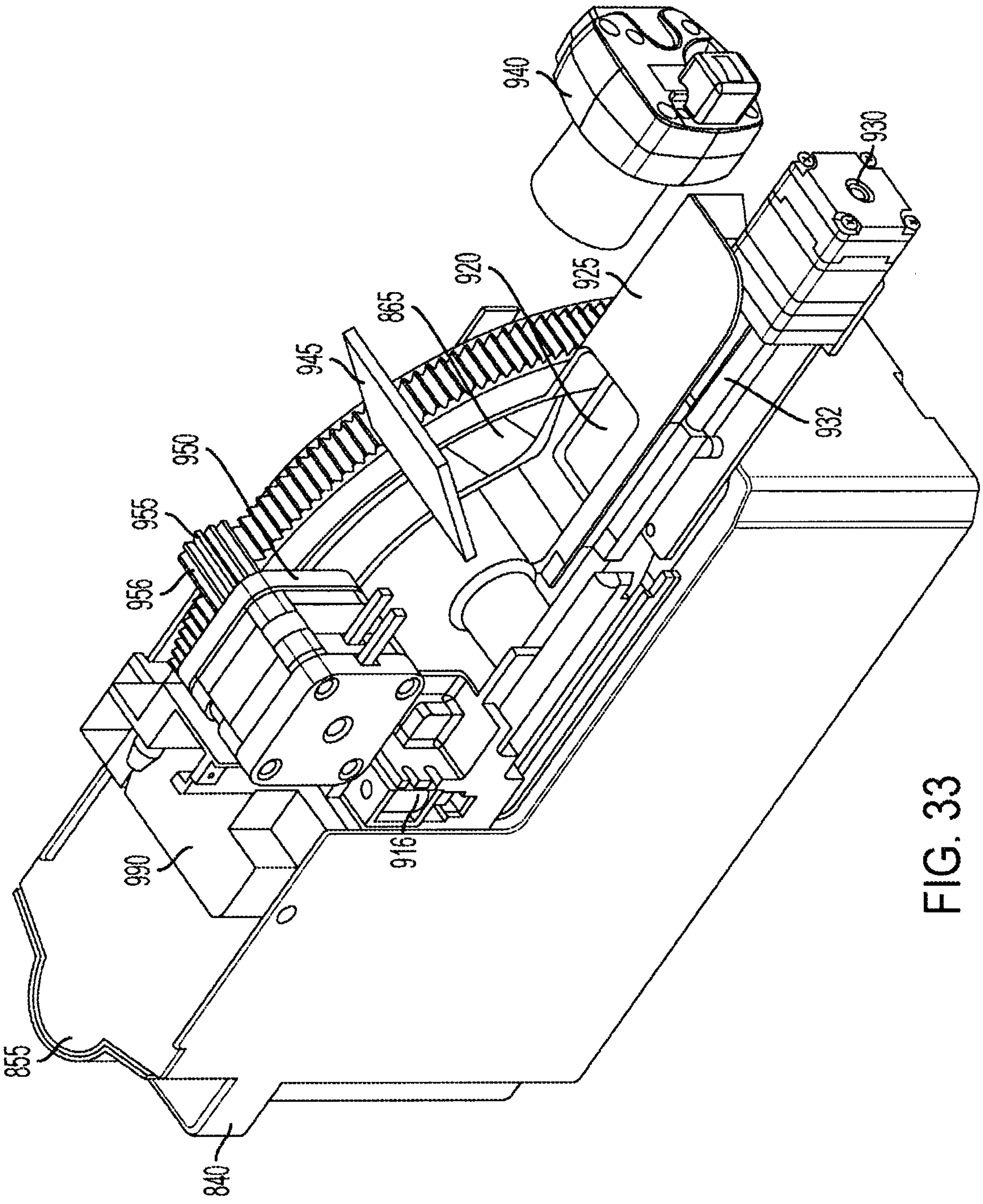
FIG. 33 is a perspective view of the cartridge of FIG. 27 and the cartridge mechanism of FIG. 31 in accordance with some embodiments.
Figure 34:
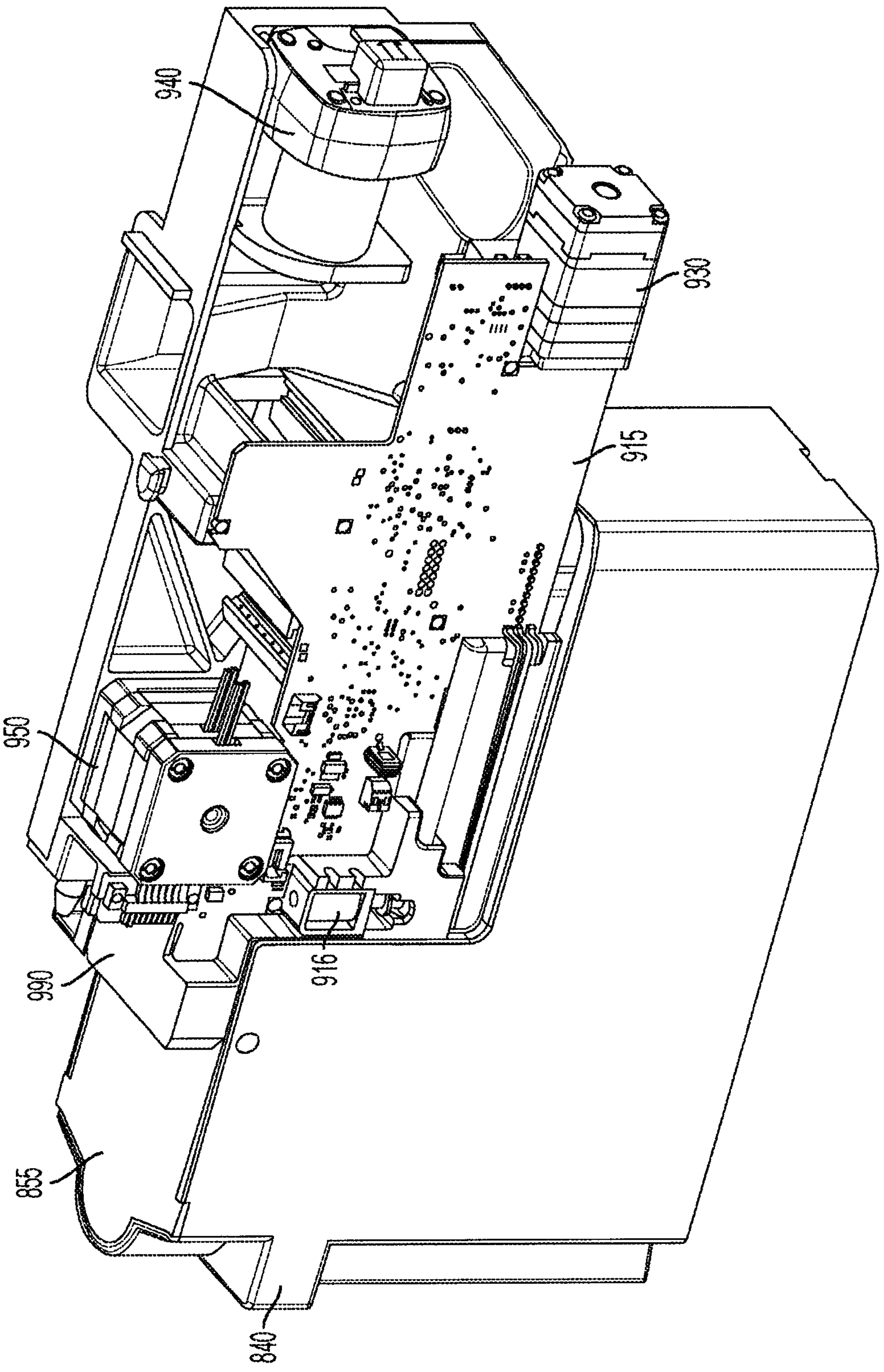
FIG. 34 is a perspective view of the cartridge of FIG. 27 and the cartridge mechanism of FIG. 31 in accordance with some embodiments.

The wheel 860 includes holding pins 880 (see FIG. 32) that extend and retract from the inside of the wheel 860 during rotation of the wheel 860. The scooping members 865 include an opening to receive the holding pins 880. The holding pins 880 along with the stopper and the circumferential surface of the inward projection 866 are used to hold a medication 180 when the wheel 860 is being rotated. During rotation of the wheel 860, when the inward projections 866 of the scooping members 865 encounter the reservoir 850, the medications 180 in the reservoir 850 move inward into the scooping members 865 due to the curved shape of the reservoir 850. The holding pins 880 are retracted when the scooping members 865 are moving along the reservoir 850 at a bottom portion of the wheel 860. As the scooping members 865 move out of the reservoir 850, the holding pins 880 are advanced towards the circumferential end of the scooping members 865 to engage a medication 180. The medications 180 are held between the circumferential end of the scooping member 865, the holding pin 880, and the stopper 868. The scooping member 865 and the holding pin 880 can be used for any type of medication 180. Typically, only a single medication 180 is pinched between the holding pin 880 and the scooping member 865, while the other medications 180 fall back into the reservoir 850 during the rotation of the wheel 860. As the scooping member 865 passes the top portion of the wheel 860, the holding pin 880 is once again retracted to release the medication 180 into the cartridge mechanism 845. The wheel 860 and the scooping member 865 may together be referred to as a singulating mechanism.

Figure 28:
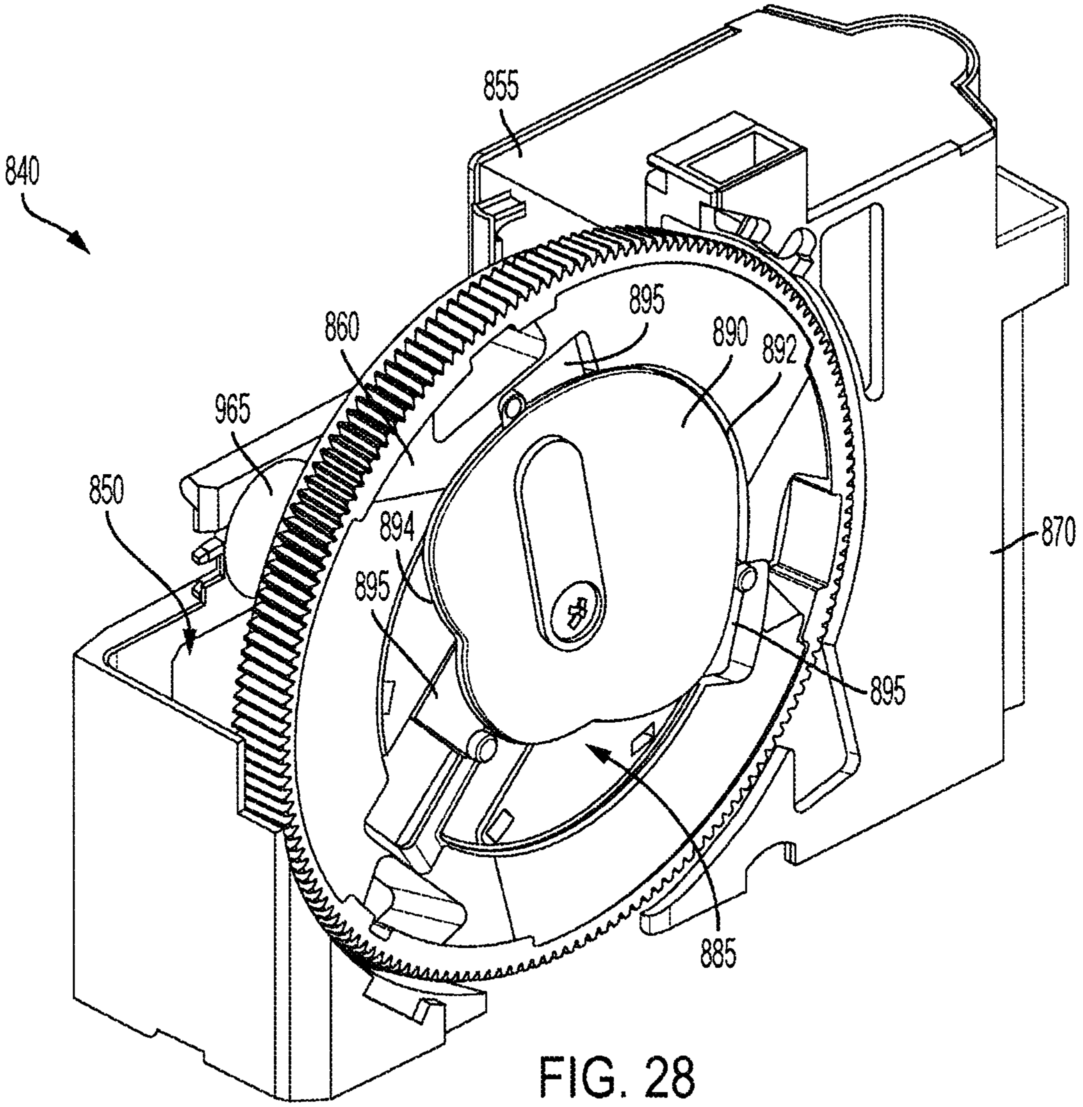
FIG. 28 is a back perspective view of the cartridge of FIG. 27 in accordance with some embodiments.
Figure 29:
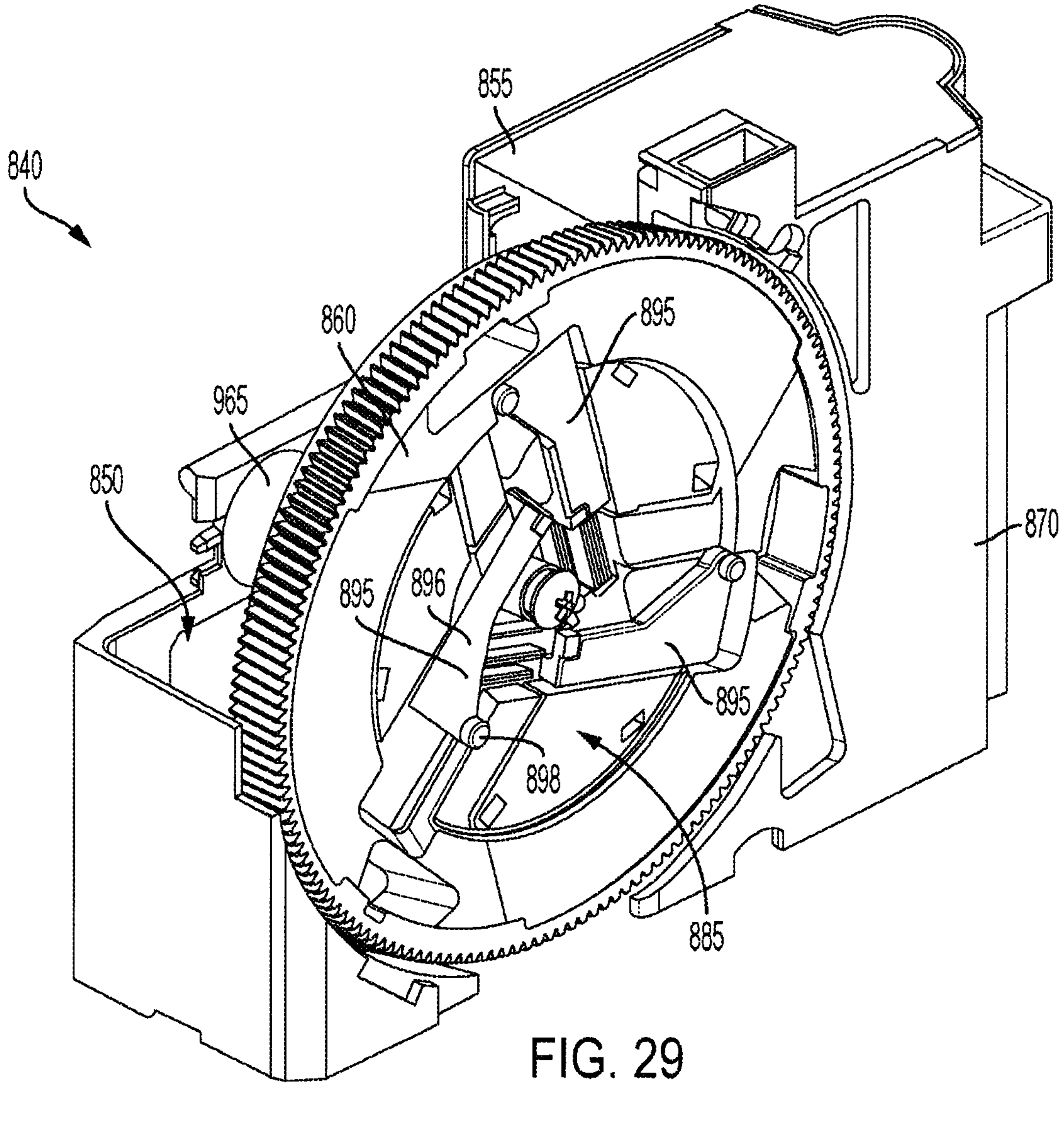
FIG. 29 is a back perspective view of the cartridge of FIG. 27 in accordance with some embodiments.

FIGS. 28-29 illustrate a cam and follower mechanism 885 that is used to advance and retract the holding pins 880. The cam and follower mechanism 885 is provided in the wheel 860. The cam and follower mechanism 885 includes a cam 890 and a plurality of followers 895. In the example illustrated, the cartridge 840 includes three followers 895, one for each of the holding pins 880. The holding pins 880 are attached to the followers 895 to move with the followers 895. The cam 890 is fixed to the cartridge 840 and remains stationary even when the wheel 860 is rotated. The cam 890 includes an arc portion 892 and a cut-off portion 894. The arc portion 892 extends further from the center of the cam 890 than the cut-off portion 894. The follower 895 includes a flat portion 896 that is coupled to a holding pin 880 and an outward projection 898 extending from the flat portion 896 to engage the circumferential surface of the cam 890. A spring mechanism is connected to a radially inward end of the followers 895 to provide an inward biasing force to the followers 895. The holding pin 880 is advanced when the corresponding follower 895 engages the arc portion 892 of the cam 890 and is retracted when the corresponding follower 895 engages the cut-off portion 894 of the cam 890. The follower 895 is retracted due to the biasing force of the spring mechanism when the follower engages the cut-off portion 894 of the cam 890.

Referring to FIGS. 31-35, the cartridge mechanism 845 includes a shuttle system 900 (for example, a verification system), a camera system 905, a motor assembly 910, a printed circuit board 915, and a lockout mechanism 916. The shuttle system 900, shown in FIG. 33, includes a platform 920, a shuttle 925, and a shuttle drive 930. The platform 920 may be made from a clear or translucent plastic material. An LED lighting system 922, as described above, may be provided over and/or under the platform 920 to illuminate the contents on the platform 920 when the camera system 905 is capturing an image of the contents. The LED lighting system 922 may emit visible or infrared light to illuminate the platform 920.

Figure 36:
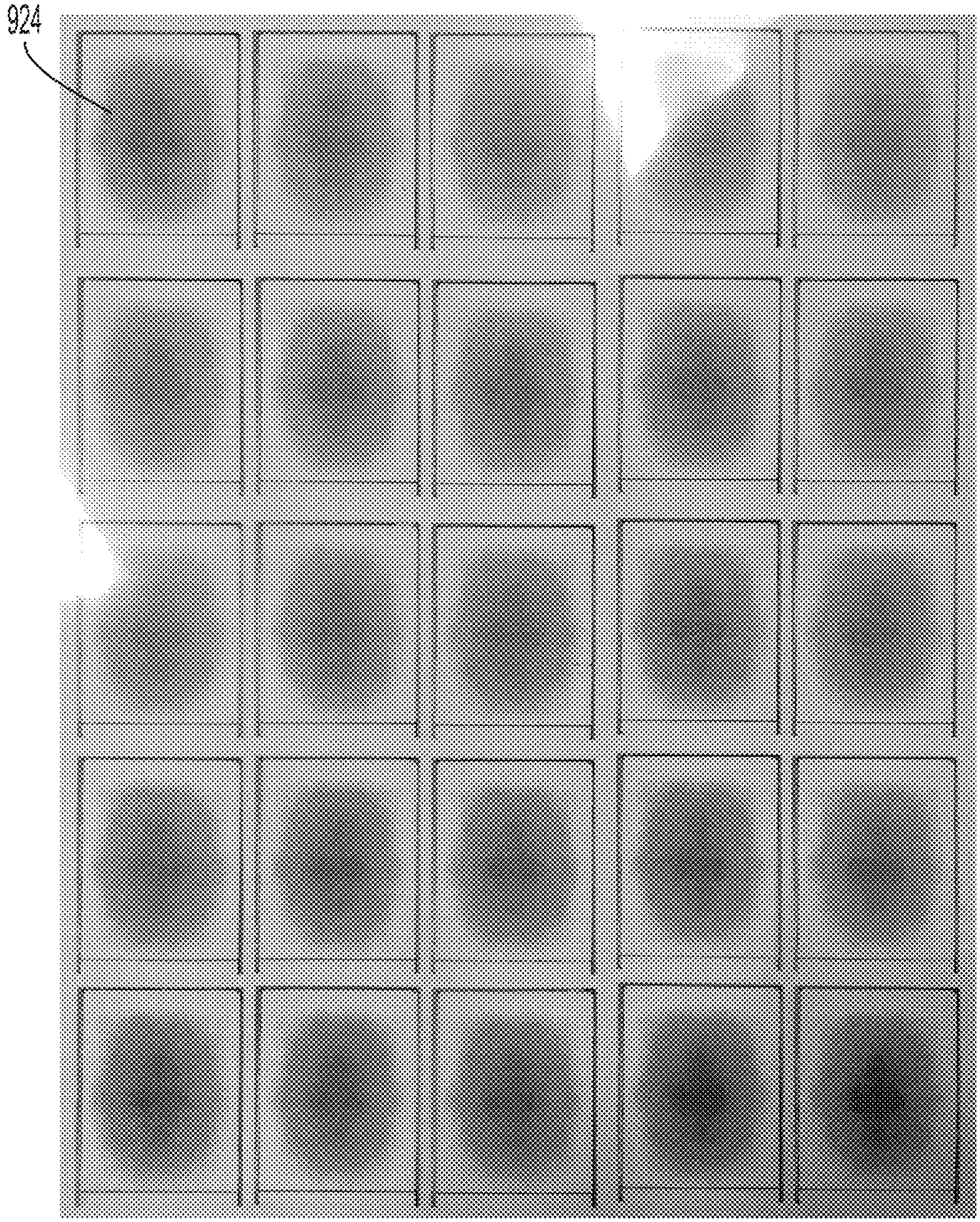
FIG. 36 illustrates a backing applied to a platform of the cartridge mechanism of FIG. 31 in accordance with some embodiments.

Typically, a single LED device may be used below the platform 920 to illuminate the translucent platform 920. However, the single LED device may not provide uniform lighting through all of the surface area of the platform 920. Particularly, each LED device includes a light signature such that the center of the platform 920 is brighter than the edges of the platform. This irregularity in brightness may result in misidentifying medications 180 during the image recognition process. In order to provide uniform brightness across the surface are of the platform, several LED devices may be placed around the bottom surface of the platform. In some embodiments, the light signature of the LED device is detected and a backing 924 (see FIG. 36) may be applied to the platform to correct the light signature of the LED device. As shown in FIG. 36, the backings 924 include dark spots that mimic the light signatures of the LED devices to correct for the brightness irregularity observed on the platforms 920. Since each LED device has a different light signature, different backings 924 are developed one for each of the cartridge mechanisms 845. The backings 924 when applied to the platforms 920, distribute the light from the LED device of the LED lighting system 922 such that every portion of the platform 920 is illuminated with similar brightness.

The shuttle 925 may be moved laterally between the platform 920, over the reservoir 850, and over a conduit 935. The shuttle 925 transfers the medications from the platform 920 either to the reservoir 850 or to the conduit 935. The shuttle 925 is driven by the shuttle drive 930. The shuttle drive 930 may be a motor assembly, an actuator, or the like that moves the shuttle 925 between the platform 920, over the reservoir 850, and over the conduit 935. In the example illustrated, the shuttle drive 930 includes a rotating screw 932 that moves the shuttle 925 laterally between the platform 920, the reservoir 850, and the conduit 935.

The camera system 905 includes a camera 940 and a mirror 945. The camera 940 is positioned at the back of the cartridge mechanism 845. The camera 940 may be a still camera or a video camera that captures an image of the contents of the platform. The mirror 945 is placed directly above the platform 920 and is tilted at a 45-degree angle such that the camera 940 positioned at the back of the cartridge mechanism 845 can capture an image of the platform 920.

The motor assembly 910 includes a motor 950 that drives a shaft 955 positioned in the middle of the cartridge mechanism 845. The shaft 955 includes teeth 956 that interlock with the teeth 875 of the wheel 860 (see FIG. 33). When the motor 950 is driven, the shaft 955 rotates the wheel 860 to the individually dispense the medications 180.

The PCB 915 includes the electrical components of the cartridge mechanism 845. The PCB 915 is positioned on the side opposite that of the wheel 860. In some embodiments, the PCB 915 includes an antenna 960 (see FIG. 31) that detects an RFID tag 965 (see FIGS. 28-29) placed on the cartridge 840. The RFID tag 965 may store information of the cartridge 840. The information stored on the RFID tag 965 may include, for example, identification information of the cartridge 840, medication restrictions (e.g., dedicated to allergenic medication or non-allergenic medication) of the cartridge 840, and the like.

The lockout mechanism 916 is, for example, a lockout solenoid that prevents a cartridge 840 from being loaded onto the cartridge mechanism 845 when the lockout mechanism 916 is activated. During a dispensing process, not all cartridge mechanisms 845 are used to fill a prescription. In these situations, the lockout mechanism 916 is used to prevent cartridges 840 from being placed on inactive cartridge mechanism 845. In addition, the lockout mechanism 916 may be used to prevent an incompatible or wrong cartridge 840 from being loaded to the cartridge mechanism. For example, the cartridge mechanism 845 may read the RFID tag 965 to determine whether the correct and compatible cartridge 840 is being loaded to the cartridge mechanism. The cartridge mechanism 845 may only deactivate the lockout mechanism 916 when the correct cartridge 840 is being loaded to the cartridge mechanism 845. The lockout mechanism 916 may also be used to prevent the cartridge 840 from being removed from the cartridge mechanism 845. Particularly, the lockout mechanism 916 locks the cartridge 840 in place when loaded on to the cartridge mechanism 845. During the dispensing process, the lockout mechanism 916 is activated to prevent removal of the cartridge 840. The lockout mechanism 916 may be deactivated when the dispensing process is complete and the cartridge 840 can be removed from the cartridge mechanism 845.

Figure 35:
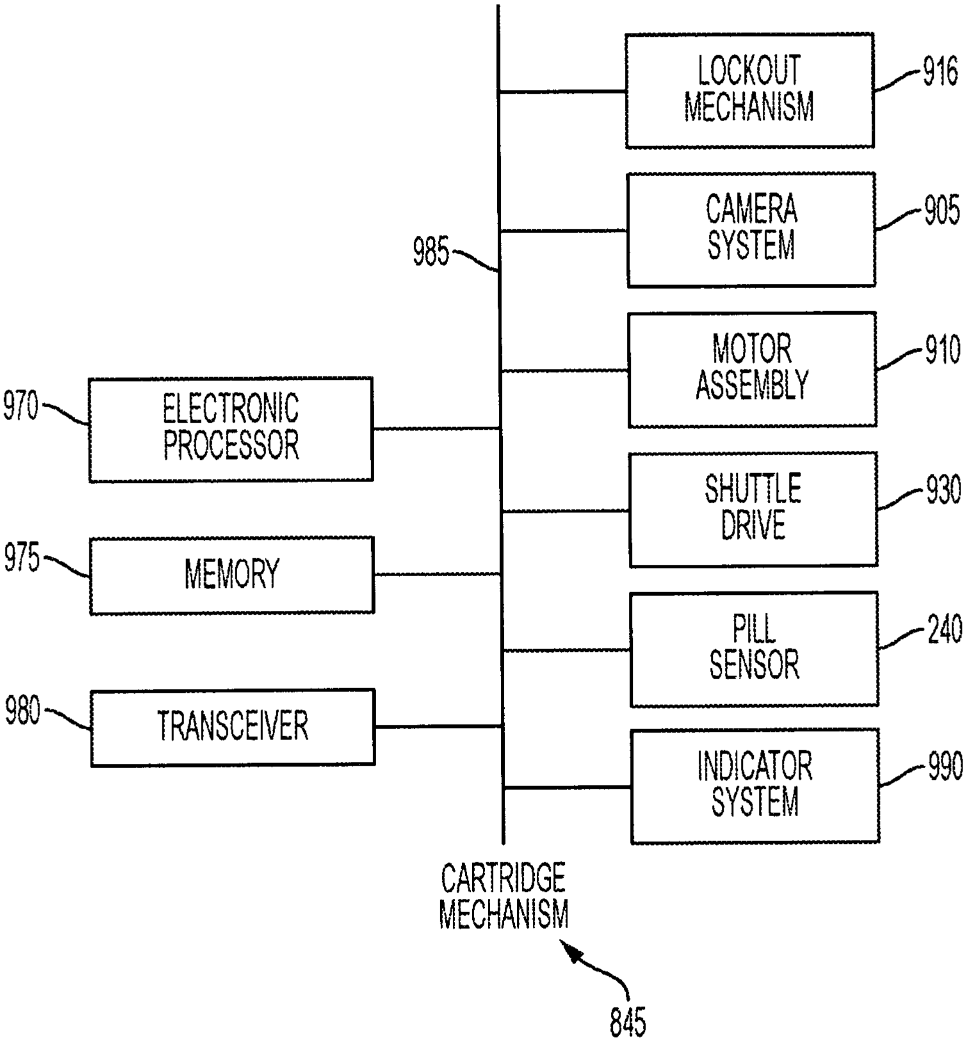
FIG. 35 is a block diagram of the cartridge mechanism of FIG. 31 in accordance with some embodiments.

FIG. 35 is a block diagram of one embodiment of the cartridge mechanism 845. In the example illustrated, the cartridge mechanism 845 includes an electronic processor 970, a memory 975, a transceiver 980, the camera system 905, the motor assembly 910, the lockout mechanism 916, the shuttle drive 930, the antenna 960, the pill sensor 240, and an indicator system 990. The electronic processor 970, the memory 975, the transceiver 980, the camera system 905, the motor assembly 910, the lockout mechanism 916, the shuttle drive 930, and the pill sensor 240 communicate over one or more control and/or data buses (for example, a communication bus 985). FIG. 35 illustrates only one example embodiment of the cartridge mechanism 845. The cartridge mechanism 845 may include more or fewer components and may perform functions other than those explicitly described herein.

In some embodiments, the electronic processor 970, the memory 975, and the transceiver 980 are implemented similar to the electronic processor 305, the memory 310, and the transceiver 315. In some embodiments, the universal feed cassette 805 or the automatic packager 800 may include a single electronic processor 970, a single memory 975, and a single transceiver 980 that control all the cartridge mechanism 845.

The camera system 905 receives control signals from the electronic processor 970. Based on the control signals received from the electronic processor 970, the camera system 905 controls the camera 940 and the lighting system that illuminates the platform 920. The motor assembly 910 may send position sensor 175 signals to the electronic processor 970 and receive control signals to operate a motor of the motor assembly 910 based on the position sensor 175 signals. As described above, the shuttle drive 930 may be a motor assembly or an actuator. The shuttle drive 930 may also include a position sensor to determine the position of the shuttle 925. The shuttle drive 930 may send the position sensor signals to the electronic processor 970, which sends control signals to the shuttle drive 930 to move the shuttle 925 based on the position sensor signals. In some embodiments, the shuttle system 900 may also include a shuttle home sensor, which indicates whether the shuttle 925 is at a home position. Signals from the shuttle home sensor are provided to the electronic processor 970 to control the movement of the shuttle 925.

The pill sensor 240 communicates with the electronic processor 970 to provide an indication of whether or not a pill is dispensed through the conduit 935. The electronic processor 970 also controls the indicator system 250 to provide an indication of the status of each cartridge 840. The indicator system 990 may include one or more LEDs provided behind a translucent plastic material. The electronic processor 970 may use the indicator system 990 to provide indications, for example, whether a cartridge 840 is correctly placed in the cartridge slot 820. The electronic processor 970 may activate, for example, a blue LED to indicate that a next cartridge 840 should be placed in the corresponding cartridge slot 820 (that is, the cartridge slot 820 corresponding to the cartridge mechanism 845 with the blue LED activated). The electronic processor 970 may activate, for example, a green LED to indicate that the cartridge 840 was correctly placed in the cartridge slot 820. The electronic processor 970 may activate, for example, a red LED to indicate that the cartridge 840 was not correctly placed in the cartridge slot 820. Additionally, the electronic processor 970 may use the indicator system 990 to provide indications on where to place a cartridge 840 and when to remove a cartridge 840. For example, the electronic processor 970 may activate a blue LED to indicate that a pharmacist can place a cartridge 840 in the cartridge slot 820 corresponding to the activated LED. The electronic processor 970 may activate a blue LED again to indicate that the dispensing process is complete and the cartridge 840 can be removed from the cartridge slot 820.

Figure 30:
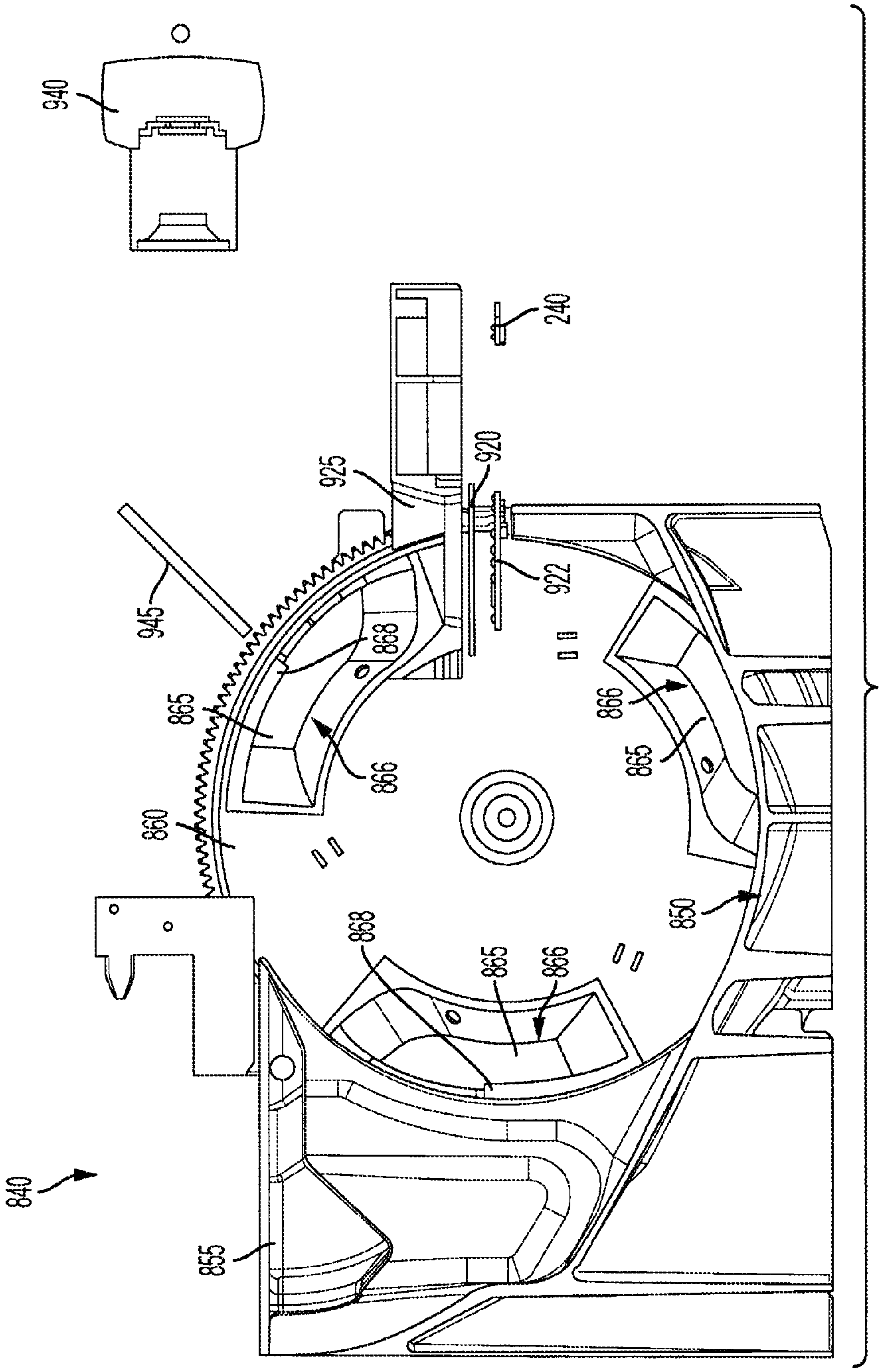
FIG. 30 is a cross-sectional view of the cartridge of FIG. 27 in accordance with some embodiments.
Figure 31:
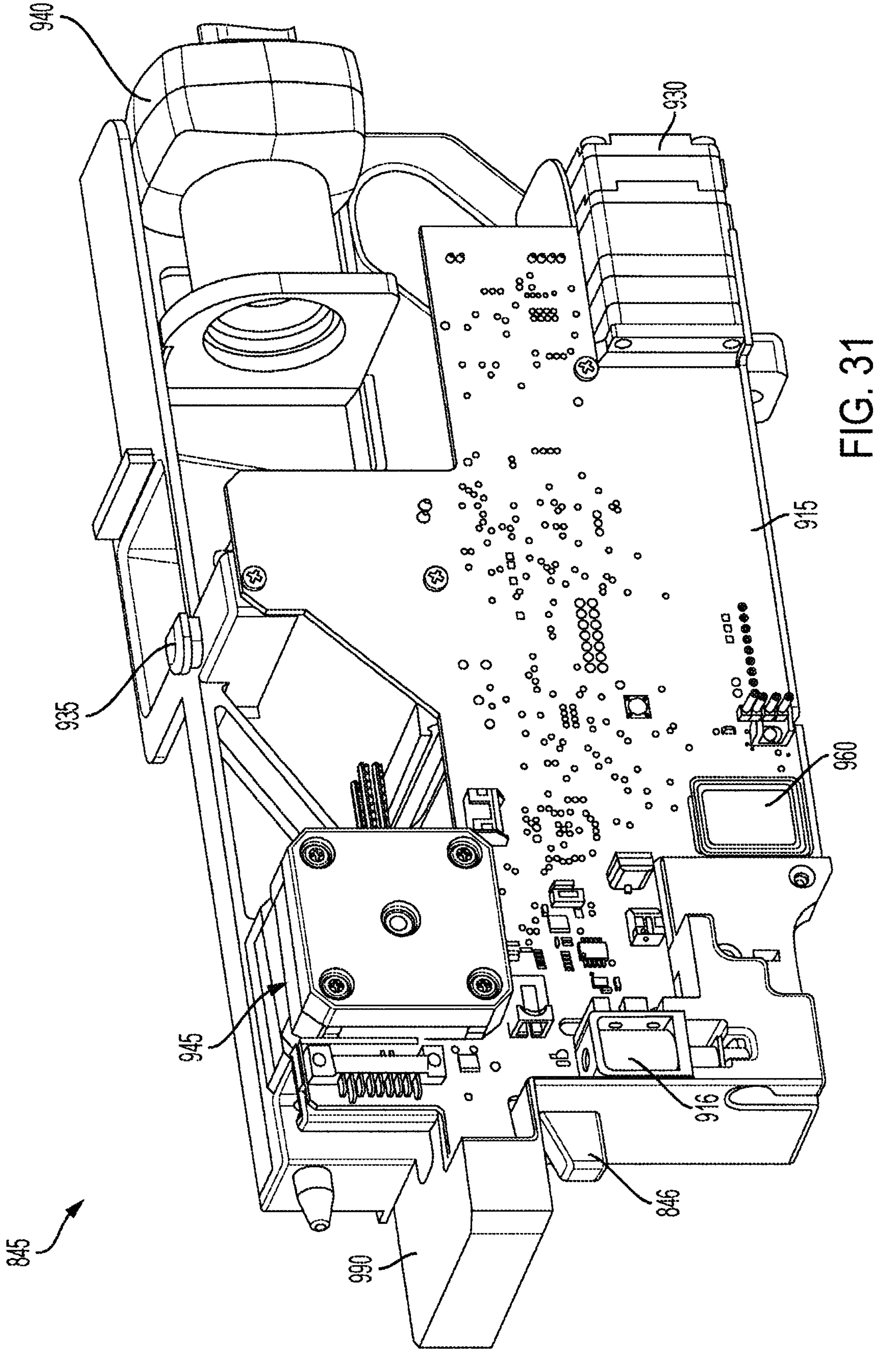
FIG. 31 is a perspective view of a cartridge mechanism of the universal feed cassette of FIG. 24 in accordance with some embodiments.
Figure 37:
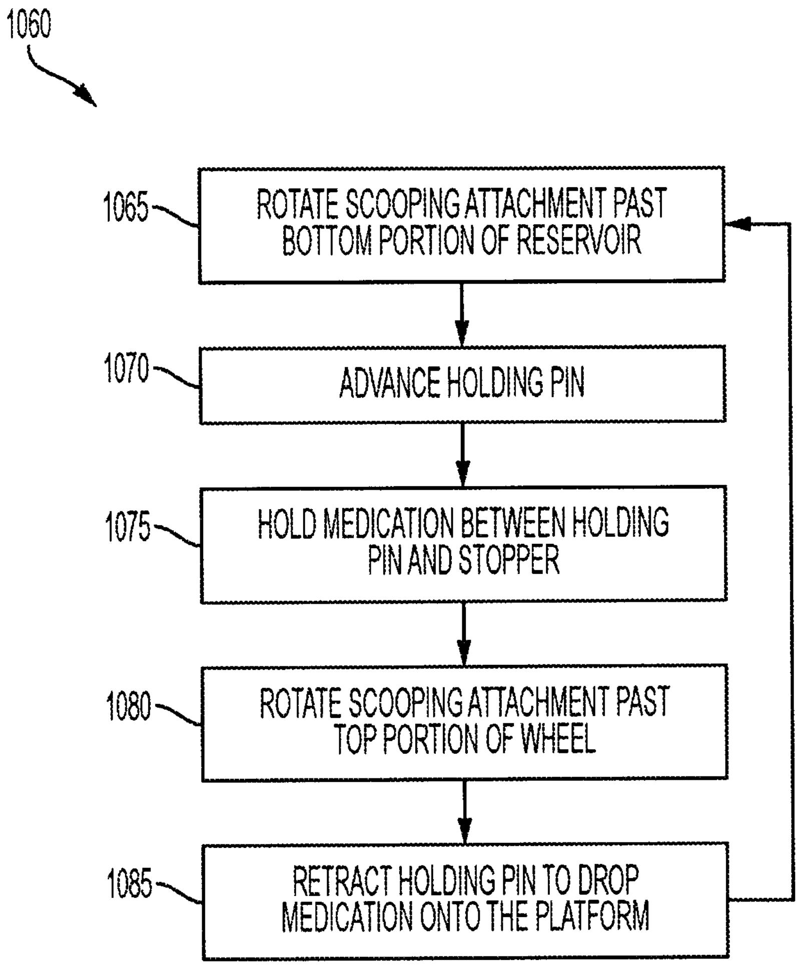
FIG. 37 is a flowchart of a method of delivering medications to a platform of the cartridge mechanism of FIG. 31 in accordance with some embodiments.

FIG. 37 is a flowchart illustrating one example method 1060 of delivering medications to the platform 920. As illustrated in FIG. 37, the method 1060 includes rotating, using the motor assembly 910, a scooping member 865 past the bottom portion of the reservoir 850 (at block 1065). Referring to FIG. 30, when the scooping member 865 is at the bottom portion of the reservoir 850, the medications 180 move into the inward projection 866 of the scooping member 865 due to the curved shape of the reservoir 850. As the medications 180 move into the inward projection 866, the stopper 868 of the scooping member 865 carries at least one medication 180 past the bottom portion of the reservoir 850 as the scooping member 865 is rotated past the bottom portion of the reservoir 850. The scooping members 865 are placed within the wheel 860 along circumferential ends of the wheel 860. The wheel 860 is rotated to rotate the scooping members 865. As described above, teeth 875 of the wheel 860 interlock with teeth of the shaft 955, which is driven by the motor 950.

The method 1060 also includes advancing, using the cam and follower mechanism 885, the holding pin 880 into the scooping member 865 (at block 1070). Referring to FIGS. 28 and 30, as the scooping member 865 is rotated past the bottom portion of the reservoir 850, the follower 895 corresponding to the scooping member 865 encounters the arc portion 892 of the cam 890. The follower 895 is then advanced, which advances the holding pin 880 towards a circumference of the inward projection 866 of the scooping member 865.

The method 1060 further includes holding the medication between the holding pin 880 and the stopper 868 (at block 1075). When the holding pin 880 is advanced, a medication 180 is held between the holding pin 880, the circumferential end of the scooping member 865, and the stopper 868. The medication 180 is held in such a way until the scooping member 865 moves past the top portion of the wheel 860.

The method 1060 also includes rotating, using the motor assembly 910, the scooping member 865 past the top portion of the wheel 860 (at block 1080). As discussed above, the motor assembly 910 rotates the wheel 860 to rotate the scooping members 865. The motor assembly 910 may also include a position sensor (not shown) to detect a position of the wheel 860. For example, the motor assembly 910 may include a hall sensor to detect magnets placed at certain locations on the wheel 860 to determine the position of the wheel 860. In other embodiments, the position sensor may be an optical sensor or the like.

The method 1060 further includes retracting, using the cam and follower mechanism 885, the holding pin 880 to drop the medication 180 on to the platform 920 (or for example, a verification system that verifies that an expected medication 180 (e.g., correct, single, and unbroken medication 180) is delivered (at block 1085). Referring to FIGS. 28 and 30, as the scooping member 865 is rotated past the top portion of the wheel 860, the follower 895 corresponding to the scooping member 865 encounters the cut-off portion 894 of the cam 890. The follower 895 is then retracted, which retracts the holding pin 880 away from the circumference of the inward projection 866 of the scooping member 865. As the holding pin 880 is retracted, the medication 180 drops from the scooping member 865 on to the platform 920. The scooping member 865 may be shaped to include a curved portion at a radially inward portion of the scooping member 865. The curved portion pushes the medication 180 away from the wheel 860 and onto the platform 920 when the medication 180 is released by the holding pin 880. Accordingly, the method 1060 delivers a single medication 180 to the platform 920.

Thus, the invention provides, among other things, a universal feed mechanism for an automatic packager.

The invention claimed is:

1. A method of dispensing medications, the method comprising:

removably receiving, at a cartridge mechanism, a cartridge storing a plurality of medications;

determining, using an electronic processor of the cartridge mechanism, that a medication from the plurality of medications is delivered to a platform of the cartridge mechanism;

in response to determining that the medication is delivered to the platform controlling, using the electronic processor, a camera system to capture an image of the platform;

determining, using the electronic processor, whether an expected medication is delivered to the platform based on the image before the medication is dispensed from the cartridge;

in response to determining that the expected medication is delivered to the platform, dispensing, using the cartridge mechanism, the medication from the platform; and in response to determining that the expected medication is not delivered to the platform, returning, using the cartridge mechanism, the medication from the platform directly to a reservoir of the cartridge.

2. The method of claim 1, further comprising:

controlling, using the electronic processor, a shuttle drive to drive a shuttle of the cartridge mechanism over the platform to a first position to dispense the medication from the cartridge; and controlling, using the electronic processor, the shuttle drive to drive the shuttle over the platform to a second position to return the medication to the cartridge.

3. The method of claim 2, wherein the shuttle is above the reservoir of the cartridge when the shuttle is in the first position and wherein the shuttle is above a conduit of the cartridge when the shuttle is in the second position.

4. The method of claim 3, further comprising detecting, using a pill sensor alongside the conduit, whether the medication is dispensed through the conduit.

5. The method of claim 1, further comprising controlling, using the electronic processor, a motor assembly to deliver medications to the platform, wherein the motor assembly drives a singulating mechanism of the cartridge to deliver the medications.

6. The method of claim 5, wherein the singulating mechanism includes a wheel, a scooping member provided on the wheel, and a holding pin extending through the wheel and into the scooping member, and wherein controlling the motor assembly to deliver medications to the platform includes rotating the wheel and moving the holding pin to pinch a single medication between a surface of the wheel and the holding pin.

7. The method of claim 5, further comprising:

detecting, using a position sensor, a position of the singulating mechanism; and providing, using the position sensor, position signals indicating the position of the singulating mechanism to the electronic processor, wherein determining that the expected medication is delivered to the platform is performed based on the position signals received from the position sensor.

8. The method of claim 1, further comprising reading, using an antenna, an RFID tag of the cartridge to determine a type of medication being dispensed from the cartridge.

9. The method of claim 1, further comprising controlling, using the electronic processor, a lighting system to illuminate contents of the platform when the camera system is capturing the image of the platform.

10. The method of claim 1, wherein controlling the camera system includes capturing the image of the platform using a mirror placed above the platform at an angle.

11. The method of claim 3, wherein returning the medication from the platform directly to the cartridge includes dropping the medication from a first opening of the platform to the reservoir.

12. The method of claim 1, wherein dispensing the medication from the platform includes dropping the medication from a second opening of the platform to a dispensing opening provided at a bottom of each cartridge.

13. The method of claim 1, further comprising:

illuminating, using an LED lighting system, the platform in response to determining that the medication is delivered to the platform.

14. The method of claim 4, wherein the pill sensor is an infrared sensor.

15. The method of claim 2, wherein determining whether an expected medication is delivered to the platform based on the image includes determining whether a correct number of medications is delivered to the platform.

16. The method of claim 2, wherein determining whether an expected medication is delivered to the platform based on the image includes determining whether a correct type of medication is delivered to the platform.

17. The method of claim 4, further comprising:

in response to detecting that the medication was not delivered to the conduit, redelivering the medication.

18. The method of claim 4, further comprising:

in response to detecting that the medication was dispensed from the conduit, beginning, using the electronic processor, delivery of a next medication.

19. The method of claim 2, wherein determining whether an expected medication is delivered to the platform based on the image includes determining whether a correct number of medications is delivered to the platform and determining whether a correct type of medication is delivered to the platform.

20. A method of dispensing medications, the method comprising:

removably receiving, at a plurality of cartridge mechanisms, a plurality of cartridges storing a plurality of medications;

determining, using an electronic processor, that a medication of the plurality of medications of a first cartridge of the plurality of cartridges is delivered to a platform of a first cartridge mechanism of the plurality of cartridge mechanisms corresponding to the first cartridge;

in response to determining that the medication is delivered to the platform controlling, using the electronic processor, a camera system to capture an image of the platform;

determining, using the electronic processor, whether an expected medication is delivered to the platform based on the image before the medication is dispensed from the first cartridge;

in response to determining that the expected medication is delivered to the platform, dispensing, using the first cartridge mechanism, the medication from the platform; and in response to determining that the expected medication is not delivered to the platform, returning, using the first cartridge mechanism, the medication from the platform directly to a reservoir of the first cartridge.

* * * * *